US007203900B2

(12) United States Patent
Nara et al.

(10) Patent No.: US 7,203,900 B2
(45) Date of Patent: Apr. 10, 2007

(54) APPARATUS AND METHOD FOR INSERTING BLANK DOCUMENT PAGES IN A PRINT LAYOUT APPLICATION

(75) Inventors: Shigeo Nara, Kanagawa (JP); Koji Nakagiri, Kanagawa (JP); Yasuo Mori, Kanagawa (JP); Takuya Miyazato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 472 days.

(21) Appl. No.: 10/241,704

(22) Filed: Sep. 12, 2002

(65) Prior Publication Data

US 2003/0056177 A1 Mar. 20, 2003

(30) Foreign Application Priority Data

Sep. 14, 2001 (JP) ............................. 2001-280609
Sep. 14, 2001 (JP) ............................. 2001-280612

(51) Int. Cl.
*G06F 15/00* (2006.01)
(52) U.S. Cl. ...................... 715/517; 715/500; 715/514; 715/530; 358/1.11; 358/1.13
(58) Field of Classification Search ................ 715/517, 715/514–515, 500, 530, 526, 539; 358/1.11, 358/1.13, 1.15
See application file for complete search history.

(56) References Cited

U.S. PATENT DOCUMENTS

| | | | | |
|---|---|---|---|---|
| 4,792,919 A | * | 12/1988 | Fukunaga | 715/531 |
| 5,583,659 A | * | 12/1996 | Lee et al. | 358/3.13 |
| 5,903,903 A | * | 5/1999 | Kennedy | 715/525 |
| 6,040,920 A | * | 3/2000 | Ichiriki | 358/403 |
| 6,337,744 B1 | * | 1/2002 | Kuroda | 358/1.13 |
| 6,462,725 B1 | * | 10/2002 | Orisaka | 345/98 |
| 6,462,756 B1 | | 10/2002 | Hansen et al. | 345/764 |
| 6,509,974 B1 | | 1/2003 | Hansen | 358/1.12 |
| 6,512,899 B2 | | 1/2003 | Shimada et al. | 399/82 |
| 6,538,760 B1 | * | 3/2003 | deBry et al. | 358/1.15 |
| 6,825,943 B1 | | 11/2004 | Barry et al. | 358/1.15 |
| 2002/0120650 A1 | * | 8/2002 | d'Aquin | 707/513 |
| 2002/0129061 A1 | * | 9/2002 | Swart et al. | 707/513 |
| 2002/0184189 A1 | * | 12/2002 | Hay et al. | 707/1 |

FOREIGN PATENT DOCUMENTS

EP          1098266 A2 *   5/2001

OTHER PUBLICATIONS

Microsoft Word 2000, (herein after Printout), copyright 1999, pp. 1-28.*
Canon BJ Printout Version 1.10 (herein after Canon), copyright 2000, pp. 1-12.*
U.S. Appl. No. 10/090,837, filed Mar. 6, 2002.
U.S. Appl. No. 10/238,693, filed Sep. 11, 2002.
U.S. Appl. No. 10/238,695, filed Sep. 11, 2002.
U.S. Appl. No. 10/241,568, filed Sep. 12, 2002.
U.S. Appl. No. 10/241,633, filed Sep. 12, 2002.

* cited by examiner

*Primary Examiner*—Thu V. Huynh
(74) *Attorney, Agent, or Firm*—Fitzpatrick, Cella, Harper & Scinto

(57) ABSTRACT

This invention relates to a document processing apparatus which edits document data which can define a desired section using an original page as a unit of definition. Whether a page break is designated at the section break of the section is determined. If the page break is designated, a blank original page is inserted at the end of a section before the section break so as to lay out the first original page of a section after the section break at the start of a new surface of a print sheet when original pages are laid out in accordance with a designated layout.

13 Claims, 49 Drawing Sheets

FIG. 4A

| NO | ATTRIBUTE INFORMATION | | REMARKS |
|---|---|---|---|
| 1 | PRINTING METHOD | SINGLE-SIDED / DOUBLE-SIDED / BOOKBINDING PRINTING | |
| 2 | PAPER SIZE | ORIGINAL SIZE / FIXED SIZE | • Z-FOLD IS DESIGNATED WHEN "A4 + A3", "B4 + B3", OR "LETTER + LEDGER (11 × 17)" IS DESIGNATED<br>• ORIGINAL SIZE OF FIRST CHAPTER / PAGE IS AUTOMATICALLY SELECTED WHEN BOOKBINDING PRINTING OR N-up PRINTING IS DESIGNATED |
| 3 | PAPER DIRECTION | PORTRAIT / LANDSCAPE | • SELECTABLE ONLY FOR FIXED SIZE |
| 4 | BINDING MARGIN / BINDING DIRECTION | | • SHIFT / ENLARGEMENT & REDUCTION CAN BE DESIGNATED |
| 5 | N-up PRINTING | NUMBER OF PAGES / LAYOUT ORDER / BOUNDARY / LAYOUT POSITION, etc. | • LAYOUT POSITION : NINE PATTERNS<br>• X1 PRINTING CAN BE DESIGNATED |
| 6 | ENLARGEMENT / REDUCTION | ON / OFF | ON / OFF CAN BE AUTOMATICALLY DESIGNATED WHEN PAPER SIZE IS FIXED SIZE OR N-up PRINTING IS SELECTED |
| 7 | WATERMARK | | • WATERMARK CAN BE DESIGNATED INDIVIDUALLY IN LOGICAL OR PHYSICAL PAGES<br>• ALL CHAPTERS / PAGES ARE TARGETED |

FIG. 4B

| | | |
|---|---|---|
| 8 | HEADER / FOOTER | • HEADER / FOOTER CAN BE DESIGNATED INDIVIDUALLY IN LOGICAL OR PHYSICAL PAGES<br>• ALL CHAPTERS / PAGES ARE TARGETED |
| 9 | DISCHARGE METHOD | STAPLE / PUNCH HOLE | • STAPLING / PUNCHING ONLY IN SINGLE- / DOUBLE-SIDED PRINTING<br>• STAPLING AT ONE / TWO POSITIONS |
| 10 | DETAILS OF BOOKBINDING | OPENING DIRECTION / SADDLE STITCH / ENLARGEMENT & REDUCTION DESIGNATION / BINDING MARGIN / FASCICLE DESIGNATION, etc. | • ONLY IN BOOKBINDING PRINTING |
| 11 | FRONT / BACK COVER | | • PRINTING IS DESIGNATED FOR 1/2 FRONT COVER OR 1/2 BACK COVER<br>• FEED PORT (INCLUDING INSERTER) IS DESIGNATED |
| 12 | INDEX SHEET | | • PRINTING OF CHARACTER STRING ON INDEX PORTION OR ANNOTATION ON INDEX SHEET CAN BE SET<br>• BOOKBINDING CANNOT BE DESIGNATED |
| 13 | SLIP SHEET | | • FEED PORT (INCLUDING INSERTER) IS DESIGNATED<br>• ORIGINAL DATA CAN BE PRINTED ON INSERTED PAPER<br>• BOOKBINDING CANNOT BE DESIGNATED |
| 14 | CHAPTERING | "NONE" / "PAGE BREAK" / "PAPER CHANGE" | • "PAPER CHANGE" IS FIXED WHEN INDEX SHEET OR SLIP SHEET IS DESIGNATED<br>• "PAPER CHANGE" IN SINGLE-SIDED PRINTING |

FIG. 5

| NO | ATTRIBUTE INFORMATION | | REMARKS |
|---|---|---|---|
| 1 | PAPER SIZE | ORIGINAL SIZE / FIXED SIZE | • "PAPER CHANGE" IS AUTOMATICALLY DESIGNATED WHEN FIXED SIZE IS SELECTED<br>• WHEN A PLURALITY OF PAPER SHEETS ARE SELECTED BY BOOK, PAPER SIZE CAN BE CHANGED TO ONLY DESIGNATED PAPER. PAPER SIZE CAN BE CHANGED EVEN WITH DESIGNATION COMPLYING WITH BOOK |
| 2 | PAPER DIRECTION | PORTRAIT / LANDSCAPE | • SELECTABLE ONLY FOR FIXED SIZE |
| 3 | N-up PRINTING | NUMBER OF PAGES / LAYOUT ORDER / BOUNDARY / LAYOUT POSITION, etc. | • LAYOUT POSITION : NINE PATTERNS<br>• X1 PRINTING CAN BE DESIGNATED |
| 4 | ENLARGEMENT / REDUCTION | ON / OFF | • ON/OFF CAN BE AUTOMATICALLY DESIGNATED WHEN PAPER SIZE IS FIXED SIZE OR N-up PRINTING IS SELECTED |
| 5 | WATERMARK | DISPLAY / NON-DISPLAY | • WHETHER TO DISPLAY ALL WATERMARKS DESIGNATED BY BOOK IS DESIGNATED |
| 6 | HEADER / FOOTER | DISPLAY / NON-DISPLAY | • WHETHER TO DISPLAY ALL HEADERS / FOOTERS DESIGNATED BY BOOK IS DESIGNATED |
| 7 | DISCHARGE METHOD | STAPLE | • STAPLE CAN BE SET OFF WHEN STAPLE IS DESIGNATED BY BOOK. DEFAULT VALUE IS "ON" |

FIG. 6

| NO | ATTRIBUTE INFORMATION | | REMARKS |
|---|---|---|---|
| 1 | PAGE ROTATION DESIGNATION | | • 0°/90°/180°/270° CAN BE DESIGNATED |
| 2 | WATERMARK | DISPLAY / NON-DISPLAY | • WHETHER TO DISPLAY ALL WATERMARKS DESIGNATED BY BOOK IS DESIGNATED |
| 3 | HEADER / FOOTER | DISPLAY / NON-DISPLAY | • WHETHER TO DISPLAY ALL HEADERS / FOOTERS DESIGNATED BY BOOK IS DESIGNATED |
| 4 | ZOOM | 50% - 200% | • MAGNIFICATION RELATIVE TO SIZE WHICH IS FIT IN VIRTUAL LOGICAL PAGE REGION AND SET AS 100% IS DESIGNATED |
| 5 | LAYOUT POSITION | | • NINE FIXED PATTERNS AND ARBITRARY POSITION CAN BE DESIGNATED |
| 6 | ANNOTATION | | |
| 7 | VARIABLE ITEM | | |
| 8 | PAGE DIVISION | | |

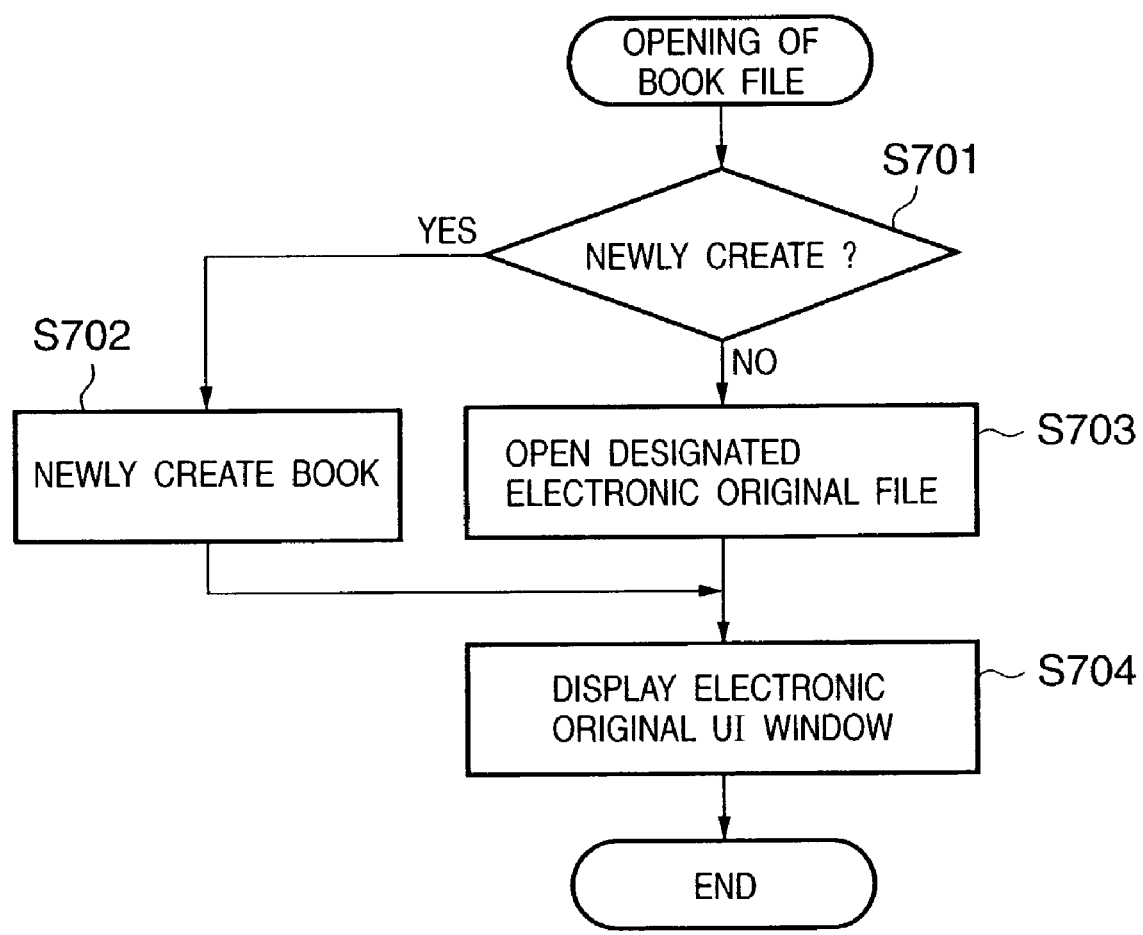

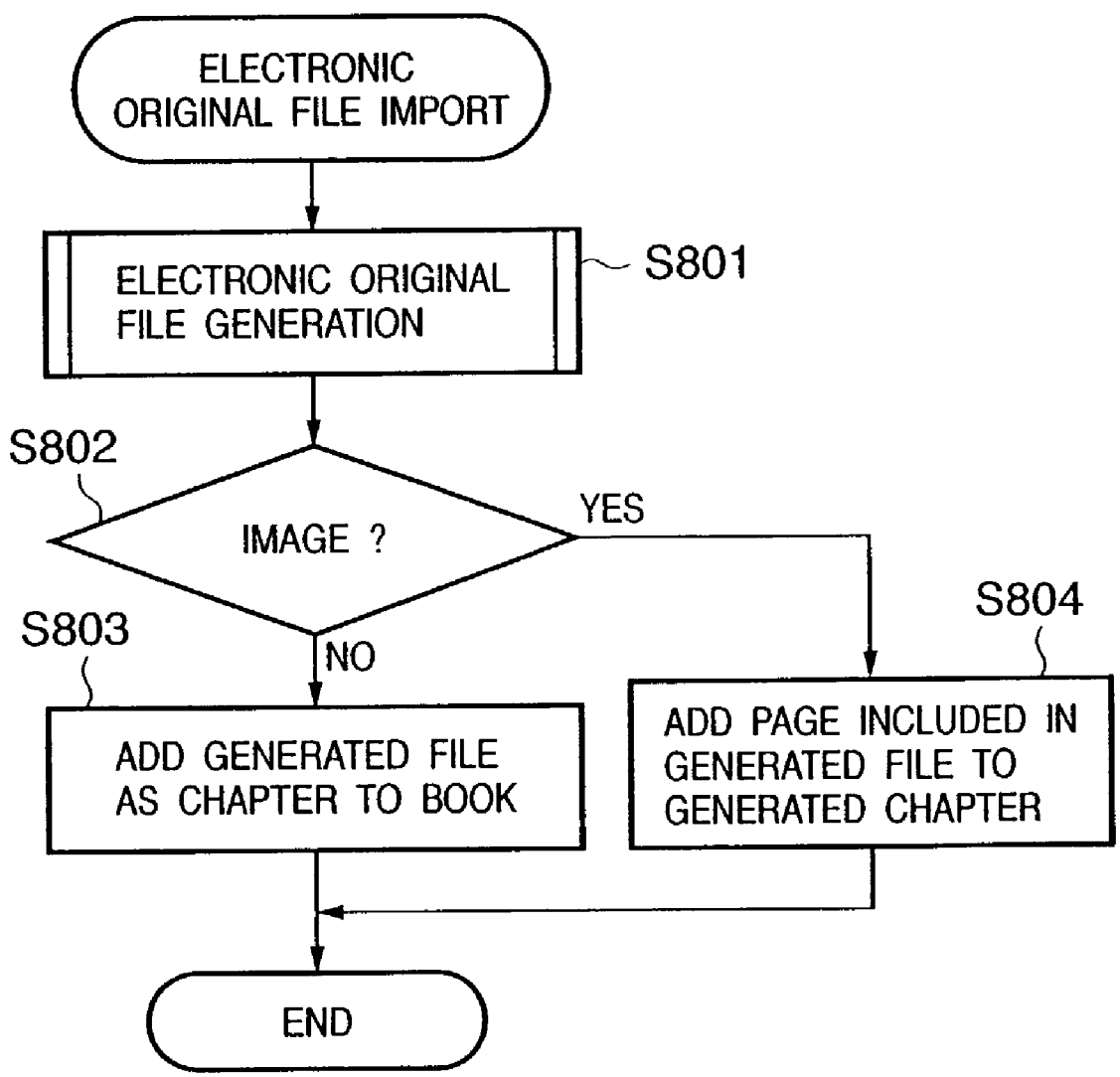

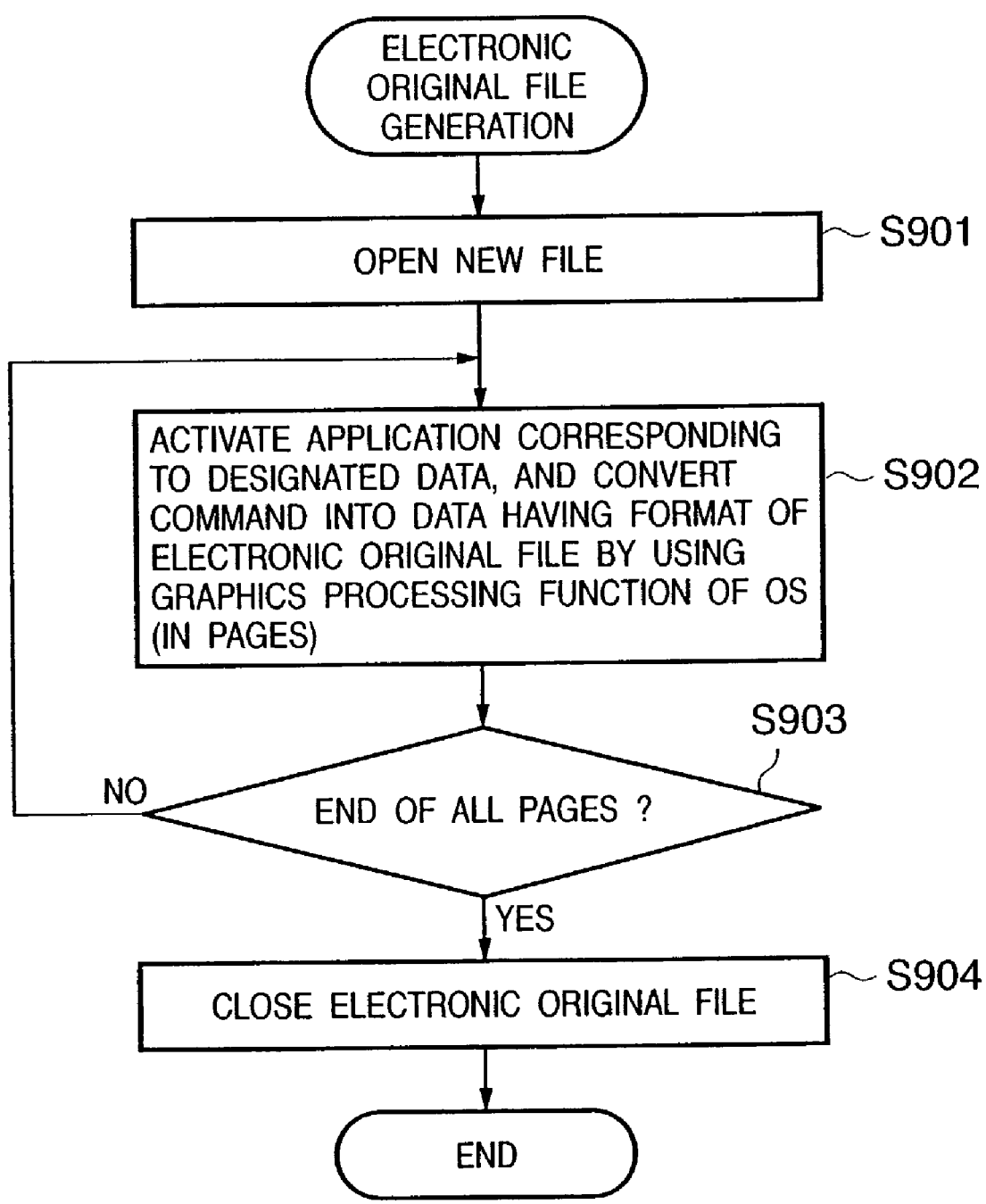

F I G. 15
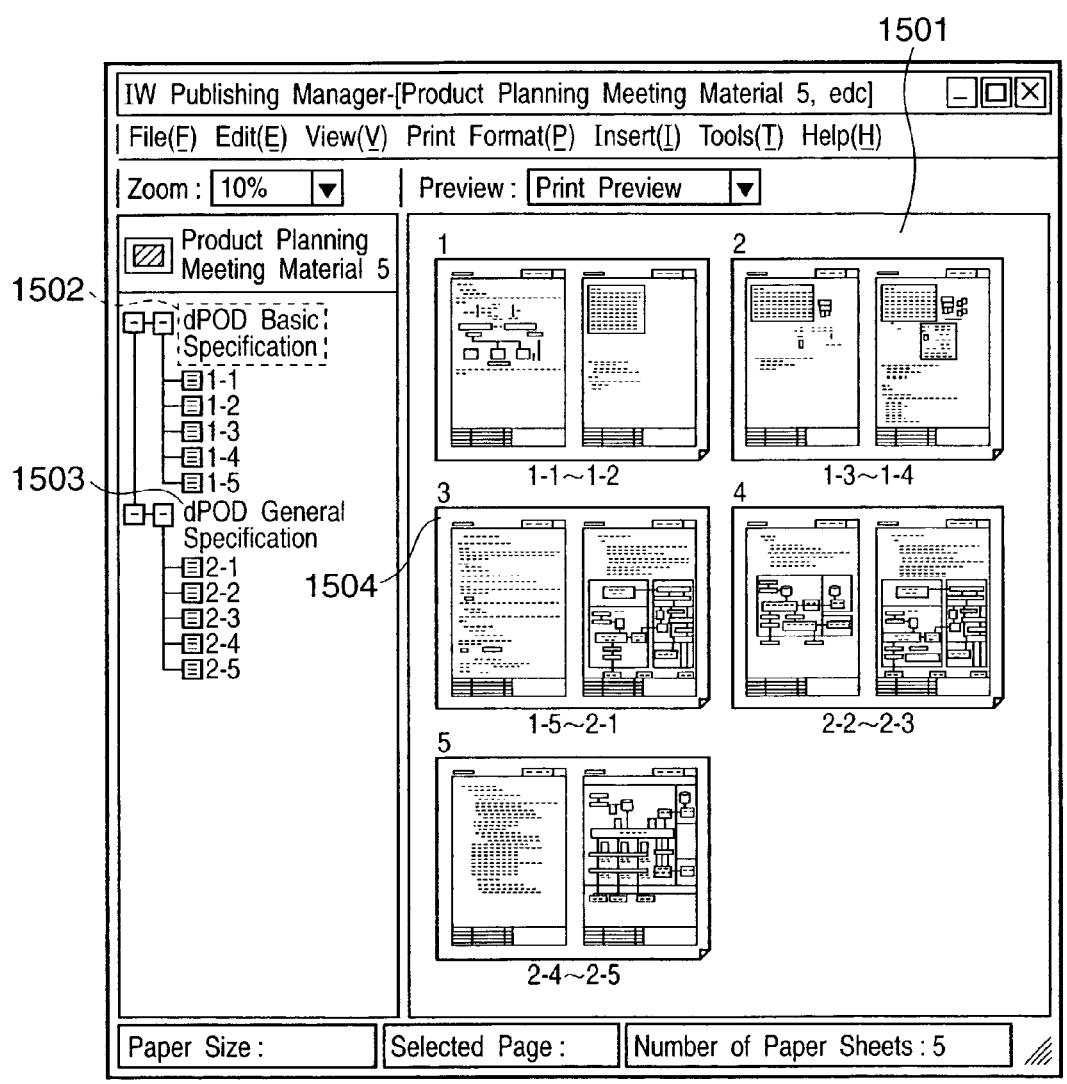

F I G. 17
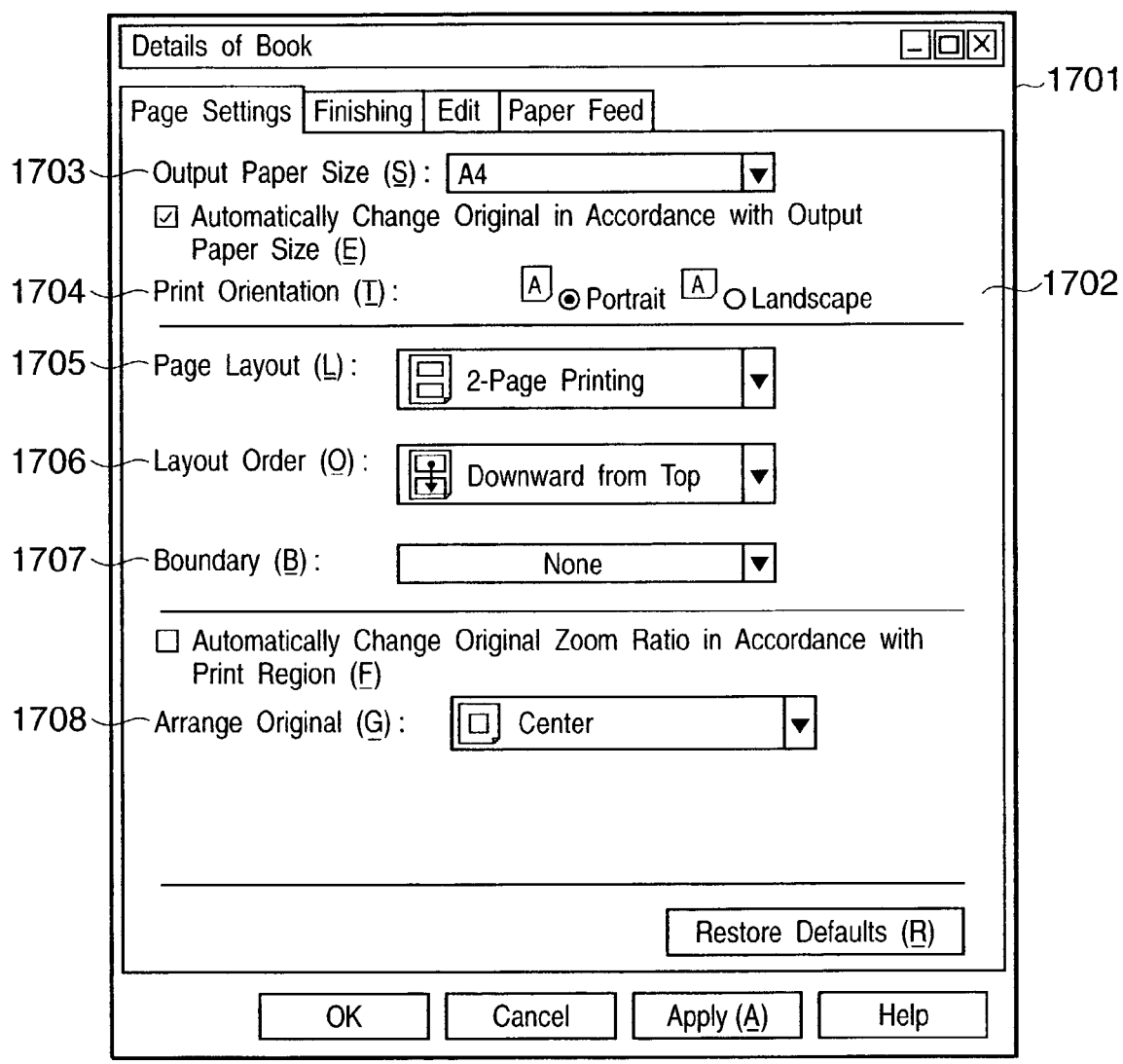

FIG. 19

| Detailed Settings of Book |
|---|
| Page Settings | Finishing | Edit | Paper Feed |

Printing Method (Y): — 1901
- ○ Single-Sided Printing
- ○ Double-Sided Printing
- ◉ Bookbinding Printing — 1902

Opening Direction (O): — 1903
[Open to Left ▶]

- ☑ Saddle Stitch (D)
- ☐ Set Binding Margin (G)
- ☐ Shift Original to Binding Position (B)      ☐ Use Trimmer (T)   [5] mm (0~30)

Adjust Original (J):
- ◉ Reduce in Accordance with Print Region
- ○ Move in Accordance with Binding Width Bookbinding Printing Method (M): — 1905
- ◉ Print All Pages at Once
- ○ Print in Several Bundles   [16] Sheets in Bundle (1 to 99 Sheets)

Chaptering (X): — 1906
[Change Paper ▶]

[OK]   [Cancel]   [Apply (A)]   [Restore Defaults]   [Help]

FIG. 20

| | | 2000 |
|---|---|---|
| 2001 | OUTPUT PAPER SIZE | A4 |
| 2002 | OUTPUT PAPER ORIENTATION | PORTRAIT |
| 2003 | PAGE LAYOUT | ONE PAGE / SHEET |
| 2004 | LAYOUT ORDER | FROM LEFT TO RIGHT |
| 2005 | BOUNDARY | NONE |
| 2006 | ORIGINAL ARRANGEMENT | CENTER |
| 2007 | CHAPTERING | NONE |
| 2008 | PRINTING METHOD | SINGLE-SIDED PRINTING |
| 2009 | BINDING DIRECTION | LONGITUDINAL BINDING (LEFT) |
| 2010 | BINDING WIDTH | 10 mm |
| 2011 (SINGLE-/DOUBLE-SIDED) | STAPLE | ALL PAGES AT ONCE |
| 2012 | STAPLE POSITION | UPPER LEFT (ONE PORTION) |
| 2013 | PUNCH | SET |
| 2014 | Z-FOLD | NONE |
| BOOKBINDING | OPENING DIRECTION | |
| BOOKBINDING | SADDLE STITCH | |
| BOOKBINDING | FASCICLE | |

| | | |
|---|---|---|
| | OUTPUT PAPER SIZE | A4 |
| | OUTPUT PAPER ORIENTATION | PORTRAIT |
| | PAGE LAYOUT | ONE PAGE / SHEET |
| | LAYOUT ORDER | FROM LEFT TO RIGHT |
| | BOUNDARY | NONE |
| | ORIGINAL ARRANGEMENT | CENTER |
| | CHAPTERING | NONE |
| 2101 | PRINTING METHOD | BOOKBINDING PRINTING |
| SINGLE- / DOUBLE-SIDED | BINDING DIRECTION | |
| | BINDING WIDTH | |
| | STAPLE | |
| | STAPLE POSITION | |
| | PUNCH | |
| | Z-FOLD | |
| BOOKBINDING | OPENING DIRECTION (2102) | OPEN TO LEFT |
| | SADDLE STITCH (2103) | SET |
| | FASCICLE (2104) | ALL PAGES AT ONCE |

APPARATUS AND METHOD FOR INSERTING BLANK DOCUMENT PAGES IN A PRINT LAYOUT APPLICATION

FIELD OF THE INVENTION

The present invention relates to a document processing apparatus and method which combine, into one document, output data generated by various programs such as a document processing program and image editing program, and provide an editing function for the document.

BACKGROUND OF THE INVENTION

Different types of data such as characters, tables, and images require different structures which define the data and different editing operations for the data. Various application programs are provided in accordance with the type of data. The user uses different applications for different types of data: a character processing program in order to edit characters, a spreadsheet program in order to edit tables, and an image editing program in order to edit images.

In this way, the user generally uses different application programs for different types of data. In general, a document to be created by the user is made up of a plurality of types of data such as characters and tables, or characters and images, rather than a document formed from only one type of data such as characters, tables, or images. To create a target document containing a plurality of types of data, the user must use the printing functions of various applications to print data by the respective applications, and combine the print materials in a desired order.

Some programs such as so-called "Office Suite" which forms one integrated application from various applications provide a function of combining data generated by respective applications into one document. The use of the integrated application allows the user to combine data created by respective applications into one target document by using a specific application included in the integrated application.

However, to assign page numbers to pages when the user creates one target document by combining print materials generated by various applications, he/she must print out all necessary data, combine them into a document, and determine page numbers. Each application writes determined page numbers on respective pages (to be referred to as logical pages or original pages) of an original created by the application. Even if the application program has a function of assigning page numbers, the page numbers of discontinuous pages must be designated by the user. If the pages of the target document are rearranged, page numbers must be reassigned in accordance with the rearrangement. These pages must also be edited and printed again by an application when not data contents but merely the format is changed such that a plurality of original pages are combined into one page (to be referred to as a physical page or print page) as a print material, or single-sided printing is changed to double-sided printing.

Since an application which can manage data changes depending on the type of data, the user must manually provide an interface between applications. This means that much labor is demanded of the user, decreasing the productivity. The many manual operations readily generate errors.

The use of an integrated application for creating a target document enables arranging various data in the data state without printing them out. No heavy labor is required in comparison with creation of a target document by combining print materials. However, applications for editing and creating various data are restricted to ones included in the integrated application, so a user-desired application is not always exploited. A target document created by the integrated application is one document file, and management such as editing and output is done for each file. The application function poses many constraints on setting the format of part of the document file. For example, the user must change format settings at each portion where the format is changed, and print a target page again. This leads to much labor and low productivity, similar to the above-mentioned method.

When image data of one page of a document file are laid out and printed, the document file is continuously printed. A page break which designates to change pages or paper change which designates to change paper sheets cannot be inserted at the middle of a document. To realize a page break or paper change, the user must print a document, check the print material to determine a page break position or paper change position, and insert a blank page.

When a document is created for printing, even an application having a preview function before printing cannot preview the document in a format which reflects a designated layout. The user must change the layout after printing. Even if the user edits the document by referring to a print result after printing, it is difficult to make the print material coincide with data during editing.

The number of sheets necessary for printing changes depending on the layout, but cannot be known till actual printing.

When a printing apparatus to be used is equipped with a paper inserting function called an inserter, a page to be inserted cannot be identifiably displayed, and it is difficult to specify an object to be edited.

SUMMARY OF THE INVENTION

The present invention has been made in consideration of the above situation, and has as its first object to provide a document processing apparatus and method which enable creating and editing a document made up of data created by user-desired application programs, and increase the operability and document editing productivity.

It is the second object of the present invention to provide a document processing apparatus and method which automatically insert a blank page to always execute a page break or paper change at a chapter break, lay out the first original page after the break at the start of a print page or the start of paper to eliminate an operation of inserting a blank page by the user, can increase the user working efficiency and system productivity, and can create a high-quality document by preventing any human error.

It is the third object of the present invention to provide an information processing apparatus and method which enable creating and editing a document made up of data created by user-desired application programs, and increase the operability and document editing productivity.

It is the fourth object of the present invention to provide an information processing apparatus and method which can facilitate confirming an object to be edited on the display, and increase the editing operability.

It is the fifth object of the present invention to provide an information processing apparatus and method which allow obtaining the number of sheets necessary for printing in advance.

It is the sixth object of the present invention to provide an information processing apparatus and method which can identifiably display a page to be inserted when a printing apparatus to be used is equipped with a paper inserting function called an inserter.

To achieve the first to third objects, the present invention has the following arrangement.

There is provided a document processing apparatus which edits document data which can define a desired section using an original page as a unit of definition, comprising:

a determination unit which determines whether a page break is designated at a section break of the section;

an insertion unit which, when the page break is designated, inserts a blank original page at an end of a section before the section break so as to lay out a first original page of a section after the section break at a start of a new surface of a print sheet when original pages are laid out in accordance with a designated layout; and a layout unit which lays out the original pages of the document data including the blank page inserted by the insertion unit in accordance with the layout.

The apparatus preferably further comprises a second determination unit which determines whether paper change is designated at the section break of the section; and a second insertion unit which, when the paper change is designated, inserts a blank original page at the end of the section before the section break so as to lay out the first original page of the section after the section break at a start of a new print sheet when the original pages are laid out in accordance with the designated layout.

The layout preferably includes bookbinding printing designation using a designated number of sheets as a unit of bookbinding, and when the designated layout is bookbinding printing, the determination unit, the insertion unit, the second determination unit, and the second insertion unit regard sheets in a bookbinding state as print sheets, and perform determination and insertion.

The apparatus preferably further comprises a preview display unit which displays a state in which the document data are printed in accordance with the layout.

The apparatus preferably further comprises a print control unit which prints the document data in accordance with the layout.

The apparatus preferably further comprises a conversion unit which converts output data of an application program into the original pages as the section every output data file.

To achieve the fourth to sixth objects, the present invention has the following arrangement.

There is provided an information processing apparatus which performs print setting including print format setting of a print material to be printed by a printing apparatus, for document data generated on the basis of drawing data output from an application, comprising:

a management unit which manages original pages serving as pages generated by the application; and a number display unit which displays page numbers of the original pages on print surfaces on which the document data are laid out when previewing a preview image representing the print surfaces on which the document data are laid out and a print surface of a paper sheet inserted by the printing apparatus.

The number display unit preferably displays a range of page numbers of the original pages on the print surface when a plurality of original pages are laid out on each of the print surfaces on which the document data are laid out.

There is provided an information processing apparatus which performs print setting including print format setting of a print material to be printed by a printing apparatus, for document data generated on the basis of drawing data output from an application, comprising:

a management unit which manages the number of paper sheets to be printed by the printing apparatus; and a number display unit which displays serial numbers of the paper sheets by specifying a first print surface of a single paper sheet among print surfaces on which the document data are laid out, and does not display any serial numbers of the paper sheets on a print surface of an inserted paper sheet when previewing a preview image representing the print surfaces on which the document data are laid out and the print surface of the paper sheet inserted by the printing apparatus.

Other features and advantageous of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A and 4B are tables showing a list of book attributes;

FIG. 5 is a table showing a list of chapter attributes;

FIG. 6 is a table showing a list of page attributes;

FIG. 7 is a flow chart showing procedures of opening a book file;

FIG. 8 is a flow chart showing procedures of importing an electronic original file into a book file;

FIG. 9 is a flow chart showing procedures of converting application data into an electronic original file;

FIG. 15 is a view showing still another example of the display window according to the embodiment;

FIG. 17 is a view showing an example of a print format setting dialog according to the embodiment;

FIG. 19 is a view showing still another example of the print format setting dialog according to the embodiment;

FIG. 20 is a view showing an example of a structure which stores print format setting contents according to the embodiment;

FIG. 21 is a view showing another example of the structure which stores print format setting contents according to the embodiment;

DETAILED DESCRIPTION OF THE PREFERRED EMBODIMENTS

[First Embodiment]

<General Description of System>

A document processing system according to the first embodiment suited to an information processing system of the present invention will be generally described with reference to FIGS. 1 to 12. This document processing system converts a data file created by a general application into an electronic original file by an electronic original writer. A bookbinding application provides a function of editing the electronic original file. Details of the system will be explained below.

<System Configuration and Operation>

Figure 1:
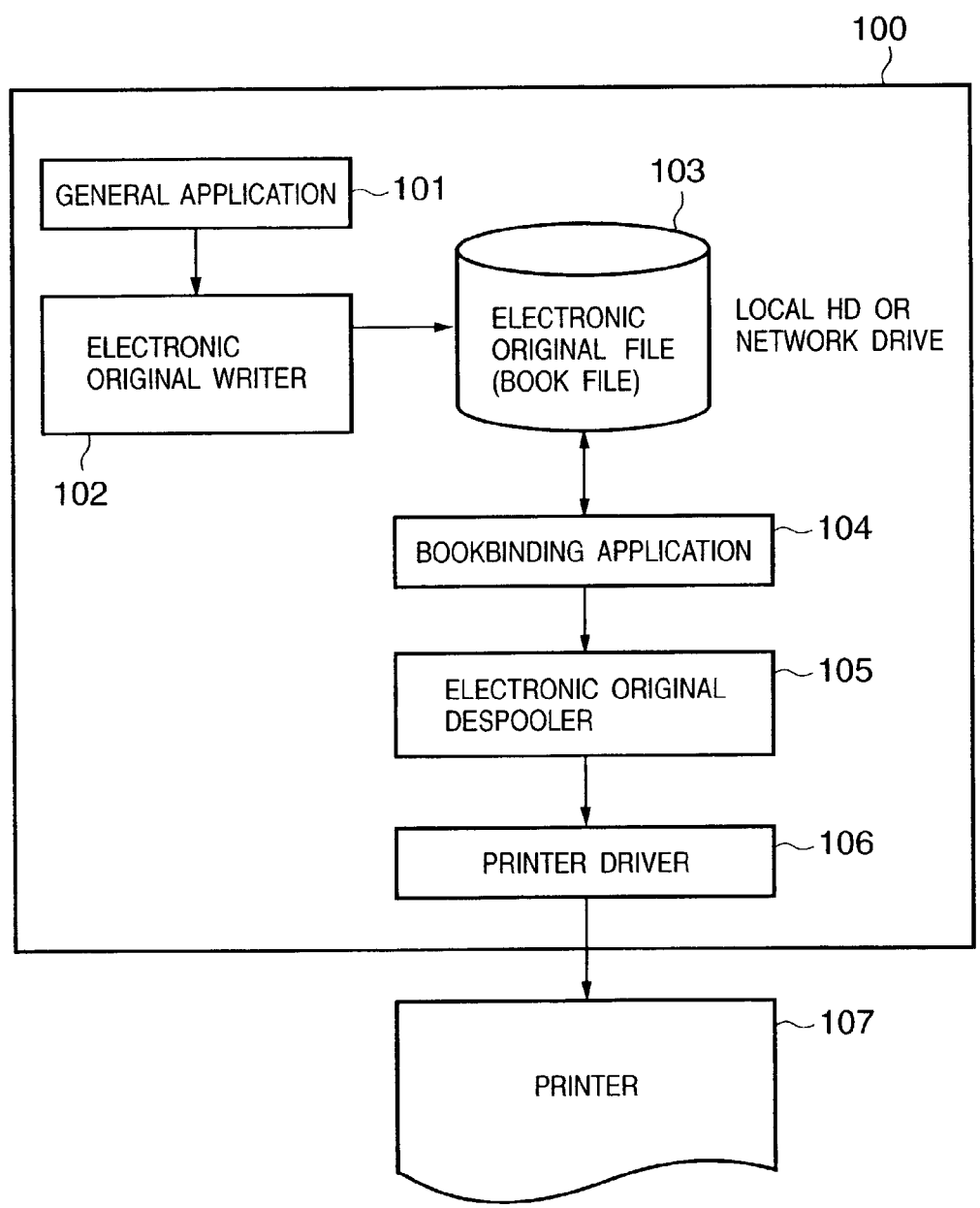
FIG. 1 is a block diagram showing a stand-alone document processing system.

FIG. 1 is a block diagram showing the software structure of the document processing system according to this embodiment. The document processing system is implemented by a digital computer 100 (to be also referred to as a host computer hereinafter) as an embodiment suited to the information processing apparatus of the present invention. A general application 101 is an application program which provides functions such as wordprocessing, spreadsheet, photo-retouch, draw, paint, presentation, and text editing. The general application 101 has a printing function corresponding to the OS. Such applications utilize a predetermined interface (generally called GDI) provided by the OS (Operating System) in printing application data such as created document data or image data. To print created data, the general application 101 transmits an output command (called a GDI function) which is determined in advance for the output module of the OS providing the interface and has an OS-dependent format. The output module which has received the output command converts the command into a format processible by an output device such as a printer, and outputs the converted command (called a DDI function). Since the format processible by the output device changes depending on the type of device, the manufacturer, and the model, a device driver is provided for each device. The OS converts a command by using the device driver, generates print data, and combines print data by JL (Job Language) to generate a print job. When the OS is Microsoft Windows, the output module is a GDI module.

An electronic original writer 102 is an improvement of the device driver, and is a software module provided to implement the document processing system. The electronic original writer 102 does not target a specific output device, and converts an output command into a format processible by a bookbinding application 104 or printer driver 106 (to be described later). The format (to be referred to as an electronic original format hereinafter) converted by the electronic original writer 102 is not particularly limited as far as each original page can be expressed by a detailed format. Of substantial standard formats, for example, the PDF format by Adobe Systems and the SVG format can be adopted as electronic original formats. When the application 101 utilizes the electronic original writer 102, the electronic original writer 102 is designated as a device driver used for output, and then caused to execute printing. An electronic original file created by the electronic original writer 102 does not have a complete electronic original file format. For this reason, the electronic original writer 102 is designated as a device driver by the bookbinding application 104, and executes conversion of application data into an electronic original file under the management of the bookbinding application 104. The bookbinding application 104 completes a new incomplete electronic original file generated by the electronic original writer 102 as an electronic original file having the following format. In case of necessity to definitely discriminate these files, a file created by the electronic original writer 102 will be called an electronic original file, and an electronic original file given a structure by the bookbinding application will be called a book file. If these files need not be particularly discriminated, a document file generated by an application, an electronic original file, and a book file are called document files (or document data).

As described above, the electronic original writer 102 is designated as a device driver, and the general application 101 prints the data. Application data is converted into an electronic original format in pages (to be referred to as logical pages or original pages hereinafter) defined by the application 101. The converted data is stored as an electronic original file 103 in a storage medium such as a hard disk. The hard disk may be the local drive of the computer which implements the document processing system of this embodiment, or when the computer is connected to a network, may be a drive provided on the network.

The bookbinding application 104 provides the user with a function of loading and editing the electronic original file or book file 103. The bookbinding application 104 provides no function of editing the contents of each page, but a function of editing a chapter or book structure (to be described later) made up of pages as a minimum unit.

To print the book file 103 edited by the bookbinding application 104, the bookbinding application 104 activates an electronic original despooler 105. The electronic original despooler 105 is a program module installed into the computer together with the bookbinding application. The electronic original despooler 105 is a module used to output drawing data to a printer driver in printing a document (book file) used by the bookbinding application. The electronic original despooler 105 reads out a designated book file from the hard disk. To print each page in a format described in the book file, the electronic original despooler 105 generates an output command complying with the output module of the OS described above, and outputs the command to the output module (not shown). At this time, the printer driver 106 of a printer 107 used as an output device is designated as a device driver. The output module converts the output command received using the designated printer driver 106 of the printer 107 into a device command interpretable by the printer 107. The device command is transmitted to the printer 107, which prints an image corresponding to the command.

Figure 2:
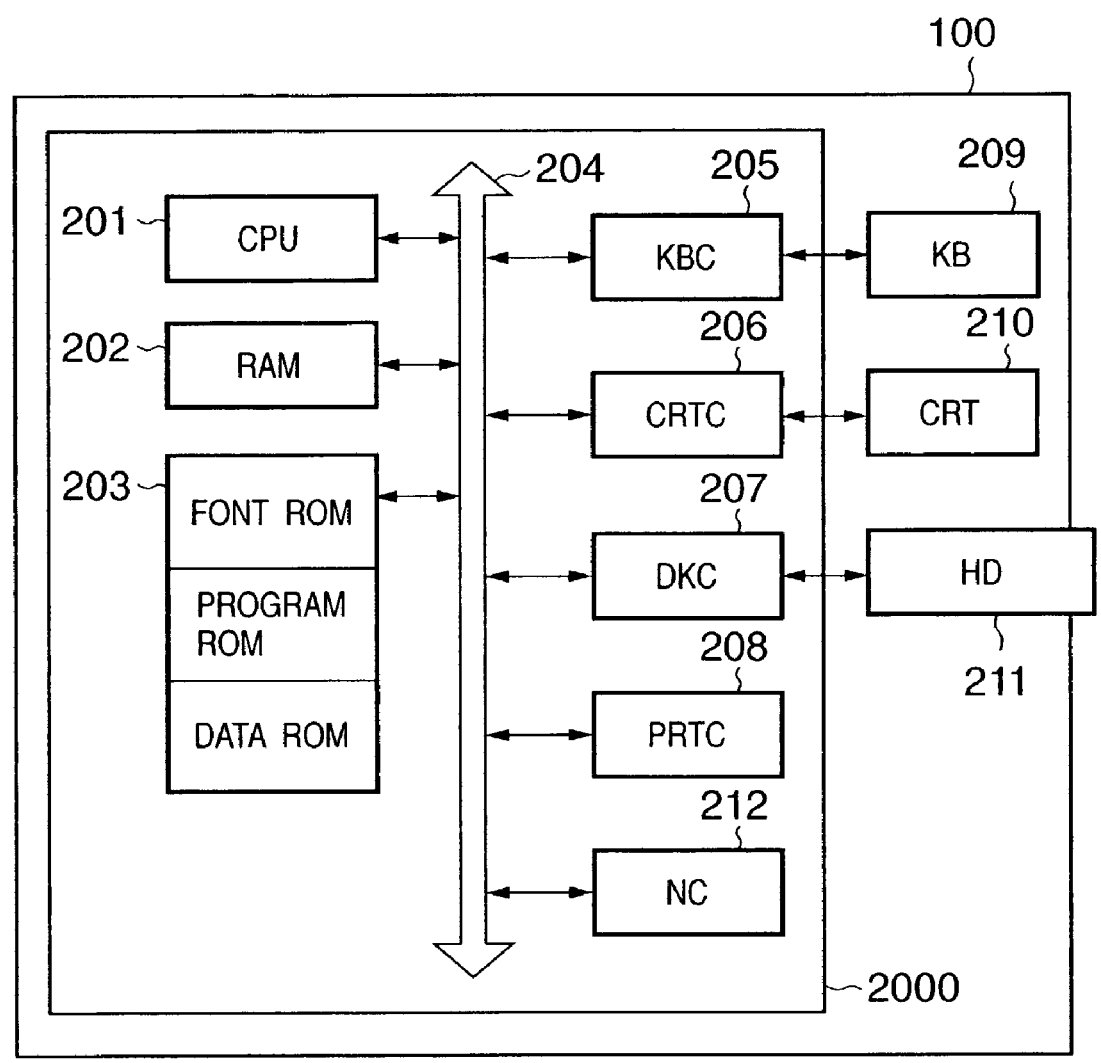
FIG. 2 is a block diagram showing a computer which implements the document processing system.

FIG. 2 is a block diagram showing the hardware of the computer 100. In FIG. 2, a CPU 201 executes a program such as an OS, general application, or bookbinding application which is stored in the program ROM of a ROM 203 or loaded from a hard disk 211 to a RAM 202, and realizes the software structure in FIG. 1 or flow chart procedures (to be described later). The RAM 202 functions as the main memory or work area of the CPU 201. A keyboard controller (KBC) 205 controls a key input from a keyboard 209 or a pointing device (not shown). A CRT controller (CRTC) 206 controls the display on a CRT display 210. A disk controller (DKC) 207 controls access to the hard disk (HD) 211 or floppy disk (FD) which stores a boot program, various applications, font data, user files, editing files (to be described later), and the like. A PRTC 208 controls signal exchange with the connected printer 107. An NC 212 is connected to a network, and executes communication control processing with another device connected to the network.

<Electronic Original Data Format>

Before the bookbinding application 104 is described in detail, the book file data format will be explained. The book file has a three-layered structure similar to a paper-medium book. The upper layer is called a "book", resembles one book, and defines the attributes of the entire book. The intermediate layer corresponds to a chapter in the book, and is also called a "chapter". As for each chapter, its attributes can be defined. The lower layer is a "page", and corresponds to each page defined by an application program. As for each page, its attributes can be defined. One book may include a plurality of chapters, and one chapter may include a plurality of pages.

Figure 3A:
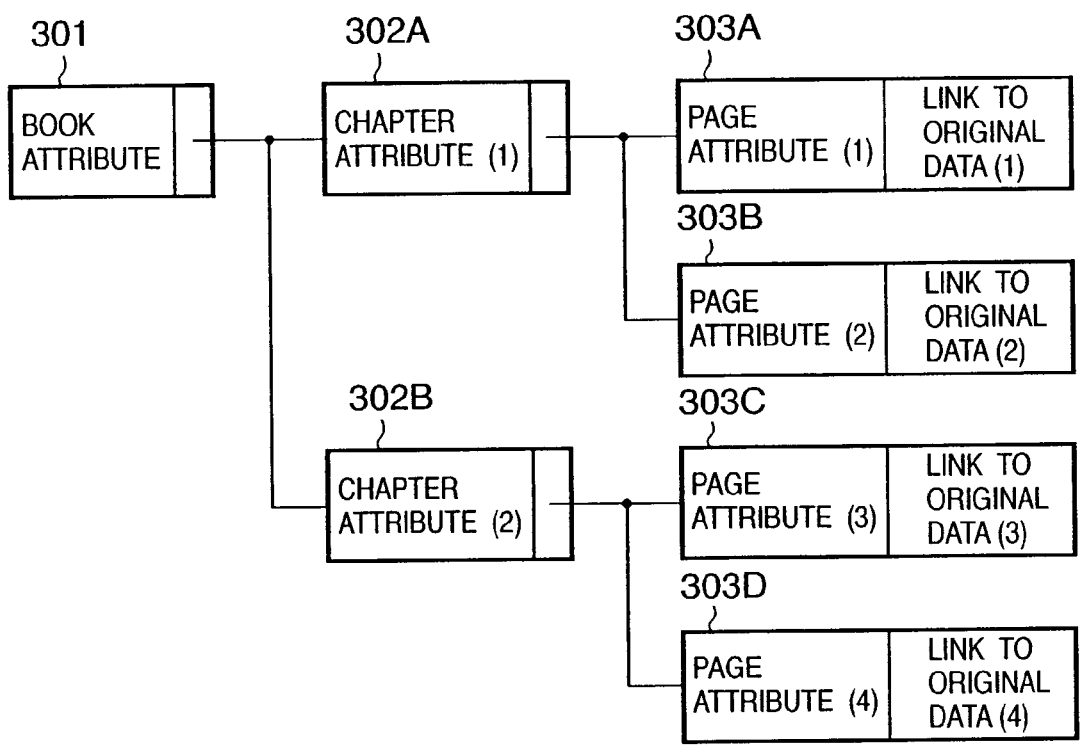
FIGS. 3A and 3B are views showing an example of a book file structure.

FIG. 3A is a block diagram schematically showing an example of the book file format. In the book file of this example, a book, chapter, and page are represented by corresponding nodes. One book file includes one book. The book and chapter are a concept for defining a book structure, and contain, as entities, defined attribute values and links to lower layers. The page has, as an entity, data of each page output from an application program. In addition to an attribute value, the page contains the entity of an original page (original page data) and a link to each original page data. In some cases, a print page to be output onto a paper medium or the like includes a plurality of original pages. This structure is displayed not by a link but by an attribute in the book, chapter, or page layer.

Figure 3B:
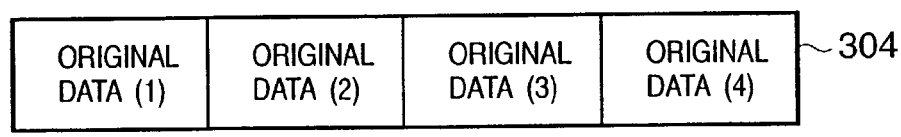

In FIGS. 3A and 3B, a book 301 defines a book attribute, and is linked to two chapters 302A and 302B. These links display that the chapters 302A and 302B are included in the book 301. The chapter 302A is linked to pages 303A and 303B, which represents that the chapter 302A includes these pages. The pages 303A and 303B define attribute values, and contain links to original page data (1) and (2) serving as entities. These links represent data (1) and (2) of original page data 304 shown in FIG. 3B, and display that the entities of the pages 303A and 303B are original page data (1) and (2).

FIGS. 4A and 4B show lists of book attributes. As for an item which can be defined repetitively on a lower layer, the attribute value of the lower layer is preferentially adopted. As for an item contained in only the book attribute, a value defined in the book attribute is effective over the book. An item repetitively defined on a lower layer is a default value used when this item is not defined in the lower layer. Each item shown in FIGS. 4A and 4B does not always correspond to one concrete item, but may contain a plurality of relevant items.

FIG. 5 shows a list of chapter attributes, and FIG. 6 shows a list of page attributes. The relationship between chapter attributes and page attributes is the same as that between book attributes and lower layer attributes.

Items unique to book attributes are six items: printing method, details of bookbinding, front/back cover, index sheet, slip sheet, and chaptering. These items are defined over the book. As printing method attributes, three values: single-sided printing, double-sided printing, and bookbinding printing can be designated. Bookbinding printing is a method of printing data in a format which allows bookbinding by bundling a separately designated number of paper sheets, folding the bundle into two, and binding the bundle. As detailed bookbinding attributes, the opening direction and the number of paper sheets to be bundled can be designated when bookbinding printing is designated.

The front/back cover attribute includes designation of adding paper sheets serving as front and back covers when an electronic original file combined as a book is printed, and designation of contents to be printed on the added paper sheets. The index sheet attribute includes designation of inserting a deckle-edged index sheet separately prepared in a printing apparatus for chaptering, and designation of contents to be printed on the index (deckle-edged) sheet. This attribute becomes effective when a printing apparatus to be used is equipped with an inserter having an inserting function of inserting a paper sheet prepared separately from a print paper sheet into a desired position, or when a plurality of sheet cassettes can be used. This also applies to the slip sheet attribute.

The slip sheet attribute includes designation of inserting a paper sheet fed from an inserter or sheet feed cassette for chaptering, and designation of a sheet feed source when a slip sheet is inserted.

The chaptering attribute includes designation of whether to use a new paper sheet, use a new print page, or do nothing particular at a chapter break. In single-sided printing, the use of a new paper sheet and the use of a new print page are the same. In double-sided printing, a continuous chapter is not printed on one paper sheet if "the use of a new paper sheet" is designated, but may be printed on the upper and lower surfaces of one paper sheet if "the use of a new print page" is designated.

As for the chapter attribute, there is no item unique to the chapter, and all items overlap those of the book attribute. If the definition of the chapter attribute is different from that of the book attribute, a value defined by the chapter attribute precedes. Items common to only the book and chapter attributes are five items: paper size, paper direction, N-up printing designation, enlargement/reduction, and discharge method. The N-up printing designation attribute is an item for designating the number of original pages included in one print page. Layouts which can be designated are 1×1, 1×2, 2×2, 3×3, 4×4, and the like. The discharge method attribute is an item for designating whether to staple discharged paper sheets. The effectiveness of this item depends on whether the printing apparatus has a staple function.

Items unique to the page attribute are a page rotation attribute, zoom, layout designation, annotation, and page division. The page rotation attribute is an item for designating the rotation angle when an original page is laid out on a print page. The zoom attribute is an item for designating the zoom ratio of an original page. The zoom ratio is designated based on a virtual logical page region size=100%. The virtual logical page region is a region occupied by one original page when original pages are laid out in accordance with N-up designation or the like. For example, the virtual logical page region is a region corresponding to one print page for 1×1, and a region obtained by reducing each side of one print page to about 70% for 1×2.

Attributes common to the book, chapter, and page are a watermark attribute and header/footer attribute. The watermark is a separately designated image or character string printed over data created by an application. The header and footer are watermarks printed at the upper and lower margins of each page. For the header and footer, items such as a page number, and time and date which can be designated by variables are prepared. Contents which can be designated by the watermark attribute and header/footer attribute are common to the chapter and page, but are different in the book. The book can set the contents of the watermark and header/footer, and designate how to print a watermark or header/footer throughout the book. To the contrary, the chapter and page can designate whether to print a watermark or header/footer set by the book on the chapter or page.

<Book File Generation Procedures>

The book file has the above-described structure and contents. Procedures of creating a book file by the bookbinding application 104 and electronic original writer 102 will be explained. Creation of a book file is realized as part of book file editing operation by the bookbinding application 104. FIG. 7 shows procedures when the bookbinding application 104 opens a book file.

Figure 11:
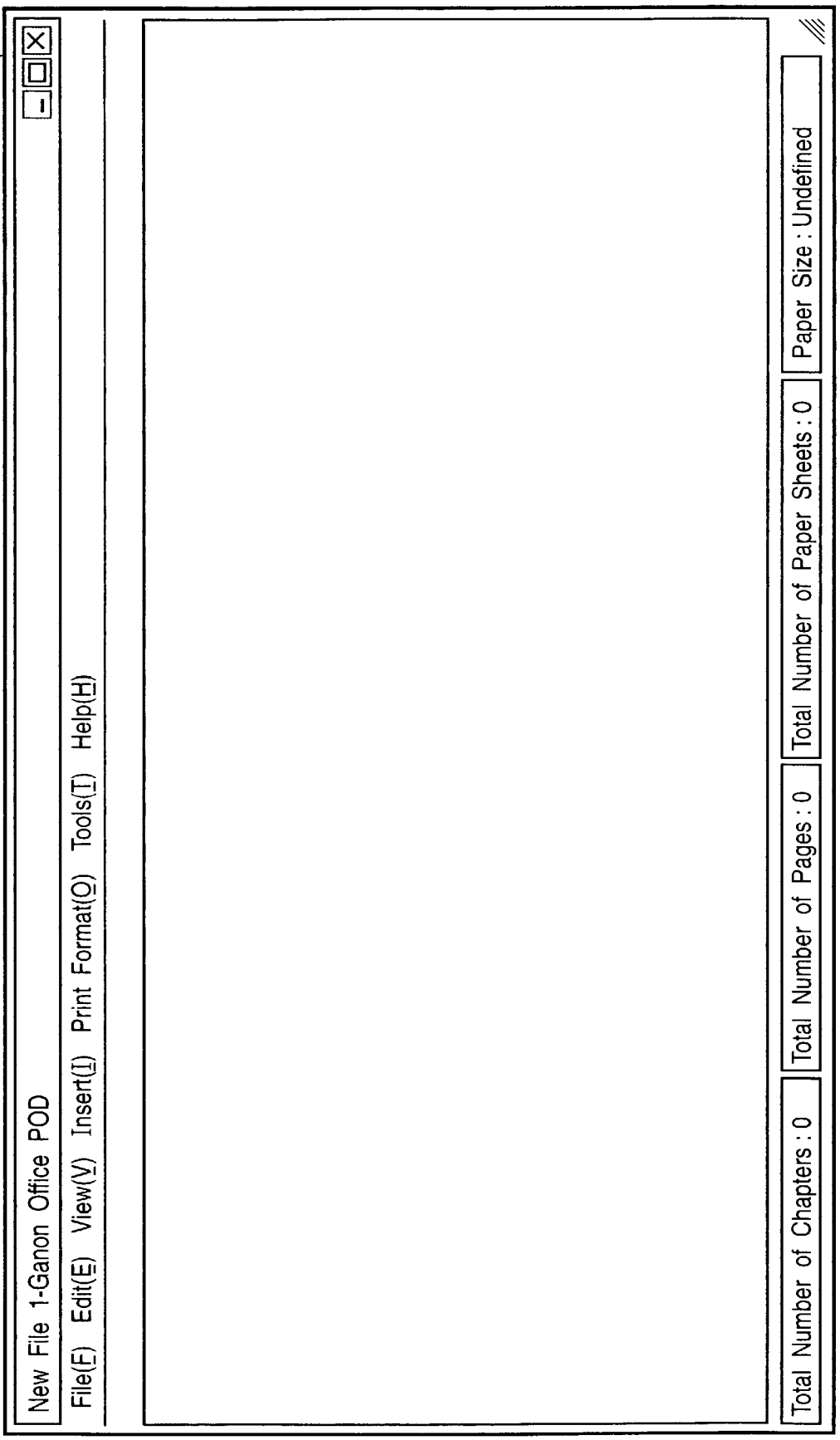
FIG. 11 is a view showing an example of a user interface window when a new book file is opened.

Whether a book file to be opened is one to be newly created or an existing one is checked (step S701). If YES in step S701, a book file including no chapter is newly created (step S702). In the example shown in FIGS. 3A and 3B, the newly created book file is a book node which has only the book node 301 without any link to a chapter node. As the book attribute, a set of attributes prepared in advance for creation of a new book file are applied. Then, a UI (User Interface) window for editing the new book file is displayed (step S704). FIG. 11 shows an example of the UI window when a book file is newly created. In this case, a UI window 1100 does not display any information because the book file does not have any substantial content.

Figure 10:
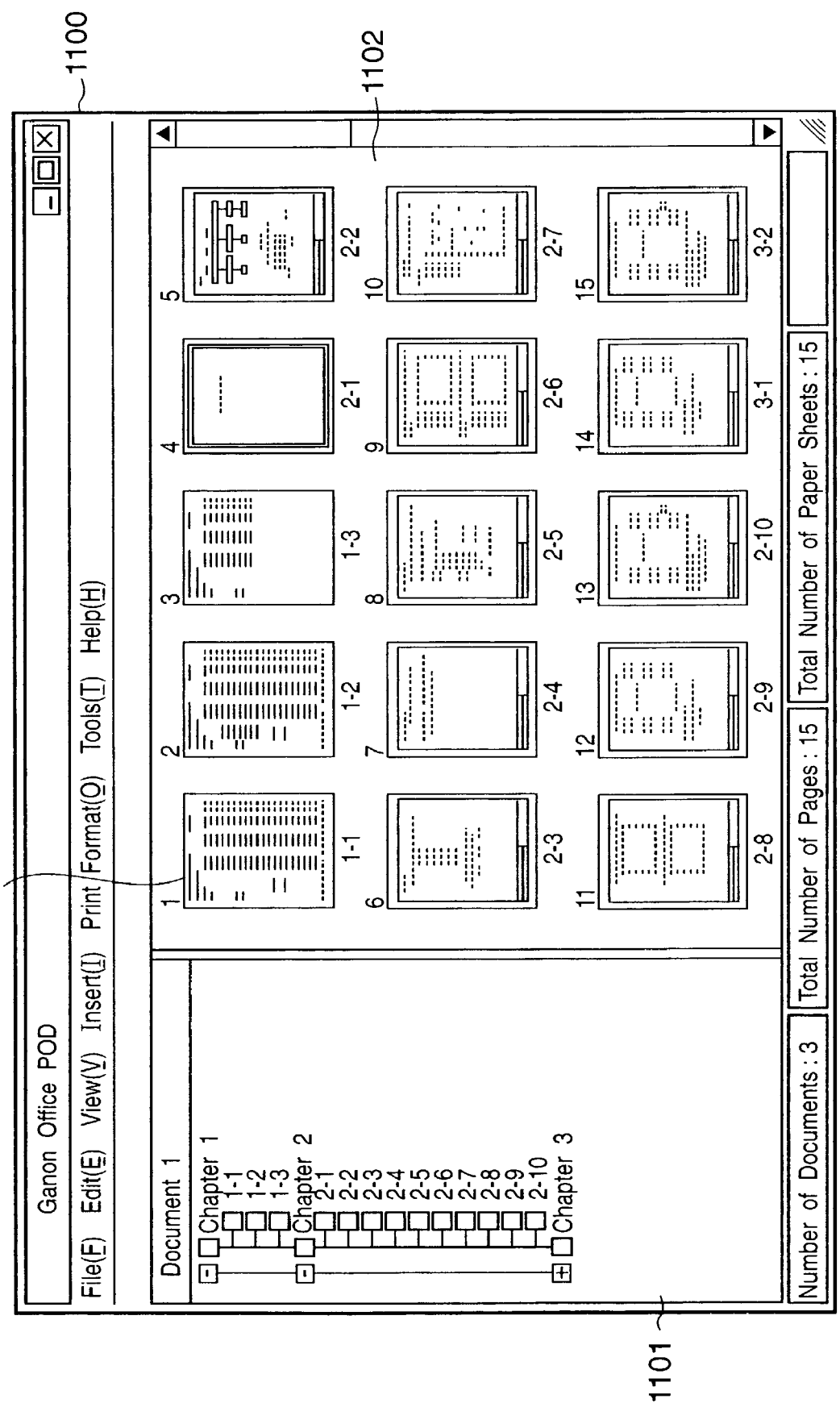
FIG. 10 is a view showing an example of a user interface window when an existing book file is opened.

If NO in step S701, a designated book file is opened (step S703), and a UI (User Interface) window is displayed in accordance with the structure, attribute, and contents of the book file. FIG. 10 shows an example of the UI window. The UI window 1100 has a tree portion 1101 representing a book structure, and a preview portion 1102 displaying a state to be printed. The tree portion 1101 displays chapters included in the book and pages included in each chapter by a tree structure as shown in FIG. 3A. Pages displayed at the tree portion 1101 are original pages. The preview portion 1102 displays reduced print page contents. The display order reflects the book structure.

Application data converted into an electronic original file by the electronic original writer can be added as a new chapter to the open book file. This function is called an electronic original import function. An electronic original is imported to the book file newly created by the procedures of FIG. 7, thereby giving an entity to the book file. This function is activated by drag-and-drop operation of application data to the window of FIG. 10. FIG. 8 shows electronic original import procedures.

An application program which has generated designated application data is activated. The electronic original writer 102 is designated as a device driver, and prints out application data to convert it into electronic original data (step S801). After conversion, whether the converted data is image data is checked (step S802) This determination can be achieved based on the file extension of the application under the Windows OS. For example, an extension "bmp" represents Windows bitmap data; "jpg", jpeg-compressed image data; and "tiff", tiff-format image data. If YES instep S802, processing in S801 can be skipped because an electronic original file can be directly generated from image data without activating an application in S801.

If NO in step S802, the electronic original file generated in step S801 is added as a new chapter to the book of a currently open book file (step S803). As for the chapter attribute, an attribute common to a book attribute is set to a book attribute value, and a different attribute is set to a default value prepared in advance.

If YES in step S802, no new chapter is added in principle, and each original page included in the electronic original file generated in step S801 is added to a designated chapter (step S804). For a file in which a book file is newly created, a new chapter is created, and each page of the electronic original file is added as a page belonging to the chapter. As for the page attribute, an attribute common to an upper layer attribute is given the attribute value of the upper layer attribute, and an attribute which is defined in application data and inherited to the electronic original file is given a value defined in the application data. For example, when N-up designation is defined in application data, the page inherits this attribute value. In this way, a new book file is created, or a new chapter is added.

FIG. 9 is a flow chart showing procedures of generating an electronic original file by the electronic original writer 102 in step S801 of FIG. 8. A new electronic original file is created and opened (step S901). An application corresponding to designated application data is activated. The electronic original writer is set as a device driver to transmit an output command to the output module of the OS. The output module converts the received output command into data of the electronic original format by the electronic original writer, and outputs the converted data (step S902). The output destination is the electronic original file opened in step S901. Whether all designated data have been converted is checked (step S903), and if YES in step S903, the electronic original file is closed (step S904). The electronic original file generated by the electronic original writer 102 is a file containing original page data entities shown in FIG. 3B.

<Editing of Book File>

As described above, a book file can be created from application data. The generated book file allows editing a chapter and page as follows.
(1) New document
(2) Delete
(3) Copy
(4) Cut
(5) Paste
(6) Move
(7) Change chapter name
(8) Reassign page number/name
(9) Insert cover
(10) Insert slip sheet
(11) Insert index sheet
(12) Page layout of each original page In addition, an operation of canceling executed editing operation, and an operation of restoring canceled operation can be performed. These editing functions enable editing operations such as consolidation of a plurality of book files, rearrangement of chapters and pages within a book file, delete of chapters and pages within a book file, layout change of an original page, and insertion of a slip sheet and index sheet. By these operations, operation results are reflected on attributes shown in FIGS. 4A, 4B and 5 or on a book file structure. For example, a blank page is inserted into a designated portion by an operation of newly adding a blank page. The blank page is processed as an original page. If the layout of an original page is changed, the change contents are reflected on attributes such as the printing method, N-up printing, front/back cover, index sheet, slip sheet, and chaptering.

<Output of Book File>

The ultimate goal of a book file created and edited in the above manner is to print it out. The user selects a file menu from the UI window 1100 of the bookbinding application shown in FIG. 10, and selects printing from this menu. Then, the book file is printed out from a designated output device. At this time, the bookbinding application 104 creates a job ticket from a currently open book file, and transfers the job ticket to the electronic original despooler 105. The electronic original despooler 105 converts the job ticket into an OS output command, e.g., a Windows GDI command, and transmits the command to an output module, e.g., GDI. The output module generates a command complying with a device by a designated printer driver 106, and transmits the command to the device.

The job ticket is data with a structure whose minimum unit is an original page. The structure of the job ticket defines the layout of an original page on paper. One job ticket is issued for one job. A document node is set at the top of the structure, and defines the attribute of the whole document such as double-sided printing/single-sided printing. A paper node belongs to the document node, and contains attributes such as the identifier of paper for use and designation of a feed port in the printer. A node for a sheet printed by the paper belongs to each paper node. One sheet corresponds to one paper sheet. A print page (physical page) belongs to each sheet. One physical page belongs to one sheet for single-sided printing, and two physical pages belong to one sheet for double-sided printing. An original page to be laid out on a physical page belongs to the physical page. The physical page attribute contains an original page layout.

The electronic original despooler 105 converts the job ticket into an output command to the output module.

<Another System Configuration>

The document processing system of this embodiment has generally been described. This system is of stand-alone type. A server-client system as an extension of the stand-alone system also creates and edits a book file by almost the same arrangement and procedures. A book file and print processing are managed by the server.

Figure 12:
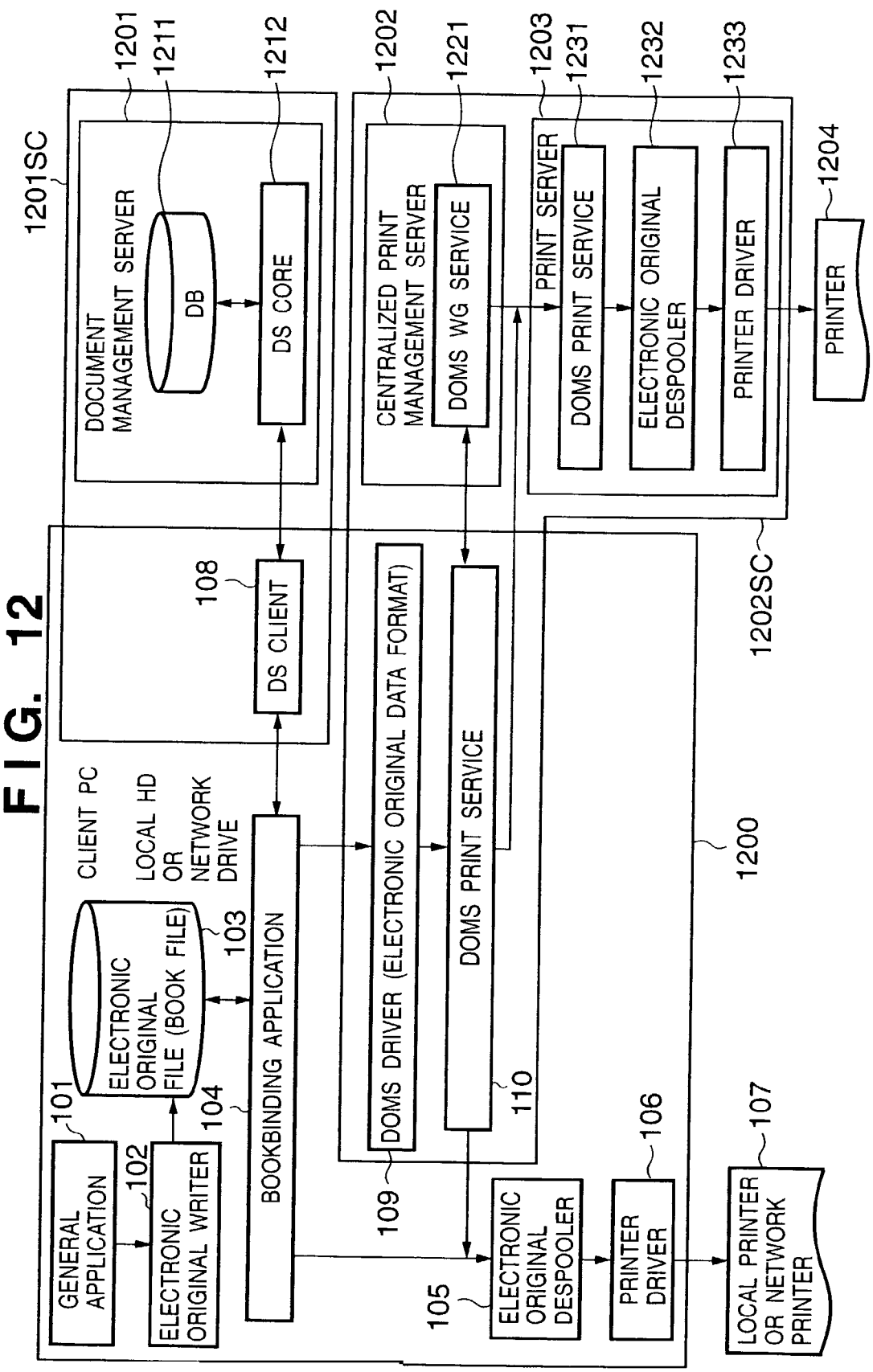
FIG. 12 is a block diagram showing a client-server document processing system.

FIG. 12 is a block diagram showing the arrangement of a server-client document processing system. The client document processing system is constituted by adding to the stand-alone system a DOMS (Document Output Management Service) driver 109 serving as a client module, a DOMS print service module 110, and a DS (Document Service) client module 108. A client document processing system 1200 is connected to a document management server 1201, centralized print management server 1202, and print server 1203. These servers are generally connected to the client document processing system via a network. When the servers also function as clients, they are connected by interprocess communication which simulates communication between networks. The document management server 1201 and centralized print management server 1202 are connected to the client in FIG. 12, but only either one may exist on the network. If the connected server is the document management server, a document management server-client system 1201SC including a client module is added to the stand-alone document management system. If the connected server is the centralized print management server 1202, a print management server-client system 1202SC including a client module is added.

The document management server 1201 stores a book file created and edited by the bookbinding application 104. To manage a book file by the document management server 1201, the book file is saved in a database 1211 of the document management server 1201 instead of or in addition to the local HD of a client PC. Save and read of a book file between the bookbinding application 104 and the document management server 1201 are done via the DS client module 108 and a DS core 1212.

The centralized print management server 1202 manages printing of a book file stored in the client document processing system 1200 or document management server 1201. A print request from the client is transmitted to a DOMS WG server module 1221 of the centralized print management server 1202 via the DOMS driver 109 and DOMS print service module 110. To print a book file by the printer of the client, the centralized print management server 1202 transfers electronic original data to the electronic original despooler 105 via the DOMS print service module 110 of the client. To print a book file by the print server 1203, the centralized print management server 1202 transmits electronic original data to a DOMS print service module 1231 of the print server 1203. For example, the centralized print management server executes security check on the qualification of a user who has issued a print request for a saved book file, or saves the print processing log. In this fashion, the document processing system can be implemented as both a stand-alone system and client-server system.

<Contents of Document Processing>

The contents of document processing in the first embodiment will be described.

Figure 13:
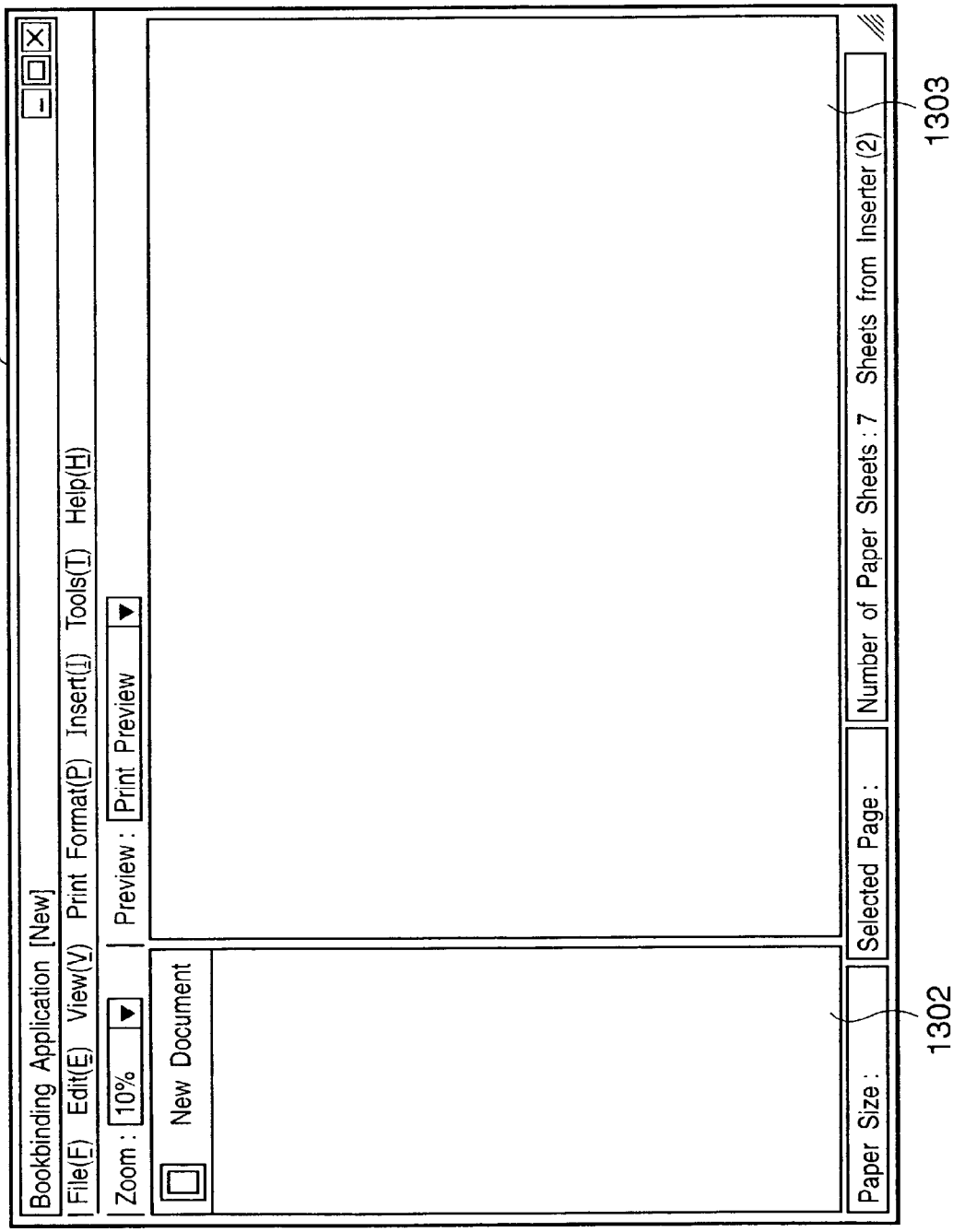
FIG. 13 is a view showing an example of a display window according to an embodiment.
Figure 14:
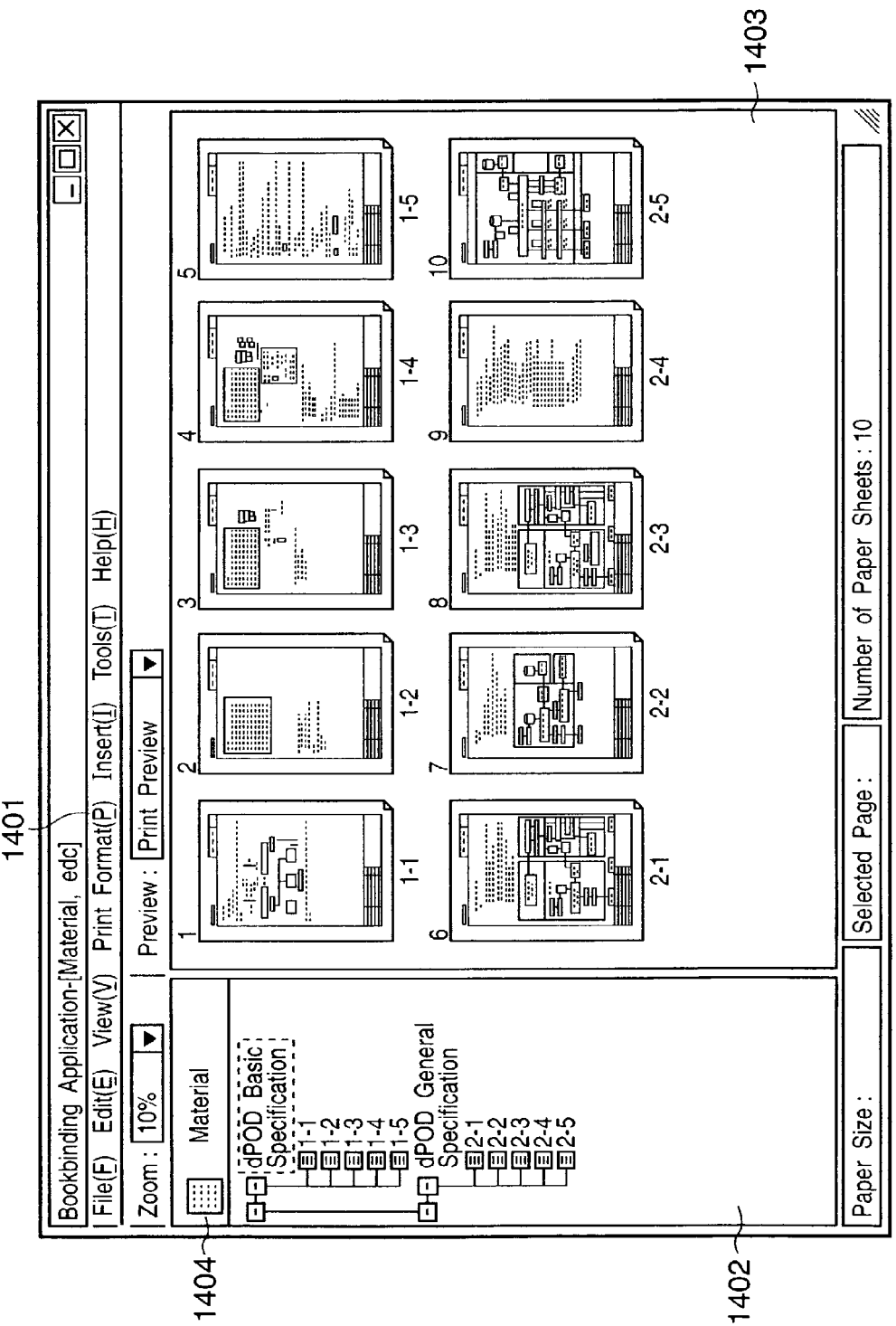
FIG. 14 is a view showing another example of the display window according to the embodiment.

FIGS. 13, 14, 15, and 16 show the main windows of a bookbinding application according to the present invention. When the application which realizes the present invention is activated, a main display window 1301 in FIG. 13 is displayed. A file by another application is dragged and dropped to the main display window. Then, the print output result of the file can be received as an electronic original file in the PDF format or the like every page. A tree view region (tree portion) 1302 in FIG. 13 can display PDF original page data in a tree structure. A tree view region 1402 in FIG. 14 shows a tree view region after an electronic original file is received. A preview region (preview portion) 1303 in FIG. 13 displays a print output state in accordance with various layout settings. A preview region 1403 in FIG. 14 shows a preview region after an original file is received. The received electronic original file constitutes a book file, as described above.

Figure 18:
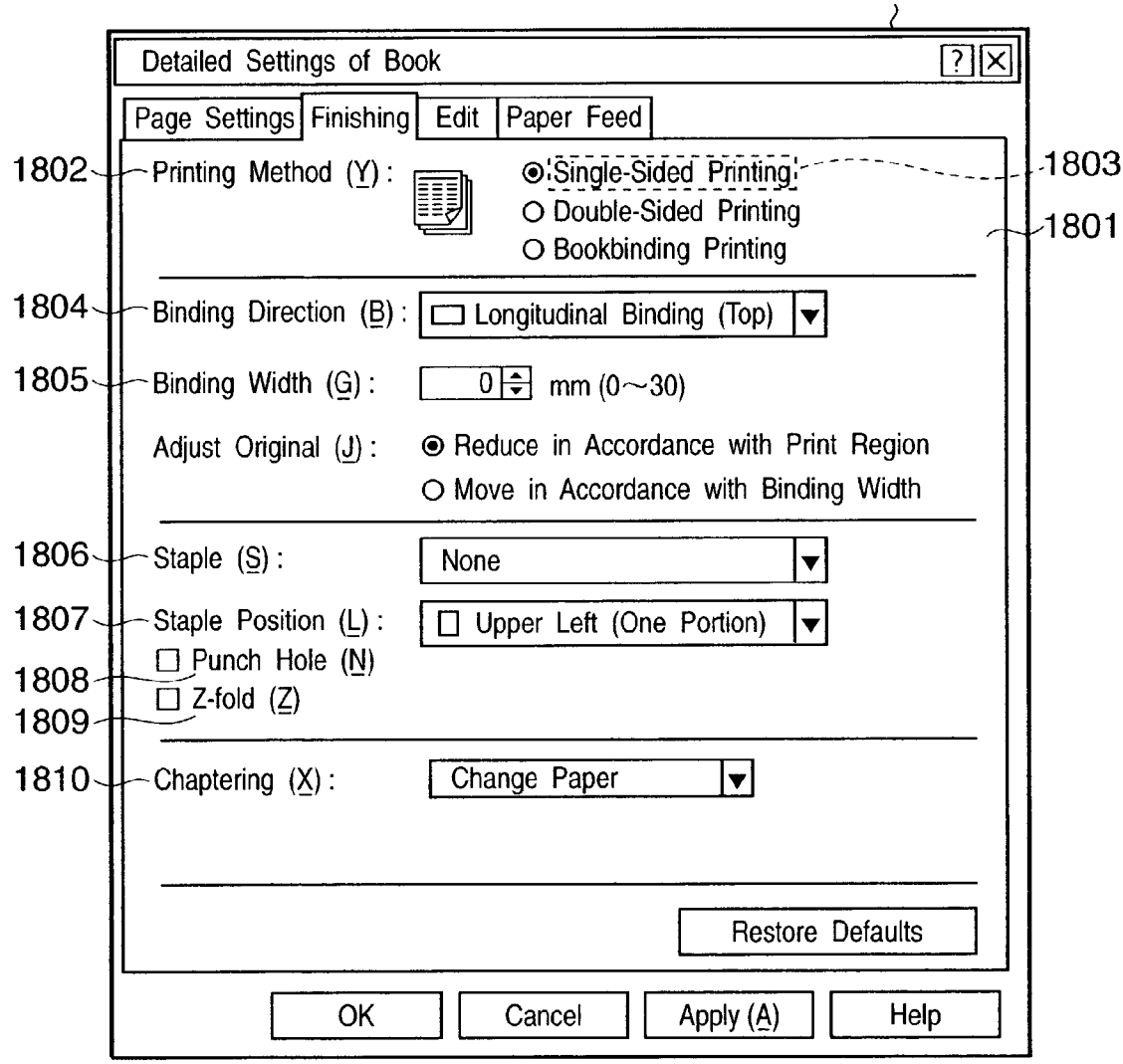
FIG. 18 is a view showing another example of the print format setting dialog according to the embodiment.
Figure 27:
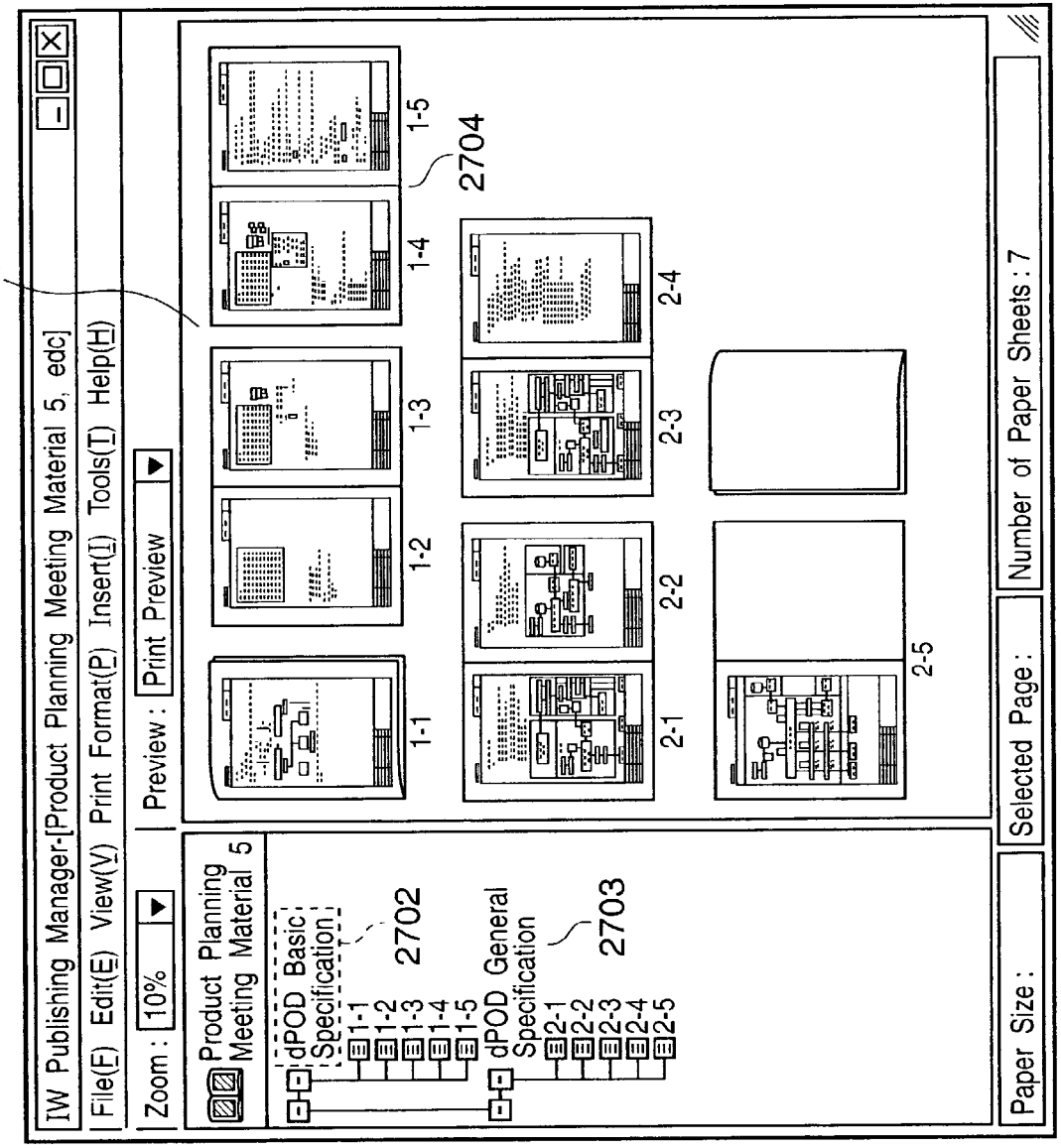
FIG. 27 is a view showing still another example of the display window according to the embodiment.

If a "print format menu" 1401 in FIG. 14 is designated, "detailed settings of book" dialogs shown in FIGS. 17, 18, and 19 are displayed to allow performing various layout settings/finishing settings. For example, a preview 1501 in FIG. 15 shows the result of designating to lay out two PDF pages on one physical page. A preview 2701 in FIG. 27 shows the result of designating "bookbinding printing" as a printing method, and a description of detailed settings thereof will be described later. An icon 1404 in FIG. 14 is a book icon representing the result of various layout settings/finishing settings. The user can check layout setting contents and finishing setting contents at a glance. "Finishing" means finishing processing, which enables the following settings.

If the "print format menu" 1401 in FIG. 14 is designated, a dialog 1701 in FIG. 17 is displayed. The setting contents of the dialog are stored in a print format setting table 2000 shown in FIG. 20. The print format setting table 2000 is obtained by mapping book attributes shown in FIG. 4 in the RAM 202 or HD 211 in FIG. 2. The setting values of the book attributes can be modified in the dialog window of FIG. 17 or the like. The print format setting table 2000 after setting change is rewritten as book attributes in the book file.

For example, a "page settings" sheet 1702 in FIG. 17 is a sheet for performing settings on a page in printing. An "output paper size" 1703 in FIG. 17 can be designated to set an "output paper size" (A3, A4, A5, B4, B5, or the like) in printing. The setting contents are stored in an "output paper size" 2001 in FIG. 20. An "output paper orientation" 1704 in FIG. 17 can be designated to set an "output paper orientation" (portrait/landscape) in printing. The setting contents are stored in an "output paper orientation" 2002 in FIG. 20. A "page layout" 1705 in FIG. 17 can be designated to set the number of original pages to be laid out on one physical page in printing. The setting contents are stored in a "page layout" 2003 in FIG. 20. A "layout order" 1706 in FIG. 17 can be designated to set the "layout order" (from upper left to right, from upper left to bottom, from upper right to left, or the like) of original pages in printing. The setting contents are stored in a "layout order" 2004 in FIG. 20. A "boundary" 1707 in FIG. 17 can be designated to set whether to draw a line at the boundary between laid-out original pages in printing. The setting contents are stored in a "boundary" 2005 in FIG. 20. An "arrange original" 1708 in FIG. 17 can be designated to set a position where each original page is laid out in printing. The setting contents are stored in an "original arrangement" 2006 in FIG. 20.

A "finishing" sheet 1801 in FIG. 18 is a sheet for performing settings on finishing in printing. A "printing method" 1802 in FIG. 18 can be designated to set a "printing method" (single-sided printing, double-sided printing, or bookbinding printing) in printing. The setting contents are stored in a "printing method" 2008 in FIG. 20. A "single-sided printing" 1803 in FIG. 18 represents that "single-sided printing" is designated as the "printing method". A "binding direction" 1804 in FIG. 18 can be designated to set a paper side to be bound in printing. The setting contents are stored in a "binding direction" 2009 in FIG. 20. A "binding width" 1805 in FIG. 18 can be designated to set a binding width in printing. The setting contents are stored in a "binding width" 2010 in FIG. 20. A "staple" 1806 in FIG. 18 can be designated to set whether to staple a print material in printing. The setting contents are stored in a "staple" 2011 in FIG. 20. A "staple position" 1807 in FIG. 18 can be designated to set a side to be stapled and the number of portions to be stapled in printing. The setting contents are stored in a "staple position" 2012 in FIG. 20. A "punch hole" 1808 in FIG. 18 can be designated to set whether to punch in printing. The setting contents are stored in a "punch" 2013 in FIG. 20. A "Z-fold" 1809 in FIG. 18 can be designated to set whether to Z-fold paper in printing. The setting contents are stored in a "Z-fold" 2014 in FIG. 20. A "chaptering" 1810 in FIG. 18 can be designated to select one of "none", "page break", or "change paper", thereby selecting a physical page where the first original page of a chapter is to be mapped. The setting contents are stored in a "chaptering" 2007 in FIG. 20. Details of "chaptering" will be described later.

FIG. 19 also shows a "finishing" sheet, similar to FIG. 18. A "printing method" 1901 in FIG. 19 represents setting items when "bookbinding printing" is designated.

The "printing method" 1901 in FIG. 19 can be designated to set a "printing method" (single-sided printing, double-sided printing, or bookbinding printing) in printing. The setting contents are stored in a "printing method" 2101 in FIG. 21. A "bookbinding printing" 1902 in FIG. 19 represents that "bookbinding printing" is designated as the "printing method". An "opening direction" 1903 in FIG. 19 can be designated to set a direction in which paper is opened in printing. The setting contents are stored in an "opening direction" 2102 in FIG. 21. A "saddle stitch" 1904 in FIG. 19 can be designated to set whether to perform "saddle stitch" in printing. The setting contents are stored in a "saddle stitch" 2103 in FIG. 21. A bookbinding printing method" 1905 in FIG. 19 can be designated to set whether to print a file in several bundles in bookbinding printing. The setting contents are stored in a "fascicle" 2106 in FIG. 21.

<Chaptering Processing>

A method of automatically inserting a blank page and reflecting the result in the preview region 1403 in FIG. 14 as a result of setting the "chaptering" 1810 in FIG. 18 and a "chaptering" 1906 in FIG. 19 will be explained.

Figure 29:
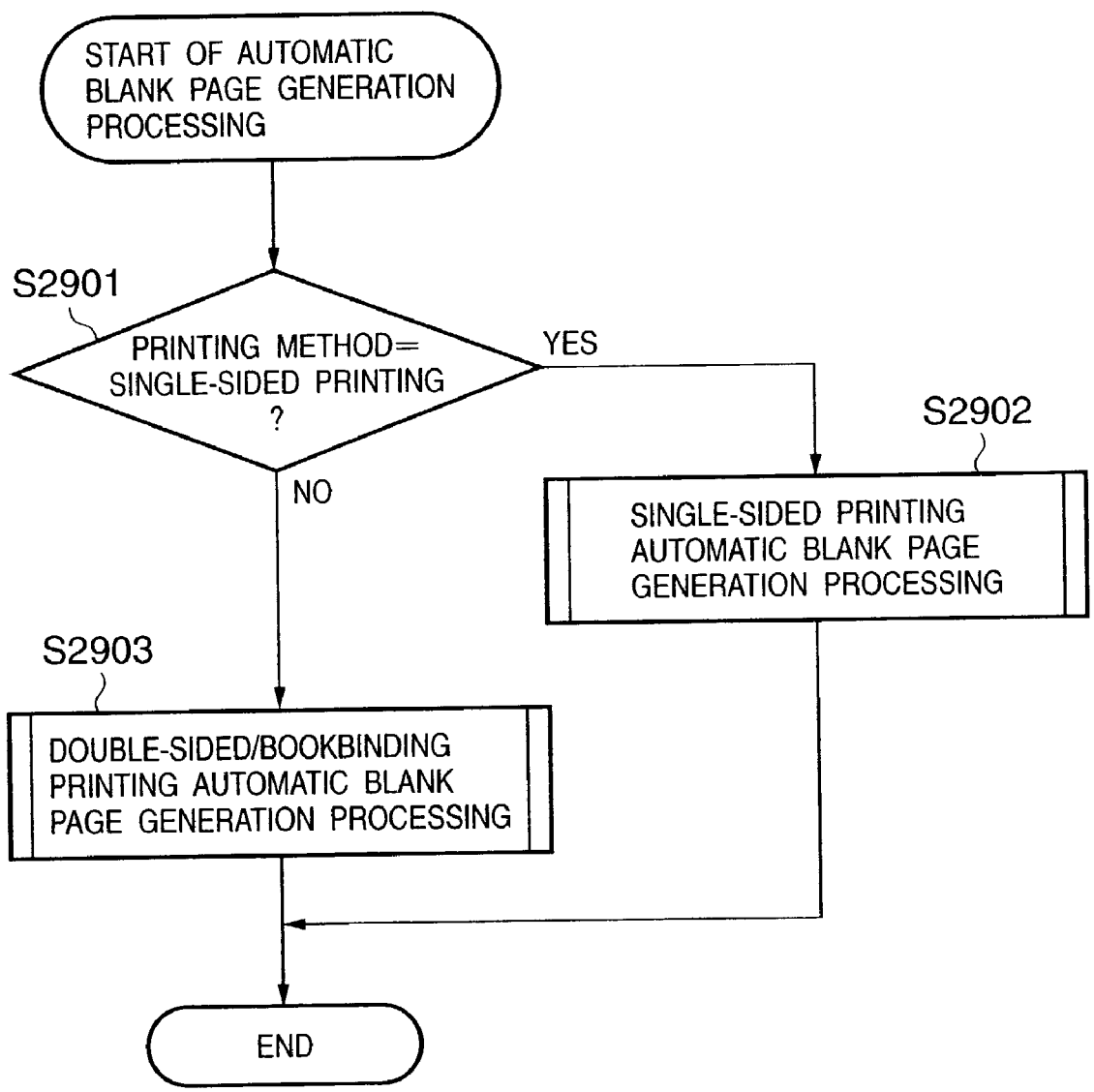
FIG. 29 is a flow chart showing an example of a processing flow according to the embodiment.
Figure 30:
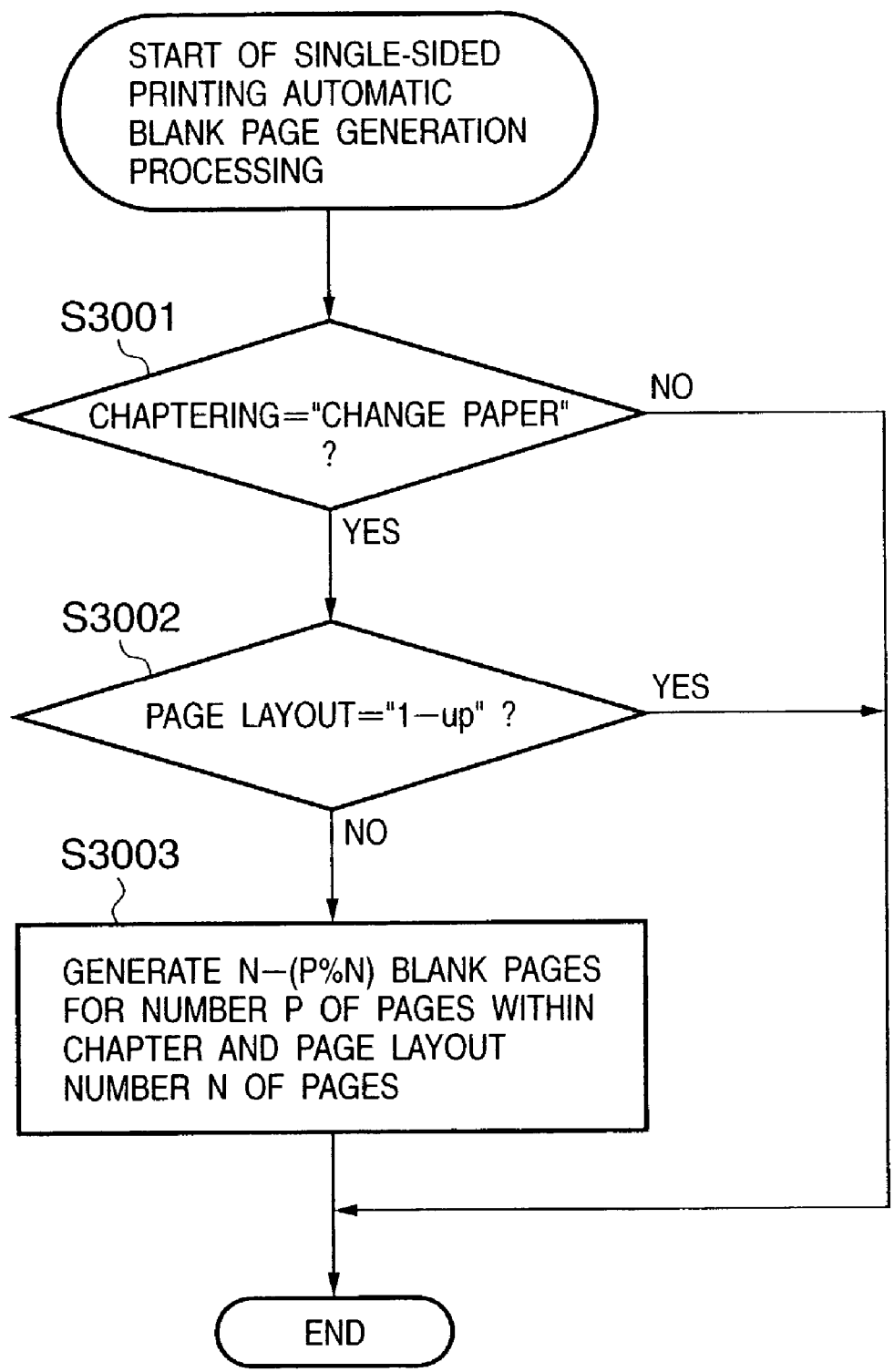
FIG. 30 is a flow chart showing another example of the processing flow according to the embodiment.
Figure 31:
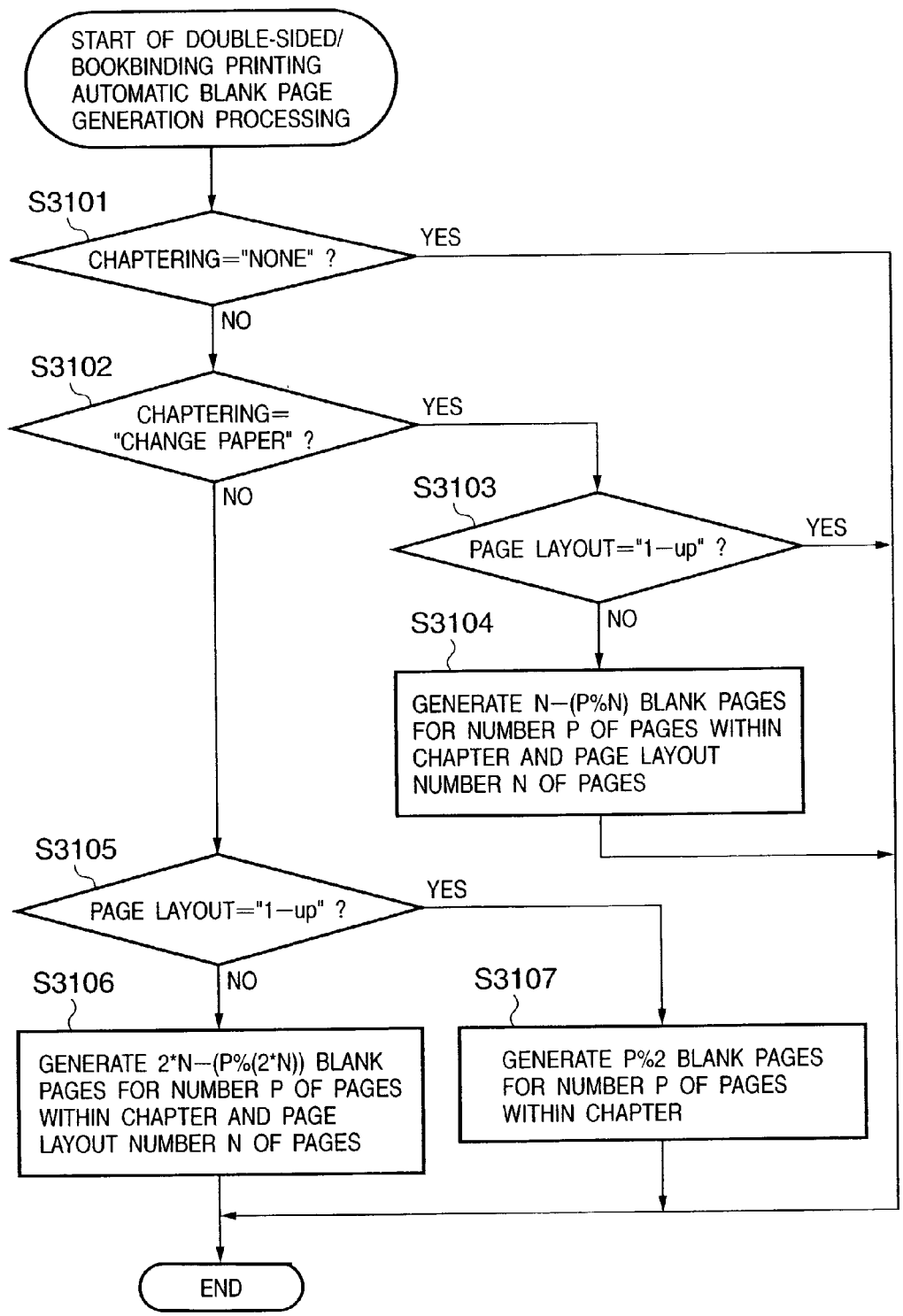
FIG. 31 is a flow chart showing still another example of the processing flow according to the embodiment.

FIGS. 29, 30, and 31 are flow charts showing automatic blank page generation processing complying with "chaptering" as a result of setting the "chaptering" 1810 in FIG. 18 and the "chaptering" 1906 in FIG. 19. These flow charts are invoked when the number of blank pages necessary at the end of a chapter is determined in deciding the layout of each chapter.

(Single-sided Printing)

A case wherein "single-sided printing" is designated in the "printing method" 1802 in FIG. 18 will be explained.

In "automatic blank page generation processing" shown in FIG. 29, the "printing method" 2008 in FIG. 20 is checked in step 2901 to determine whether the "printing method" is "single-sided printing". If YES in step 2901, "single-sided printing automatic blank page generation processing" shown in FIG. 30 is invoked in step 2902.

In "single-sided printing automatic blank page generation processing" shown in FIG. 30, the "chaptering" 2007 in FIG. 20 is checked in step 3001 to determine whether "change paper" is set. If NO in step 3001, the processing ends without inserting any blank page. A case wherein no blank page is inserted will be described with reference to the preview 1501 in FIG. 15. The preview 1501 in FIG. 15 represents setting of two pages/sheet in the "page layout" 1705 in FIG. 17. Since a chapter 1502 holds five original pages, the last original page of this chapter and the first original page of a chapter 1503 are laid out on a physical page 1504 in FIG. 15.

In step 3001 of FIG. 30, the "chaptering" 2007 in FIG. 20 is checked. If YES in step 3001, the "page layout" 2003 in FIG. 20 is checked in step 3002 to determine whether 1-page printing (1-up), i.e., one original page/physical page is set. If YES in step 3002, chaptering always coincides with paper change, and the processing ends without inserting any blank page.

Figure 16:
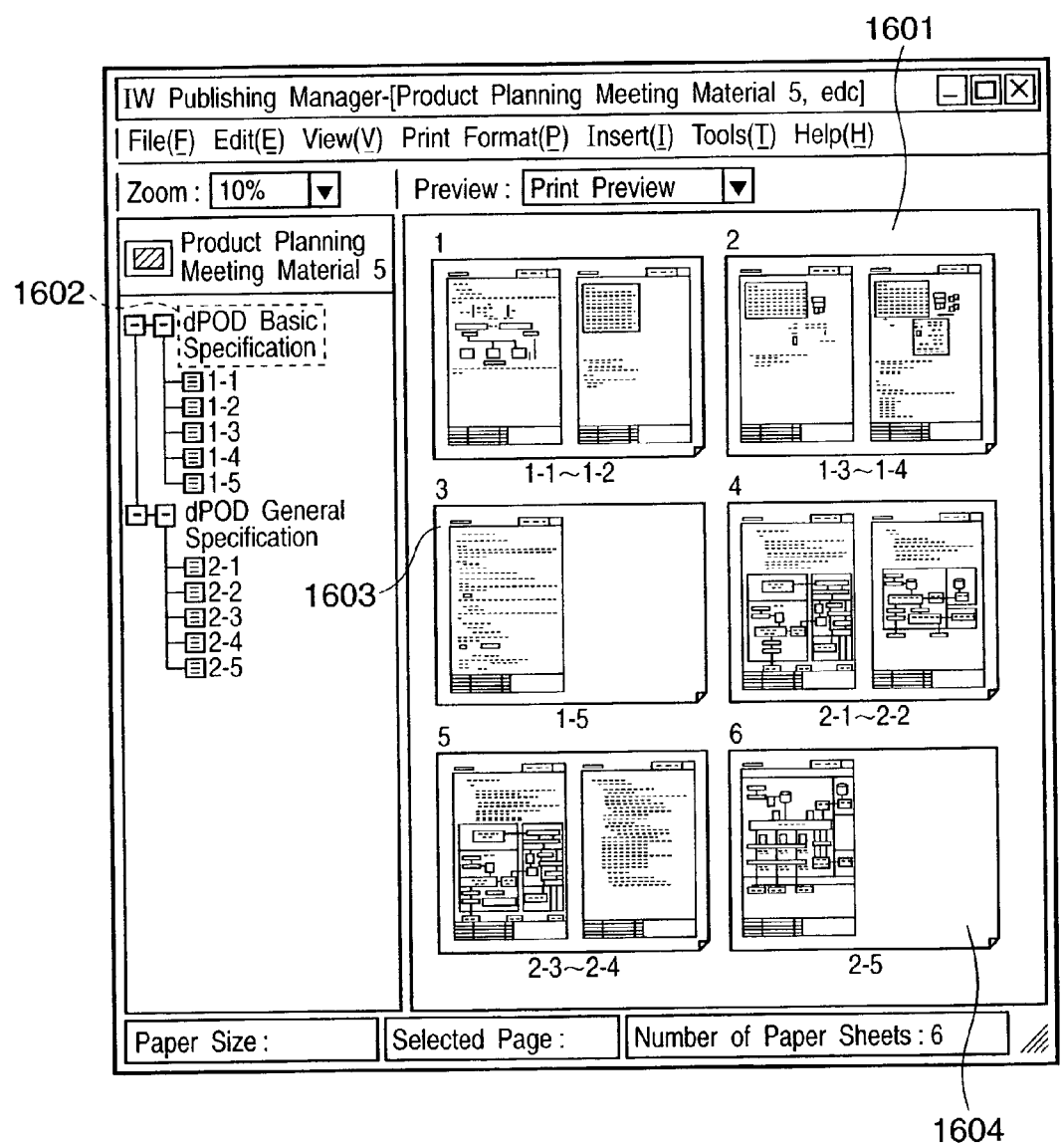
FIG. 16 is a view showing still another example of the display window according to the embodiment.

If NO in step 3002, "N−(P % N)" (% is remainder calculation) is calculated in step 3003 from the number (P) of original pages within the chapter and the "page layout" (N original pages/physical page) 2003 in FIG. 20. This value is the number of original pages serving as a margin on the last physical page of the chapter, and corresponds to the number of blank original pages to be inserted for paper change. In this way, the number of necessary blank original pages is calculated, and blank original pages corresponding to the calculated number of pages are generated. Insertion of a blank page will be explained with reference to a preview 1601 in FIG. 16. The preview 1601 in FIG. 16 represents setting of 2-page printing (2-up), i.e., two original pages/physical page in the "page layout" 1705 in FIG. 17. Since a chapter 1602 holds five original pages, the number of blank pages to be inserted in step 3003 of FIG. 30 is "2−(5%2)"=1. Thus, a blank original page 1603 in FIG. 16 is generated and inserted. After that, the original pages of each chapter including the inserted blank original page are laid out on physical pages and previewed in accordance with a designated layout. As for the next chapter, a blank page 1604 in FIG. 16 is generated and previewed. This also applies not only to preview but also to printing.

(Double-sided Printing)

A case wherein "double-sided printing" is designated in the "printing method" 1802 in FIG. 18 will be explained.

In "automatic blank page generation processing" shown in FIG. 29, the "printing method" 2008 in FIG. 20 is checked in step 2901 to determine whether the "printing method" is "single-sided printing". If NO in step 2901, "double-sided/bookbinding printing automatic blank page generation processing" shown in FIG. 31 is invoked in step 2903.

Figure 22:
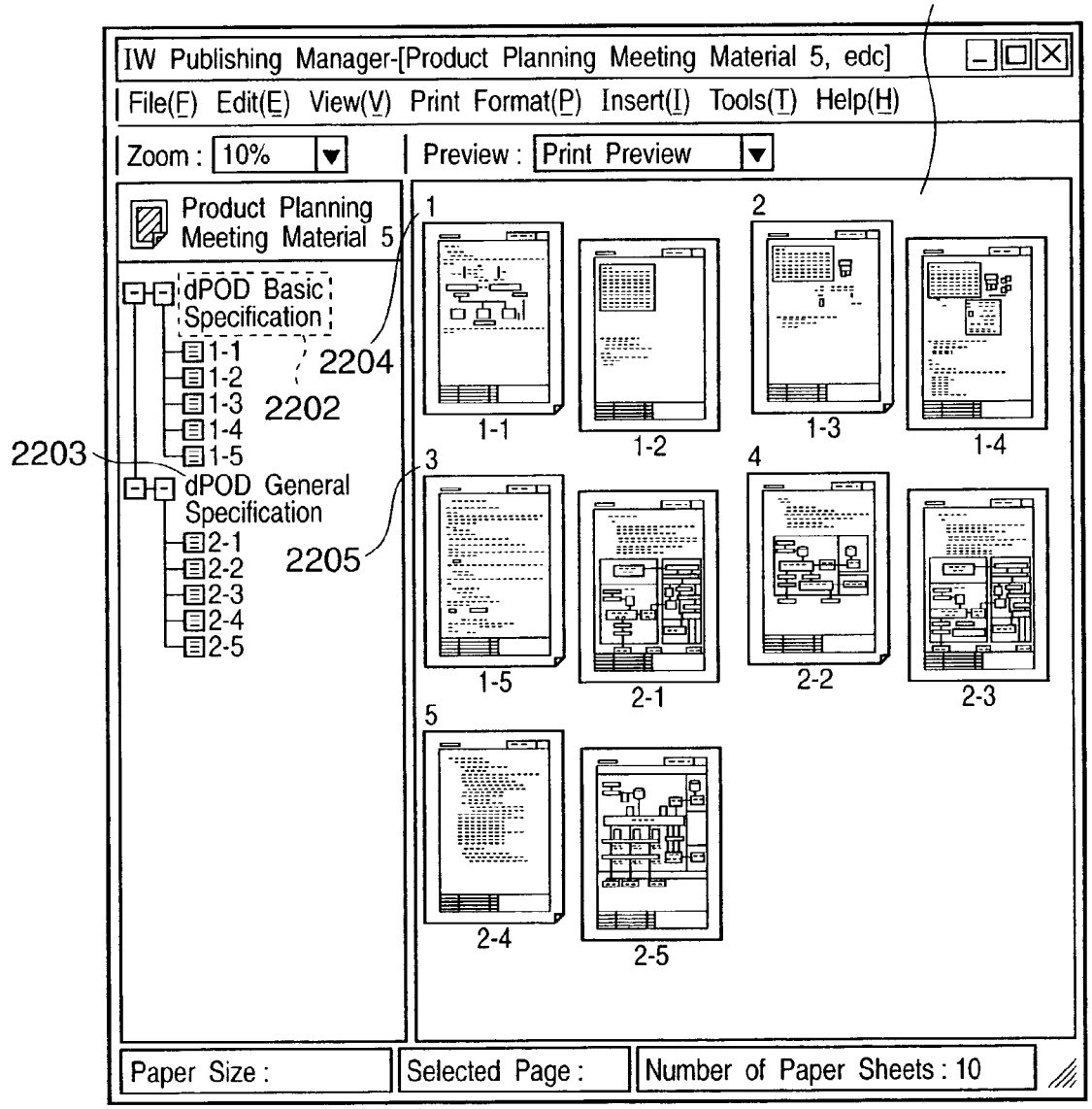
FIG. 22 is a view showing still another example of the display window according to the embodiment.

In "double-sided/bookbinding printing automatic blank page generation processing" shown in FIG. 31, the "chaptering" 2007 in FIG. 20 is checked in step 3101 to determine whether chaptering is set to "none". If YES in step 3101, the processing ends without inserting any blank page. A case wherein no blank page is inserted will be described with reference to a preview 2201 in FIG. 22. The preview 2201 in FIG. 22 represents setting of one original page/physical page in the "page layout" 1705 in FIG. 17. A FIG. (1) 2204 in FIG. 22 represents the page number of a paper sheet, and means the first paper sheet. In the preview region 2201, the upper surface (left) and lower surface (right) of one paper sheet are displayed at different levels. A figure at the upper left corner of the page image of an upper surface represents the original number of the paper sheet. Since a first chapter 2202 holds five original pages, the last original page of this chapter and the first original page of a second chapter 2203 are respectively laid out on the upper and lower surfaces of a paper sheet 2205 in FIG. 22.

Figure 24:
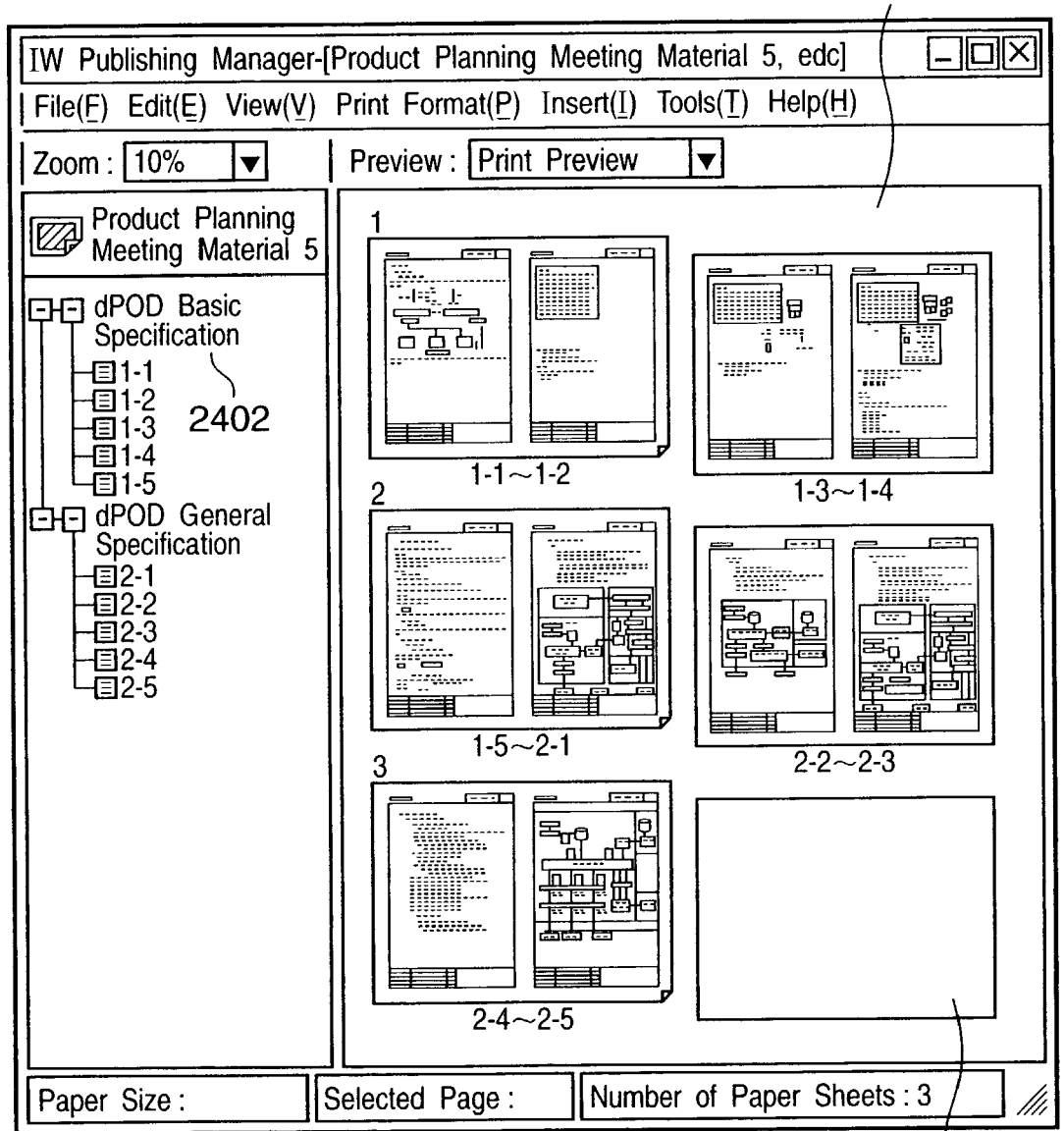
FIG. 24 is a view showing still another example of the display window according to the embodiment.

FIG. 24 shows an example of a preview window when "none" chaptering is designated in double-sided printing and 2-page printing. On the upper surface of the second paper sheet, the last original page of the first chapter and the first original page of the second chapter are laid out on one physical page. In this case, the lower surface of the last paper sheet does not have any original data to be printed and is a blank page.

Figure 25:
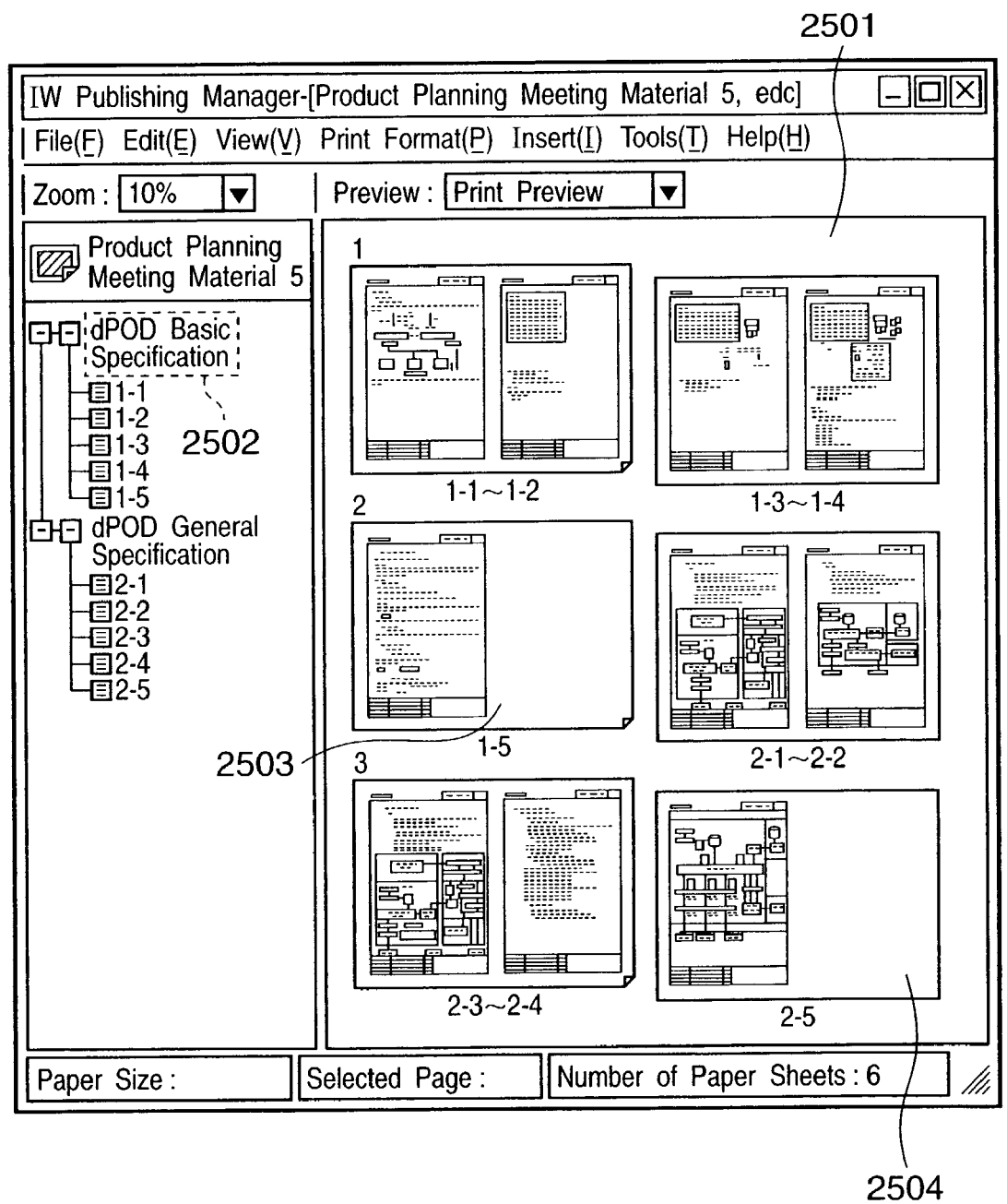
FIG. 25 is a view showing still another example of the display window according to the embodiment.

In step 3101 of FIG. 31, the "chaptering" 2007 in FIG. 20 is checked. If NO in step 3101, the "chaptering" 2007 in FIG. 20 is checked in step 3102 to determine whether "page change" is set. If YES in step 3102, the "page layout" 2003 in FIG. 20 is checked in step 3103 to determine whether 1-page printing, i.e., one original page/physical page is set. If YES in step 3103, the processing ends without inserting any blank page. If NO in step 3103, "N−(P % N)" is calculated in step 3104 from the number (P) of original pages within the chapter and the "page layout" (N pages/sheet) 2003 in FIG. 20, thereby obtaining the number of blank original pages necessary for a page break. Then, blank pages are generated by the calculated number. Insertion of a blank page will be explained with reference to a preview 2501 in FIG. 25. The preview 2501 in FIG. 25 represents setting of 2-page printing (two original pages/physical page) in the "page layout" 1705 in FIG. 17. Since a chapter 2502 holds five original pages, the number of blank pages to be inserted in step 3104 of FIG. 31 is "2−(5%2)"=one original page. A blank original page 2503 in FIG. 25 is generated, inserted, and previewed. As for the next chapter, a blank page 2504 in FIG. 25 is generated and previewed.

Figure 23:
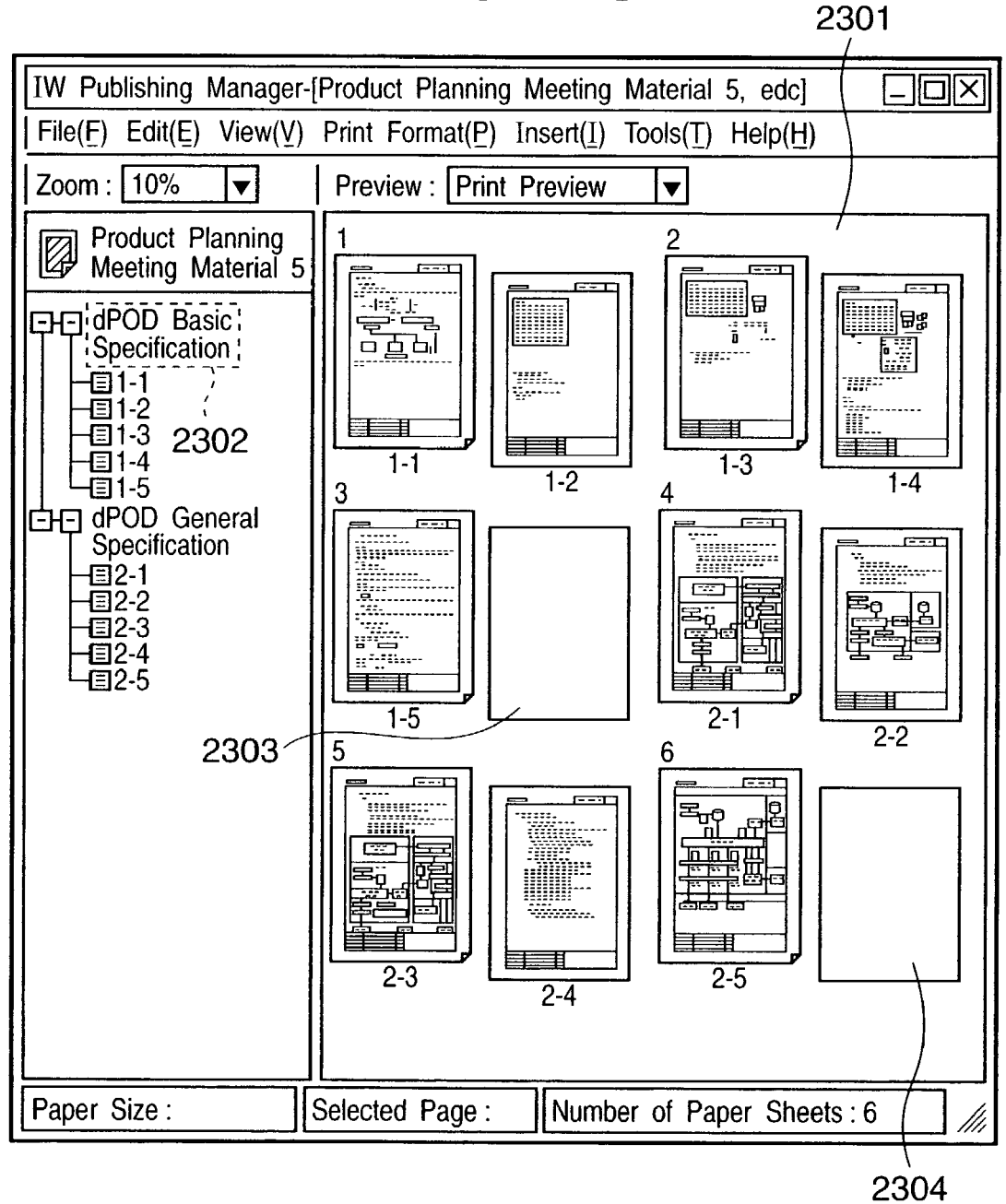
FIG. 23 is a view showing still another example of the display window according to the embodiment.

If NO in step 3102 of FIG. 31, "change paper" is determined to be set. In step 3105, the "page layout" 2003 in FIG. 20 is checked to determine whether 1-page printing, i.e., one page/physical page is set. If YES in step 3105, "P %2" is calculated in step 3107 from the number (P) of original pages within the chapter. The calculated number of original pages is set as the number of blank original pages necessary for a page break, and blank pages are generated by the calculated number. This is because a paper sheet can be changed by inserting a blank original page on the lower surface when the last page of the chapter is laid out on the upper surface in double-sided 1-page printing. Insertion of a blank original page will be explained with reference to a preview 2301 in FIG. 23. The preview 2301 in FIG. 23 represents setting of 1-page printing in the "page layout" 1705 in FIG. 17. Since a chapter 2302 holds five original pages, the number of blank original pages to be inserted in step 3107 of FIG. 31 is "5%2"=one page. A blank original page 2303 in FIG. 23 is generated, inserted, and previewed. As for the next chapter, a blank page 2304 in FIG. 23 is generated and previewed.

Figure 26:
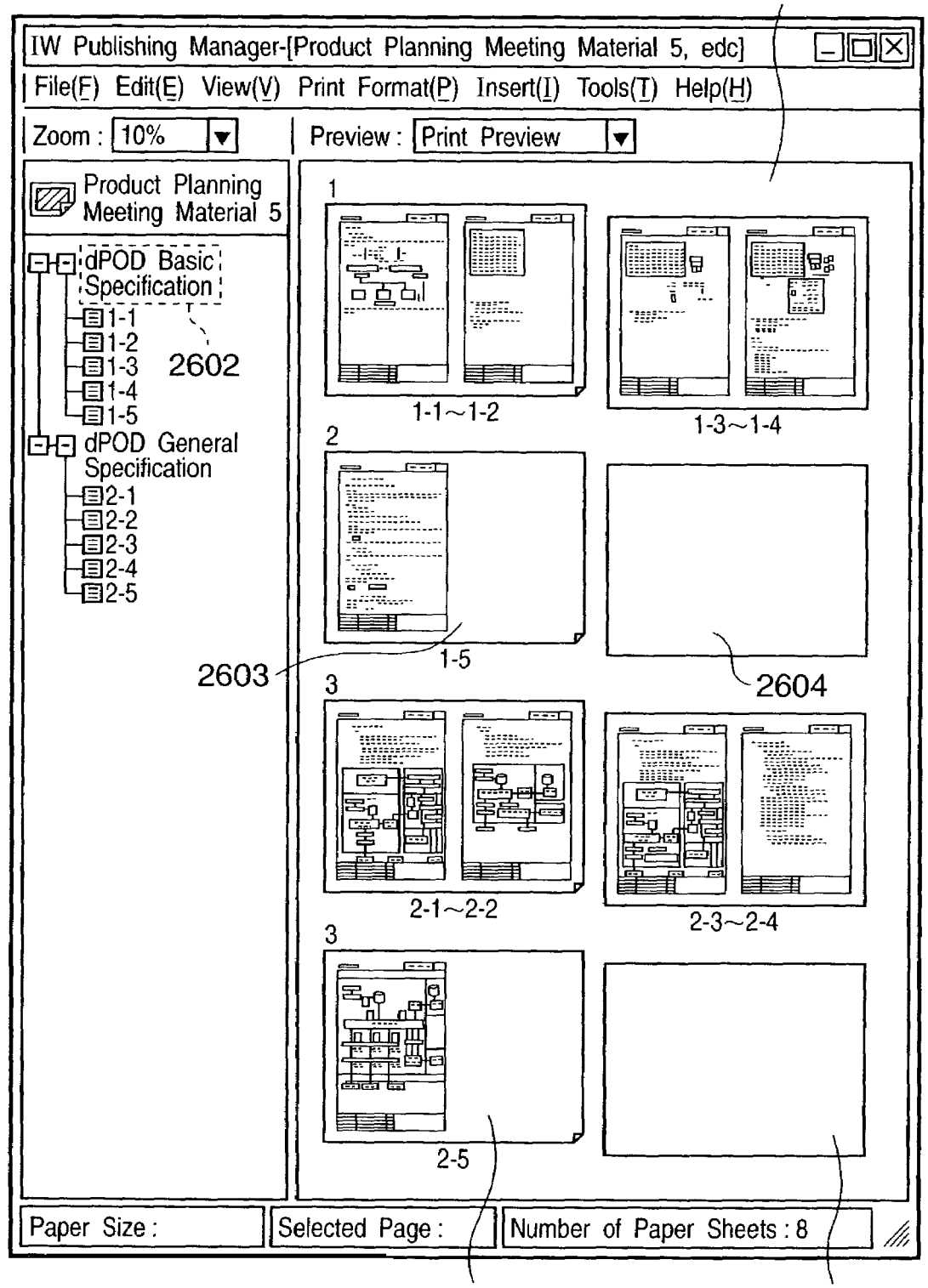
FIG. 26 is a view showing still another example of the display window according to the embodiment.

In step 3105 of FIG. 31, the "page layout" 2003 in FIG. 20 is checked to determine whether 1-page printing is set. If NO in step 3105, "2*N–(P %(2*N))" is calculated in step 3106 from the number (P) of original pages within the chapter and the "page layout" (N-page printing) 2003 in FIG. 20. This value is set as the number of blank original pages which must be inserted at the end of the chapter, and blank pages are generated by the calculated number. Insertion of a blank page will be explained with reference to a preview 2601 in FIG. 26. The preview 2601 in FIG. 26 represents setting of 2-page printing in the "page layout" 1705 in FIG. 17. Since a chapter 2602 holds five original pages, the number of blank original pages to be inserted in step 3106 of FIG. 31 is "2*2–(5%(2*2))"=three pages. Three blank original pages 2603 and 2604 in FIG. 26 are generated, inserted, and previewed. As for the next chapter, blank pages 2605 and 2606 in FIG. 26 are generated and previewed.

(Bookbinding Printing)

A case wherein "bookbinding printing" is designated in the "printing method" 1802 in FIG. 18 will be explained. In bookbinding printing, "page break" and "change paper" are executed not for physical pages/paper sheets in printing but for pages in a bookbinding state. For a chapter made up of an odd number of pages, "page break" and "change paper" are realized by inserting a blank page on the lower surface (lower surface in the facing order) of the last original page of the chapter. "Automatic blank page generation processing" is the same as that when "bookbinding printing" is designated and when "double-sided printing" and "1-page printing" are designated. Steps in the flow chart shown in FIG. 31 will be explained with reference to previews shown in FIGS. 27 and 28.

In step 3101 of FIG. 31, the "chaptering" 2007 in FIG. 20 is checked to determine whether chaptering is set to "none". If YES in step 3101, the processing ends without inserting any blank page. A case wherein no blank page is inserted will be described with reference to the preview 2701 in FIG. 27.

The preview 2701 in FIG. 27 represents setting of 1-page printing in the "page layout" 1705 in FIG. 17. Since a chapter 2702 holds five original pages, the last original page of this chapter and the first original page of a chapter 2703 are laid out on a paper sheet 2704 in FIG. 27.

Figure 28:
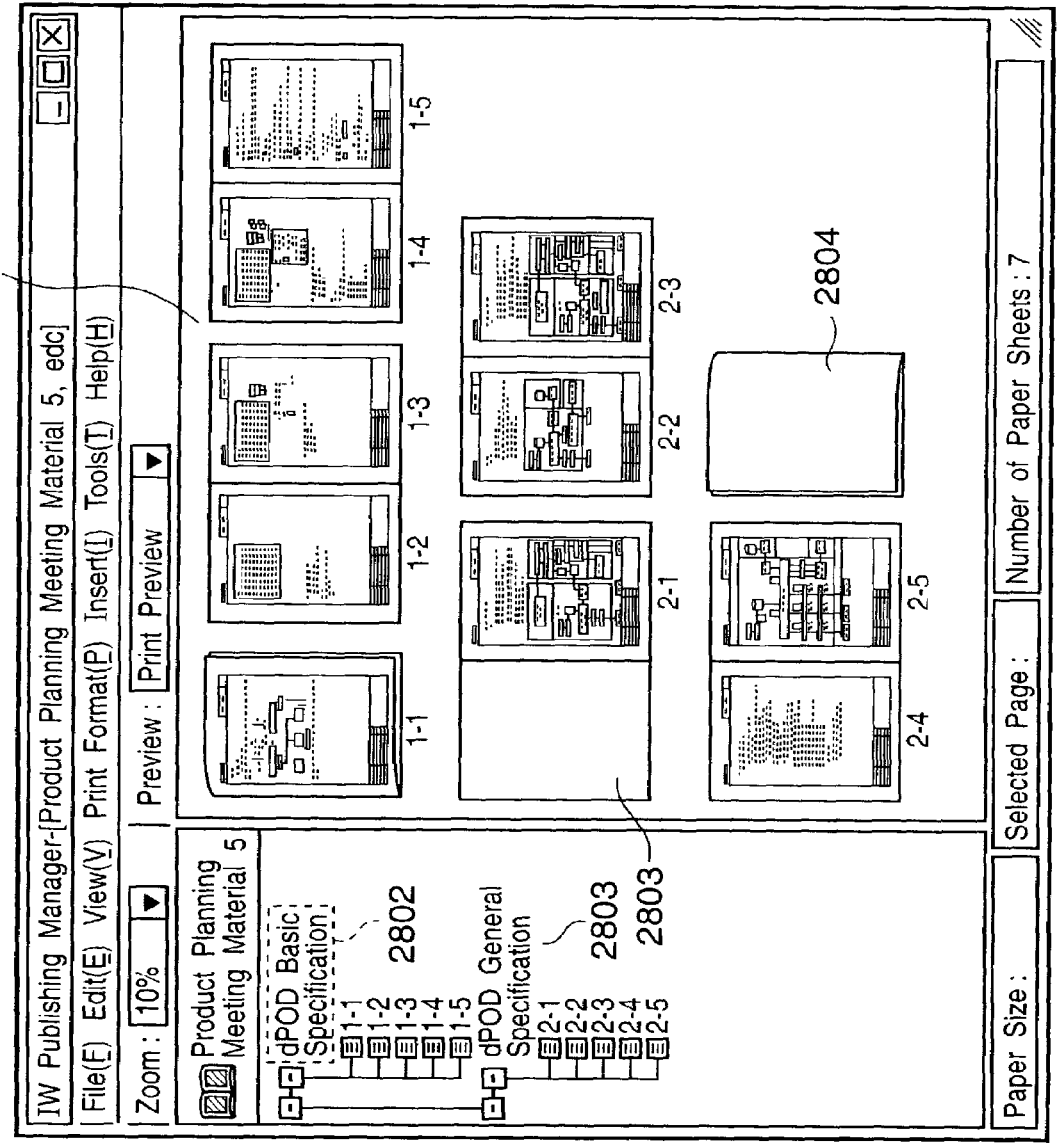
FIG. 28 is a view showing still another example of the display window according to the embodiment.

In step 3105 of FIG. 31, the "page layout" 2003 in FIG. 20 is checked to determine whether 1-page printing is set. If YES in step 3105, "P %2" is calculated in step 3107 from the number (P) of original pages within the chapter, thereby obtaining the number of necessary blank pages. Then, blank pages are generated by the calculated number. Insertion of a blank page will be explained with reference to a preview 2801 in FIG. 28. The preview 2801 in FIG. 28 represents setting of 1-page printing in the "page layout" 1705 in FIG. 17. Since a chapter 2802 holds five original pages, the number of blank original pages to be inserted in step 3107 of FIG. 31 is "5%2"=one original page. Original pages of the document to which the blank original page is inserted are laid out in accordance with bookbinding printing settings, and a blank page 2803 in FIG. 28 is previewed. As for the next chapter, a blank page 2804 in FIG. 28 is generated and previewed.

[Second Embodiment]

<Description of Apparatus>

The first embodiment performs "automatic blank page insertion" processing when paper change or page break is designated in chaptering. In addition to this designation, the second embodiment executes "change paper" processing when the "output paper size" is changed from a given chapter and even "chaptering" is set to "none". Another preferred embodiment according to the present invention will be described in detail with reference to the accompanying drawings. The whole arrangement of this embodiment is the same as that shown in FIGS. 1 to 21 in the first embodiment.

<Contents of Document Processing>

The second embodiment will be described in accordance with a "chapter print format setting table" shown in FIG. 34, a "detailed settings of chapter" shown in FIG. 37, and flow charts shown in FIGS. 35 and 36.

Figure 34:
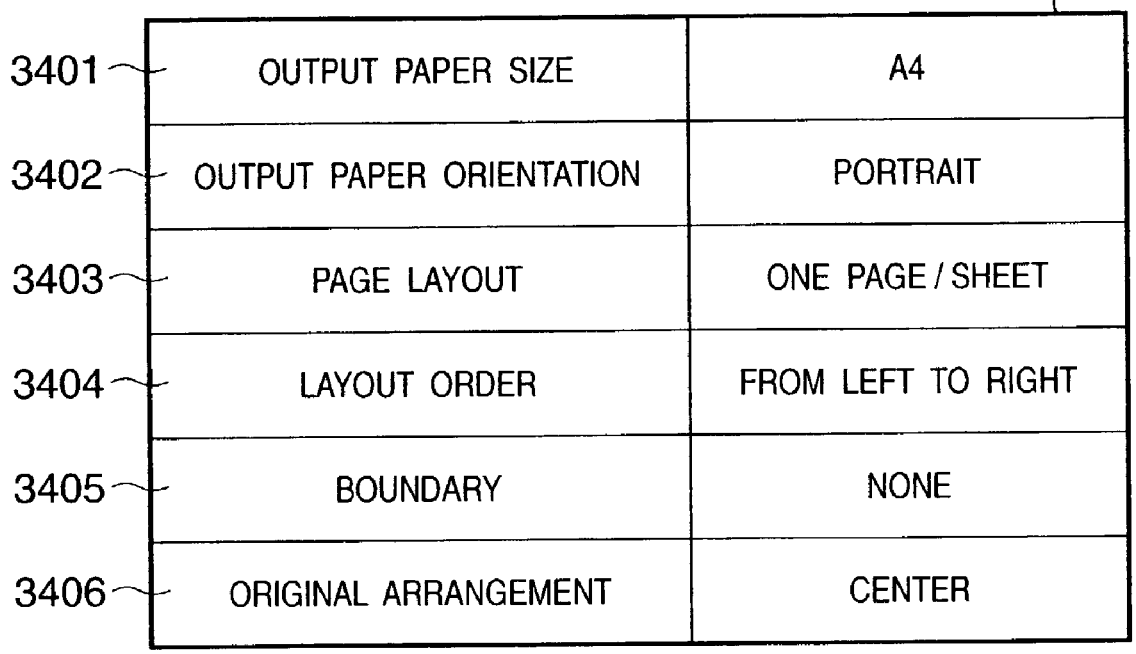
FIG. 34 is a view showing still another example of the structure which stores print format setting contents according to the embodiment.

The "chapter print format setting table" shown in FIG. 34 has the same contents as the setting contents of a book unless exceptional settings are done for a chapter. Chapter settings are changed by the settings of items in a "detailed settings of chapter" dialog 3701 in FIG. 37. The table in FIG. 34 holds some of chapter attributes shown in FIG. 5.

Figure 32:
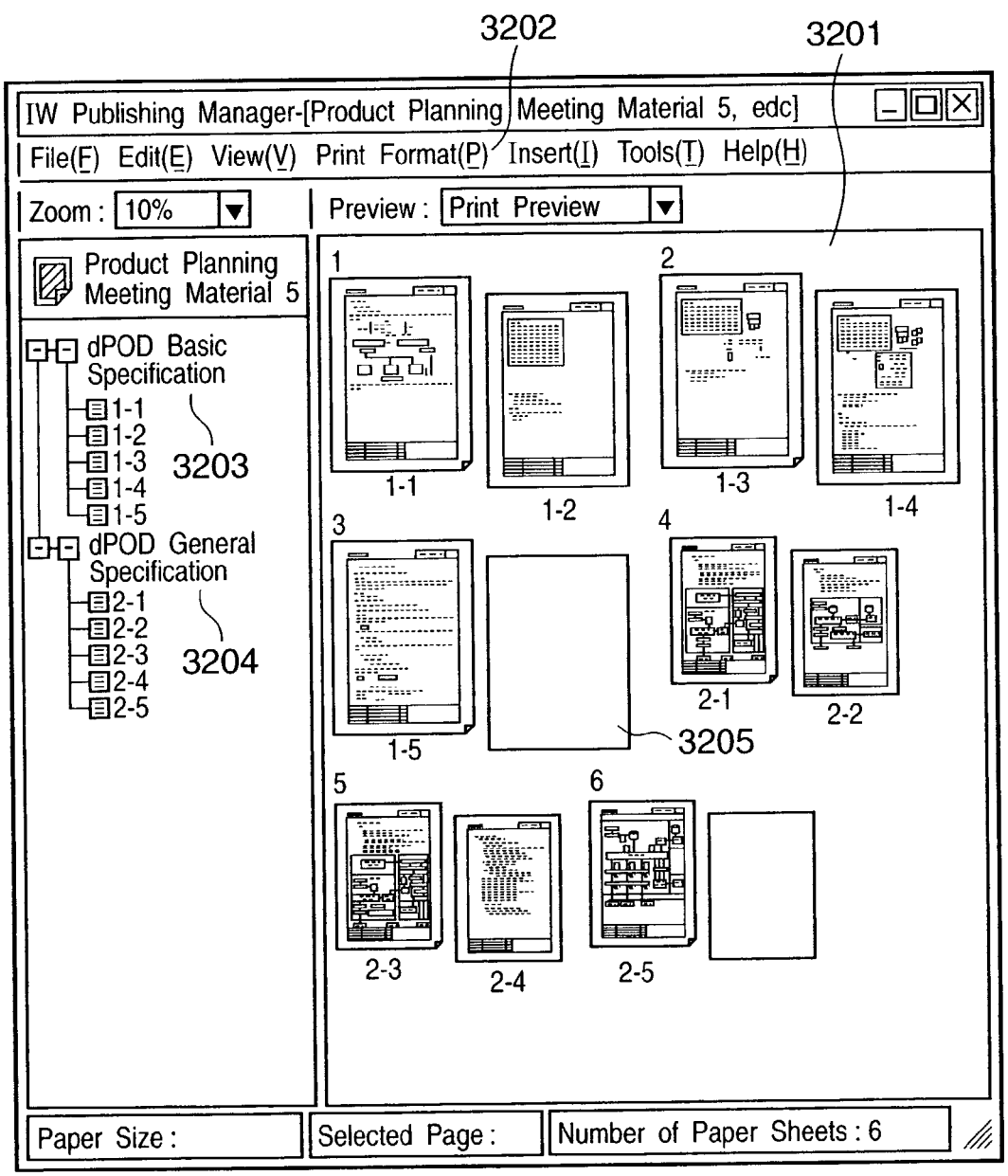
FIG. 32 is a view showing still another example of the display window according to the embodiment.

Chapters 3203 and 3204 in FIG. 32 are selected with a keyboard 209 in FIG. 2 or a mouse (not shown), and a "print format menu" 3202 in FIG. 32 is designated. Then, the dialog 3701 in FIG. 37 is displayed. The setting contents of the dialog are stored in the "chapter print format setting table" shown in FIG. 34.

Figure 37:
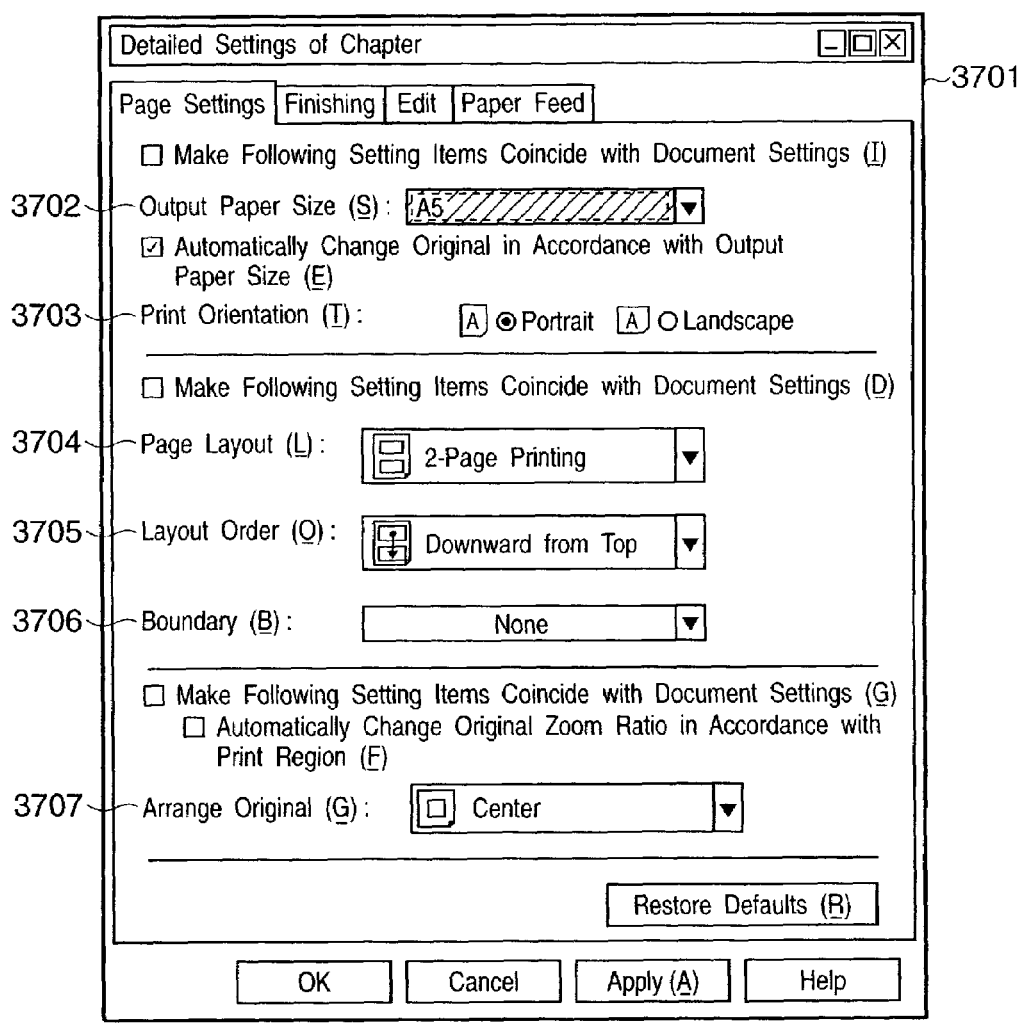
FIG. 37 is a view showing still another example of the print format setting dialog according to the embodiment.

For example, an "output paper size" 3702 in FIG. 37 can be designated to set an "output paper size" (A3, A4, A5, B4, B5, or the like) in printing pages held by a chapter. The setting contents are stored in an "output paper size" 3401 in FIG. 34. An "output paper orientation" 3703 in FIG. 37 can be designated to set an "output paper orientation" (portrait/landscape) in printing pages held by a chapter. The setting contents are stored in an "output paper orientation" 3402 in FIG. 34. A "page layout" 3704 in FIG. 37 can be designated to set the number of original pages to be laid out on one physical page in printing pages held by a chapter. The setting contents are stored in a "page layout" 3403 in FIG. 34. A "layout order" 3705 in FIG. 37 can be designated to set the "layout order" (from upper left to right, from upper left to bottom, from upper right to left, or the like) of original pages in printing pages held by a chapter. The setting contents are stored in a "layout order" 3404 in FIG. 34. A "boundary" 3706 in FIG. 37 can be designated to set whether to draw a line at the boundary between laid-out original pages in printing pages held by a chapter. The setting contents are stored in a "boundary" 3405 in FIG. 34. An "arrange original" 3707 in FIG. 37 can be designated to set a position where each original page is laid out in printing pages held by a chapter. The setting contents are stored in an "original arrangement" 3406 in FIG. 34.

Figure 33:
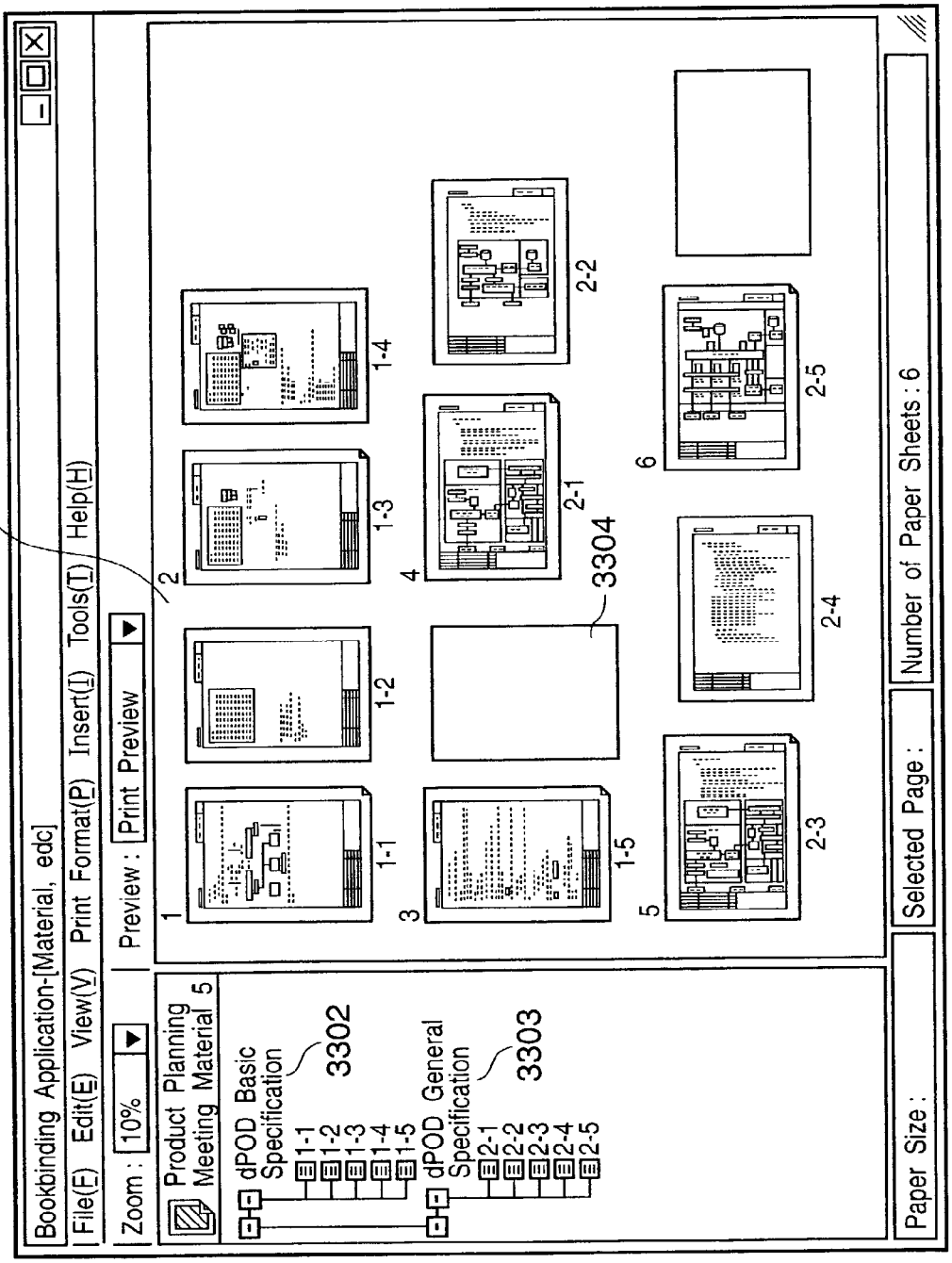
FIG. 33 is a view showing still another example of the display window according to the embodiment.

A method of automatically inserting a blank page and reflecting the result in a preview region 3201 in FIG. 32 and a preview region 3301 in FIG. 33 as a result of changing the "output paper size" 3702 in FIG. 37 and the "output paper orientation" 3703 in FIG. 37 will be explained.

The flow chart in FIG. 29 is the same as that in the first embodiment. Steps after a "printing method" 2008 in FIG. 20 is determined in step 2901 of FIG. 29 to be "single-sided printing" will be described.

(Single-sided Printing)

Figure 35:
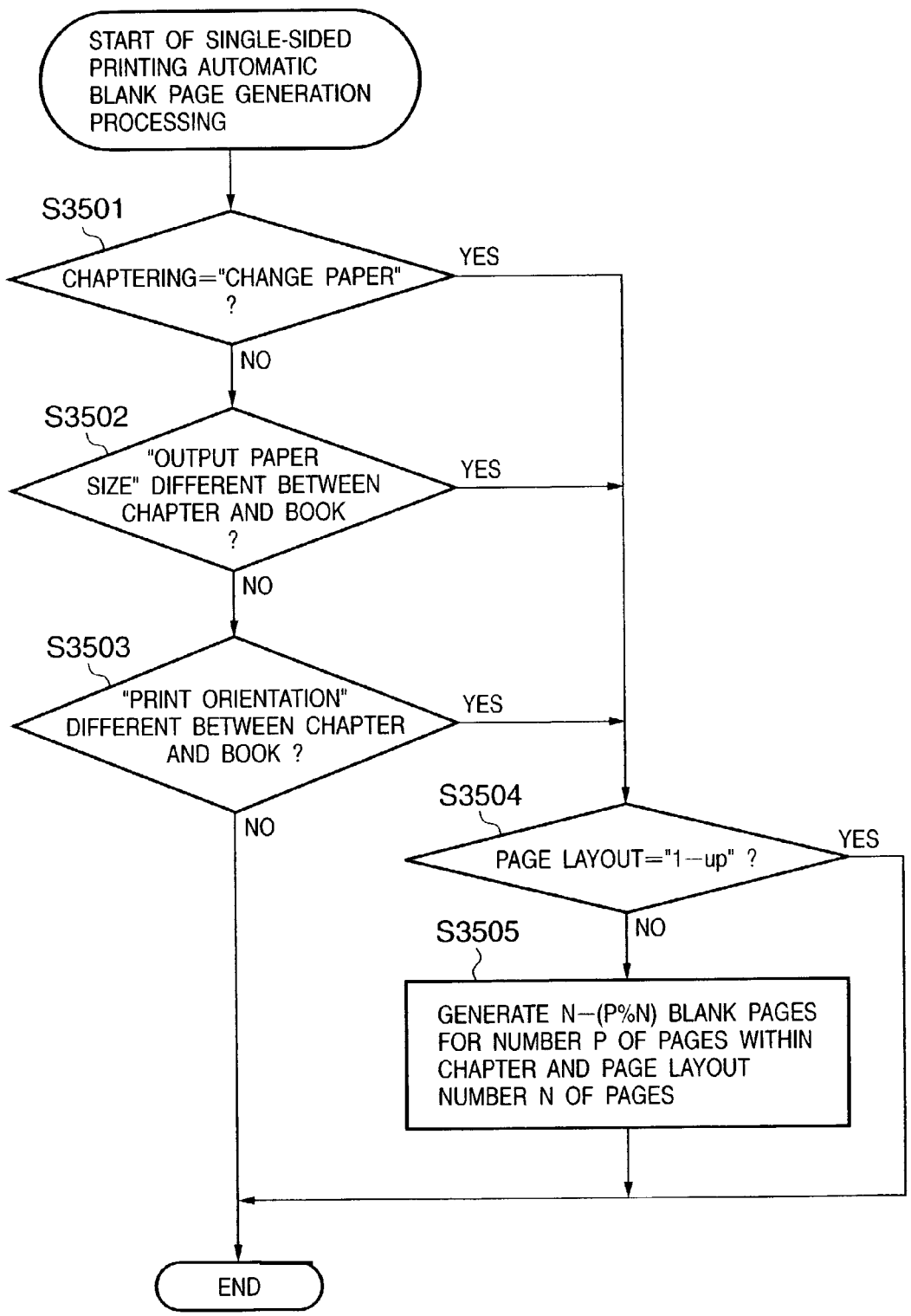
FIG. 35 is a flow chart showing still another example of the processing flow according to the embodiment.

In "single-sided printing automatic blank page generation processing" shown in FIG. 35, a "chaptering" 2007 in FIG. 20 is checked in step 3501 to determine whether "change paper" is set. If YES in step 3501, a "page layout" 2003 in FIG. 20 is checked in step 3504 to determine whether 1-page printing is set. If YES in step 3504, the processing ends without inserting any blank page. If NO in step 3504, "N–(P % N)" is calculated in step 3505 from the number (P) of original pages within the chapter and the "page layout" 2003 (N original pages/physical page) in FIG. 20, thereby obtaining the number of necessary blank original pages. Then, blank pages are generated by the calculated number.

If NO in step 3501 of FIG. 35, an "output paper size" 2001 for the book in FIG. 20 is compared with the "output paper size" 3401 for the chapter in FIG. 34. If they are different from each other, the "page layout" 2003 in FIG. 20 is checked in step 3504 to determine whether 1-page printing is set. If YES in step 3504, the processing ends without inserting any blank page. If NO in step 3504, "N–(P % N)" is calculated in step 3505 from the number (P) of original pages within the chapter and the "page layout" 2003 (N original pages/physical page) in FIG. 20, thereby obtaining the number of necessary blank original pages. Then, blank pages are generated by the calculated number.

If the "output paper size" 2001 for the book in FIG. 20 and the "output paper size" 3401 for the chapter in FIG. 34 are the same in comparison of step 3502 of FIG. 35, an "output paper orientation" 2002 for the book in FIG. 20 is compared with the "output paper orientation" 3402 for the chapter in FIG. 34 in step 3503. If they are different from each other, the "page layout" 2003 in FIG. 20 is checked in step 3504 to determine whether 1-page printing is set. If YES in step 3504, the processing ends without inserting any blank page. If NO in step 3504, "N–(P % N)" is calculated in step 3505 from the number (P) of original pages within the chapter and the "page layout" 2003 (N original pages/physical page) in FIG. 20, thereby obtaining the number of necessary blank original pages. Then, blank pages are generated by the calculated number.

In this manner, when the setting of the output paper size or print orientation in the chapter attribute is different from that in the book attribute, a paper sheet is changed similarly to the case wherein "change paper" between chapters is set.

(Double-sided Printing)

A case wherein "double-sided printing" is designated in a "printing method" 1802 in FIG. 18 will be explained.

Figure 36:
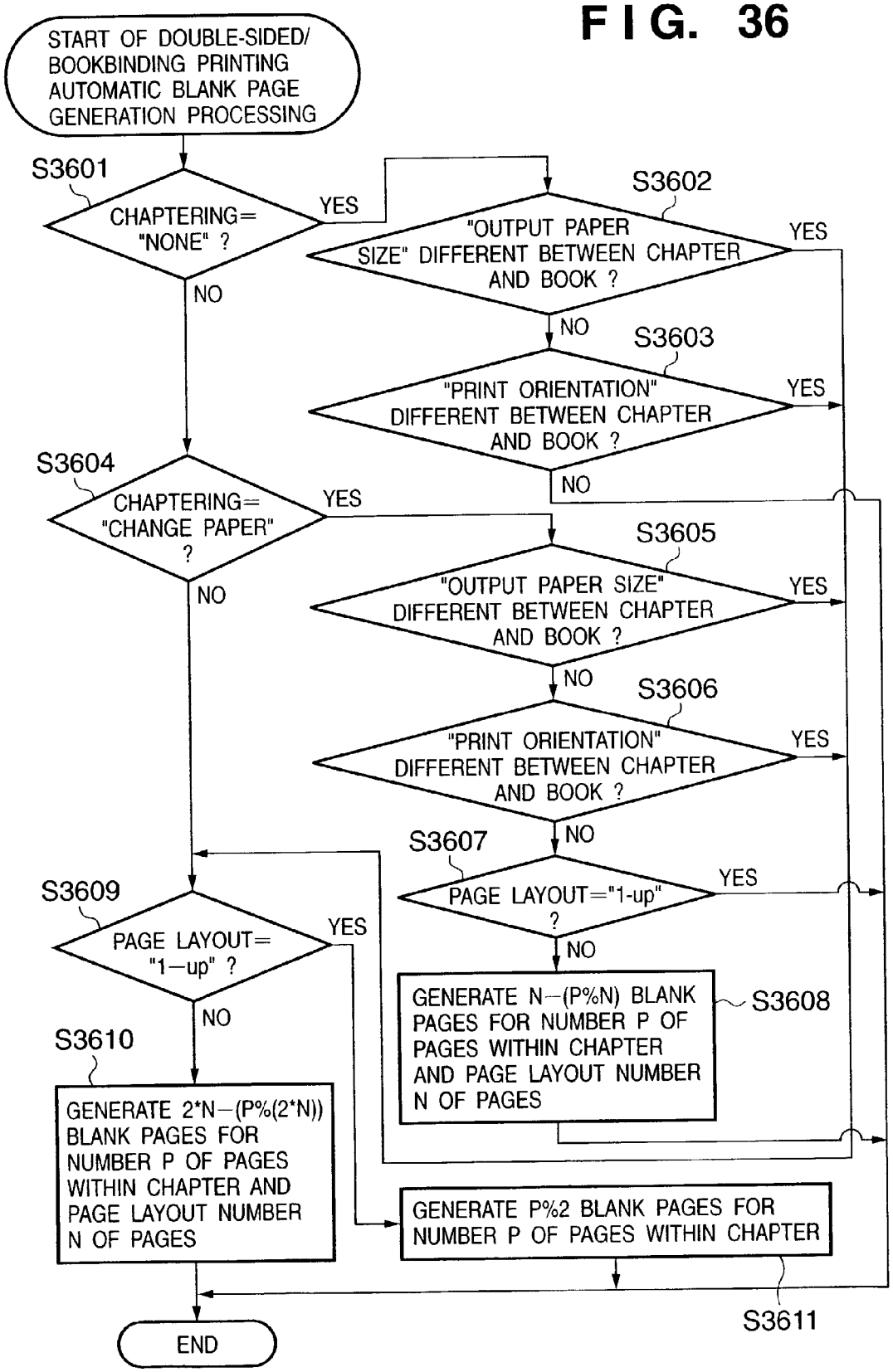
FIG. 36 is a flow chart showing still another example of the processing flow according to the embodiment.

In "double-sided/bookbinding printing automatic blank page generation processing" shown in FIG. 36, the "chaptering" 2007 in FIG. 20 is checked in step 3601 to determine whether chaptering is set to "none". If YES in step 3601, the "output paper size" 2001 for the book in FIG. 20 is compared with the "output paper size" 3401 for the chapter in FIG. 34 in step 3602. If they are different from each other, the "page layout" 2003 in FIG. 20 is checked in step 3609 to determine whether 1-page printing is set. If YES in step 3609, the number (P) of original pages within the chapter is checked in step 3611, "P %2" is calculated to obtain the number of necessary blank original pages, and blank pages are generated by this calculated number. Insertion of a blank original page will be explained with reference to the preview 3201 in FIG. 32. The preview 3201 in FIG. 32 represents setting of 1-page printing in a "page layout" 1705 in FIG. 17. Since the chapter 3203 holds five original pages, the number of blank pages to be inserted in step 3611 of FIG. 36 is "5%2"=one original page, and one blank page 3205 in FIG. 32 is previewed.

If the "output paper size" 2001 for the book in FIG. 20 and the "output paper size" 3401 for the chapter in FIG. 34 are the same in comparison of step 3602 of FIG. 36, the "output paper orientation" 2002 for the book in FIG. 20 is compared with the "output paper orientation" 3402 for the chapter in FIG. 34 in step 3603. If they are different from each other, the "page layout" 2003 in FIG. 20 is checked in step 3609 to determine whether 1-page printing is set. If YES in step 3609, the number (P) of original pages within the chapter is checked in step 3611, "P %2" is calculated to obtain the number of necessary blank original pages, and blank pages are generated by this calculated number. Insertion of a blank original page will be explained with reference to the preview 3301 in FIG. 33. The preview 3301 in FIG. 33 represents setting of one page/sheet in the "page layout" 1705 in FIG. 17. Since the chapter 3302 holds five original pages, the number of blank original pages to be inserted in step 3611 of FIG. 36 is "5%2"=one original page, and one blank page 3304 in FIG. 33 is previewed.

If NO in step 3601 of FIG. 36, the "chaptering" 2007 in FIG. 20 is checked in step 3604 to determine whether "page break" is set. If YES in step 3604, the "output paper size" 2001 for the book in FIG. 20 is compared with the "output paper size" 3401 for the chapter in FIG. 34 in step 3605. If they are different from each other, the flow advances to step 3609. The subsequent processing is the same as that described above. If the "output paper size" 2001 for the book in FIG. 20 and the "output paper size" 3401 for the chapter in FIG. 34 are the same in step 3605, the "output paper orientation" 2002 for the book in FIG. 20 is compared with the "output paper orientation" 3402 for the chapter in FIG. 34 in step 3606. If they are different from each other, the flow advances to step 3609. The subsequent processing is the same as that described above. If the "output paper orientation" 2002 for the book in FIG. 20 and the "output paper orientation" 3402 for the chapter in FIG. 34 are the same in comparison of step 3606, the "page layout" 2003 in FIG. 20 is checked in step 3607 to determine whether 1-page printing (1-up) is set. If YES in step 3607, the processing ends without inserting any blank page. If NO in step 3607, "2*N–(P %(2*N))" is calculated in step 3608 from the number (P) of original pages within the chapter and the "page layout" 2003 (N original pages/physical page) in FIG. 20, thereby obtaining the number of necessary blank original pages. Then, blank pages are generated by the calculated number.

The "chaptering" 2007 in FIG. 20 is checked in step 3604 of FIG. 36. If "page break" is not set, the flow advances to step 3609. The subsequent processing is the same as that described above.

Also in double-sided printing, a blank page is inserted to change a paper sheet when "output paper size" or "print orientation" in the chapter attribute is different from that in the book attribute regardless of whether chaptering is designated, similar to a case wherein "change paper" is set as chaptering between chapters.

For designation of a page break at the break between successive chapters, blank original pages are inserted at the end of the preceding chapter such that the number of original pages of this chapter becomes an integer multiple of the number N of original pages laid out on one physical page. With this setting, the subsequent chapter can be printed on a new physical page. In bookbinding printing, this processing is executed on the assumption that one page in a bookbinding state is one physical page. A page break can be realized between chapters in the bookbinding state.

For designation of paper change at the break between successive chapters, blank original pages are inserted at the end of the preceding chapter such that the number of original pages of this chapter becomes an integer multiple of the number 2N of original pages laid out on one paper sheet. The subsequent chapter can be printed on a new paper sheet. In bookbinding printing, this processing is executed on the assumption that one page in a bookbinding state is one paper sheet. A page break can be realized between chapters in the bookbinding state.

If the setting of the paper orientation or paper size is different between successive chapters, the subsequent chapter starts from a new paper sheet by performing the same processing as the above-described one for paper change. Original pages having different orientations or paper sizes can be prevented from being previewed or printed on the same paper sheet.

<Effects of First and Second Embodiments>

As described above, information processing apparatuses according to the first and second embodiments can automatically insert a blank page. Data to be printed at the start of a chapter can always be laid out on the first physical page or first paper sheet, and the user need not insert any blank page. Hence, the working efficiency and system productivity can increase, and a high-quality document can be created without any human error.

In addition, a document made up of data created by user-desired application programs can be created and edited, increasing the operability and document editing productivity.

When the setting of the paper orientation or paper size is different between successive chapters, the subsequent chapter starts from a new paper sheet without any particular designation, thus further increasing the operability.

[Third Embodiment]

The third and fourth embodiments will be described. Apparatuses according to the third and fourth embodiments are constituted based on the apparatus, data, and window displays shown in FIGS. 1 to 12. A description of FIGS. 1 to 12 will be omitted.

<Contents of Preview Display>

As described above, when a book file is opened by a bookbinding application, a user interface window 1100 shown in FIG. 10 is displayed. A tree portion 1101 displays a tree representing the structure of the open book (to be referred to as a book of interest hereinafter). The tree portion displays original pages and pages regarded as original pages. The "pages regarded as original pages" mean blank pages inserted by the new blank page adding function of the bookbinding application. Original pages displayed at the tree portion are displayed with their page numbers. Each page number is expressed by a combination of the number of a chapter to which the original page belongs and a page number in the chapter. Chapter numbers and page numbers are assigned sequentially from 1 for the first page in accordance with the editing result of the bookbinding printing.

The preview portion has three display methods in accordance with user designation. The first method is an original view mode where original pages are directly displayed. In the original view mode, the contents of original pages belonging to a book of interest are reduced and displayed. The display at the preview portion does not reflect any layout. The second method is a print view mode. In the print view mode, a preview portion 1102 displays original pages in a form on which the layout of the original pages is reflected. The third method is a simple print view mode. In the simple print view mode, the contents of each original page are not reflected on the display at the preview portion, and only the layout is reflected.

Figure 38:
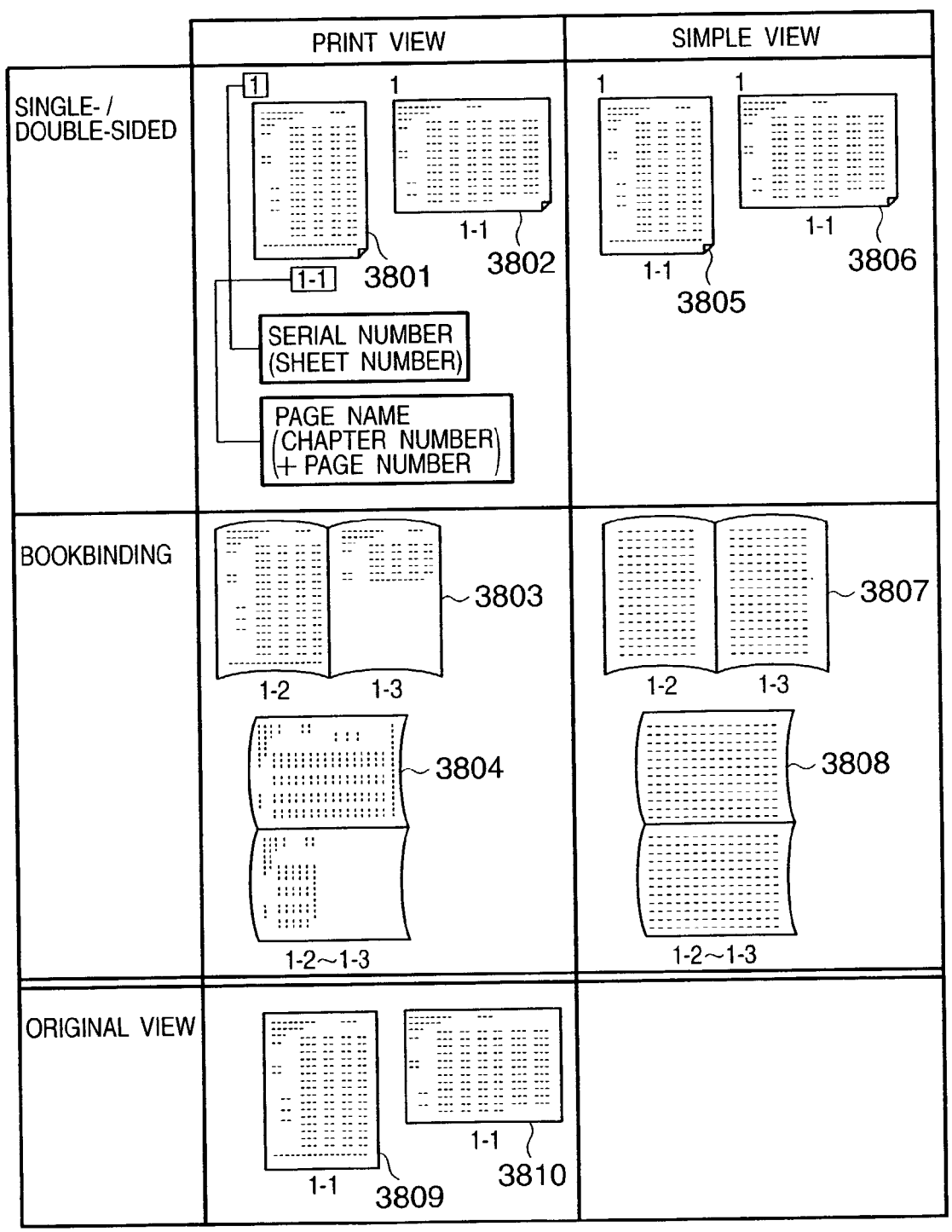
FIG. 38 is a view showing an example of a page image within the preview window.

FIG. 38 is a view showing examples of the print view, simple view, and original view of the image of an original page displayed at the preview portion. Since the print view and simple view reflect the layout, single-/double-sided printing and bookbinding printing in these views are shown.

In single-/double-sided printing in the print view mode, the contents of an original page are reduced and displayed, like a portrait original 3801 and landscape original 3802. The serial number (sheet number) of a sheet to be printed and a page number (chapter number+page number) are displayed together with an original page. In bookbinding printing, original pages are laid out and displayed on two facing pages. Original pages are displayed in accordance with the facing order, like an image 3803 shown in FIG. 38 for left opening or an image 3804 for up opening. A page number is also displayed in correspondence with the original page, but no sheet number is displayed. This is because preview images in bookbinding printing are displayed in the facing unit but two facing pages are not printed on the same sheet.

In the simple view mode, original pages 3805 to 3808 laid out similarly to the print view mode are displayed at the preview portion except that predetermined images representing original pages are displayed instead of the reduced images of original page contents. Page numbers and sheet numbers are assigned similarly to the print view.

In the original view mode, the contents of original pages are simply reduced and displayed without reflecting any layout. The reduced images of original pages such as images 3809 and 3810 are displayed regardless of designation of the layout such as single-/double-sided printing or bookbinding printing. No sheet numbers depending on the layout are displayed, but only page numbers are displayed in addition to the reduced images of original pages.

<Principle of Displaying Page Number and Sheet Number>

In the print view and simple view, page numbers are displayed for original pages displayed at the tree portion. That is, page numbers are displayed for only original pages included in a book file, but are not displayed for a blank inserted between original pages such as a slip sheet or blank generated in the layout. An original page having no contents or a blank page inserted by the user using the bookbinding printing is regarded as an original page included in a book file, and assigned a page number. A blank page laid out on the same sheet as that of an original page is assigned a page number.

A sheet number is assigned to a sheet on which an original page assigned a page number is laid out. As described above, the sheet number is displayed only when a set of sheets are displayed on the preview window, but is not displayed in bookbinding designation.

In terms of charging for printing of one page, i.e., socalled click charge, a page number is assigned to a page to be charged and is displayed in accordance with the above principle. That is, a sheet inserted by an inserter and even a sheet fed from a sheet feed cassette are not charged as far as any original is printed on them, like a slip sheet. For such a sheet, no page number is displayed.

<Example of Preview Window>

The preview portion is displayed in the above-described fashion. A material printed out is not only a paper sheet on which an original page is printed, but includes a paper sheet inserted in printing such as a slip sheet, index sheet, front/ back cover. A blank page not included in original pages may be output depending on the layout such as double-sided printing, N-up designation, or designation of paper change between chapters. An example of the preview display, and especially assignment of a sheet number and page number will be explained by exemplifying several cases.

(1) Book File to Which Blank Page is Inserted by Bookbinding Application

Figure 39:
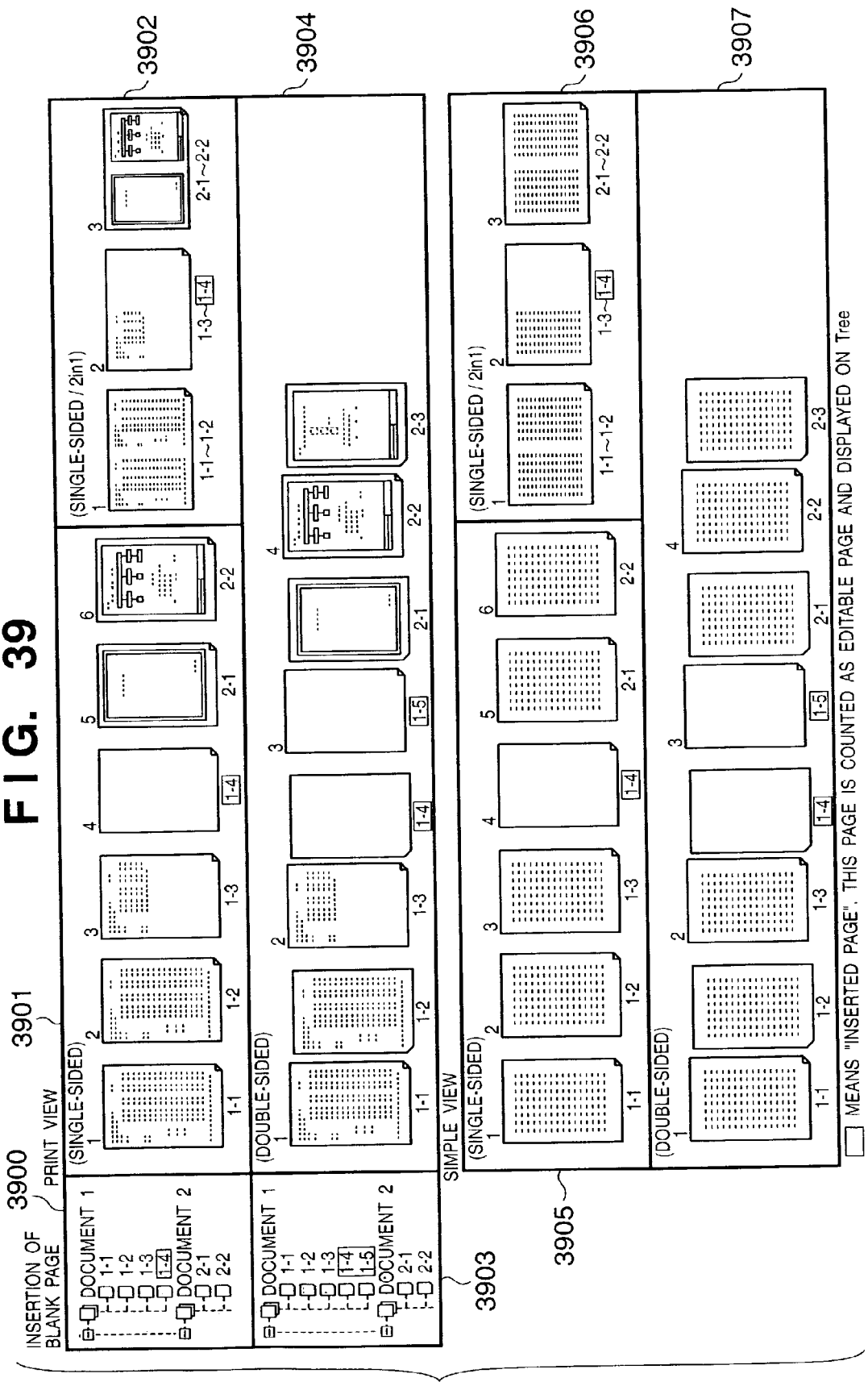
FIG. 39 is a view showing an example of a preview window when a blank paper sheet is inserted.

FIG. 39 shows an example of the UI window of the bookbinding application when a book file to which a blank page is inserted by the bookbinding application is opened. A tree portion 3900 displays the structure of the book file including the inserted blank page. This book file includes two chapters: document 1 and document 2. Document 1 is made up of four original pages, whereas document 2 is made up of two original pages. Documents 1 and 2 are the names of respective chapters, and their chapter numbers are 1 and 2.

In FIG. 39, an inserted blank page 1-4 is displayed with a rectangular frame in order to discriminate it from other pages. A print view 3901 shows an example when the printing method item in the book attribute of the book file at the tree portion 3900 is "single-sided printing". A sheet number is displayed at the upper corner of each original page, and a page number is displayed below the original page. A blank page is also displayed with a sheet number "4" and page number "1-4".

A print view 3902 shows an example when the printing method item in the book attribute of the book file at the tree portion 3900 is "2in1". "2in1" is one of N-up designations, and designates to print two original pages on one print page. A sheet number is displayed at an upper corner every two original pages, and a page number is displayed below them. In N-up designation, one print page may be constituted by a plurality of vertically aligned columns, and a page number is not always displayed for each original page. Thus, a page number is displayed by connecting start and last original page numbers to be printed on one print page with a sign "~", as shown in the print view 3902.

A tree portion 3903 shows an example when two pages 1-4 and 1-5 are inserted as blank pages. A print view 3904 is a preview window when the printing method item in the book attribute of the book file at the tree portion 3903 is designated as "double-sided printing". Original pages are printed one by one on the upper and lower surfaces of one sheet. A sheet number is assigned to a pair of two original pages. Page numbers are assigned and displayed in the original page order.

Simple views 3905 to 3907 correspond to the print views 3901 to 3903, respectively. The simple views 3905 to 3907 do not display the reduced contents of original pages. Sheet numbers and page numbers are displayed similarly to the print view.

In this fashion, a blank page inserted by the function of the bookbinding application is assigned a page number, similar to an original page, and a sheet including the blank page is assigned a sheet number.

(2) Book File to Which Index Sheet is Inserted

Figure 40:
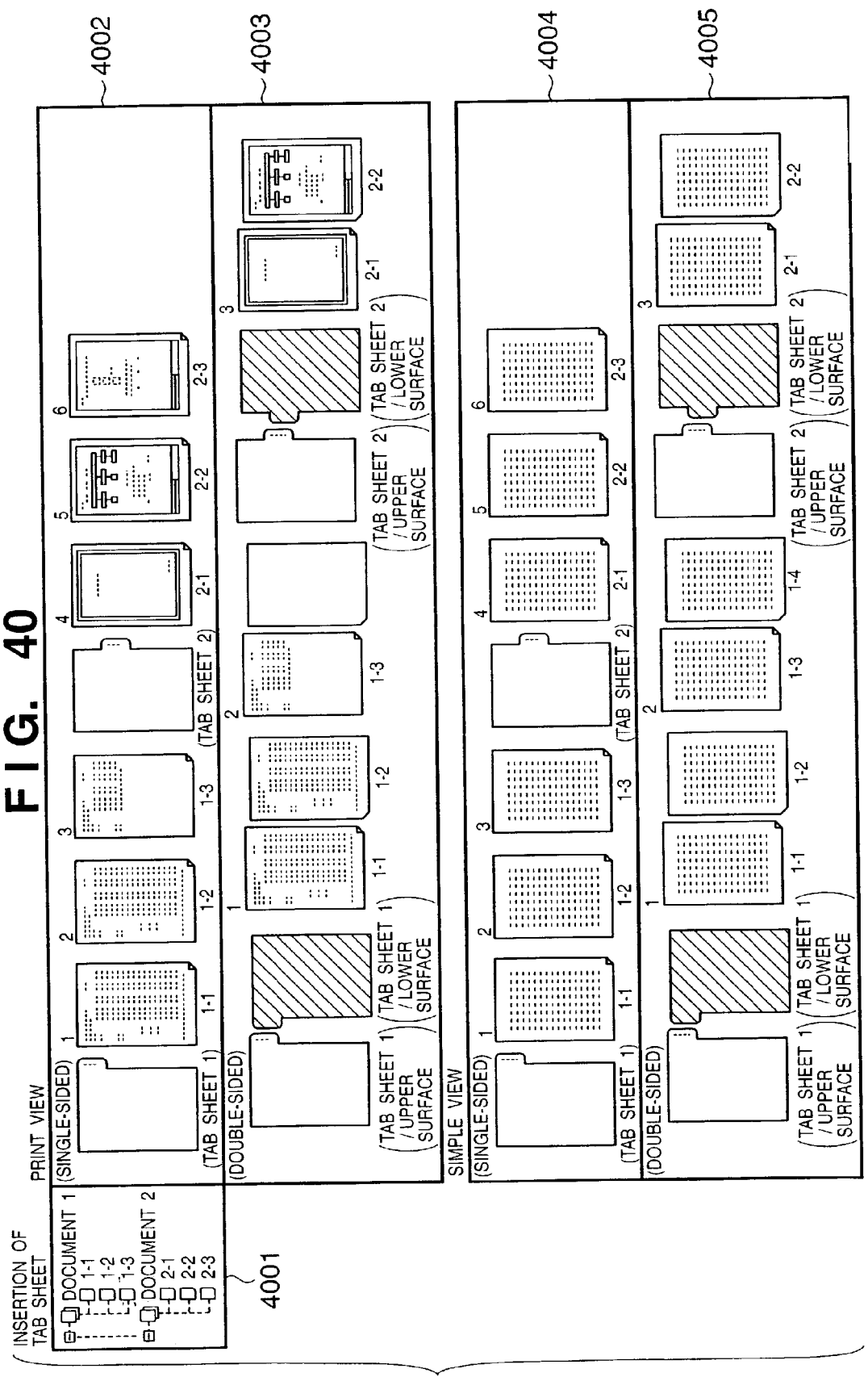
FIG. 40 is a view showing an example of a preview window when an index sheet is inserted.

FIG. 40 shows an example of the UI window of the bookbinding application when a book file to which an indexsheet is inserted by the bookbinding application is opened.

A tree portion 4001 displays the structure of the book file. This book file includes two chapters: document 1 and document 2. Document 1 is made up of three original pages, and document 2 is also made up of three original pages. Whether to insert an index sheet is determined based on the index sheet item in the book attribute. If insertion of an index sheet is designated, an image representing an index sheet is displayed at the preview portion, similar to printing. The index sheet is not included as an original page, and thus is not included in the tree portion 4001.

A print view 4002 displays a preview window when single-sided printing is designated. Sheet and page numbers are displayed for an original page. For an index sheet, an identification name "(index sheet)" is displayed in place of a page number without displaying any sheet number. The identification name is "index sheet/upper surface" or "index sheet/lower surface". In FIG. 40, the index sheet is displayed as a tab sheet, both of which are the same.

A print view 4003 shows an example of the preview window when double-sided printing is designated. In this case, the image of the lower surface of an index sheet is also displayed. However, no page number or sheet number is displayed for the index sheet, similar to single-sided printing. In double-sided printing, when an index sheet is inserted between chapters, the lower surface of a sheet immediately before the index sheet may become blank. In the print view 4003, the lower surface of sheet 2 is blank. This blank is not included in original pages, and no page number is displayed. On the preview window, a print page which cannot be printed is hatched and displayed. Since no printing is performed on the lower surface of the index sheet under the restriction of the mechanism, the lower surface is hatched and displayed.

Simple views 4004 and 4005 show preview: windows in the simple view mode when single-sided printing and double-sided printing are designated for the book file at the tree portion 4001. These simple views 4004 and 4005 are the same as the print view except that no original data is reduced and displayed.

(3) Book File to Which Slip Sheet is Inserted from Sheet Feed Cassette

Figure 41:
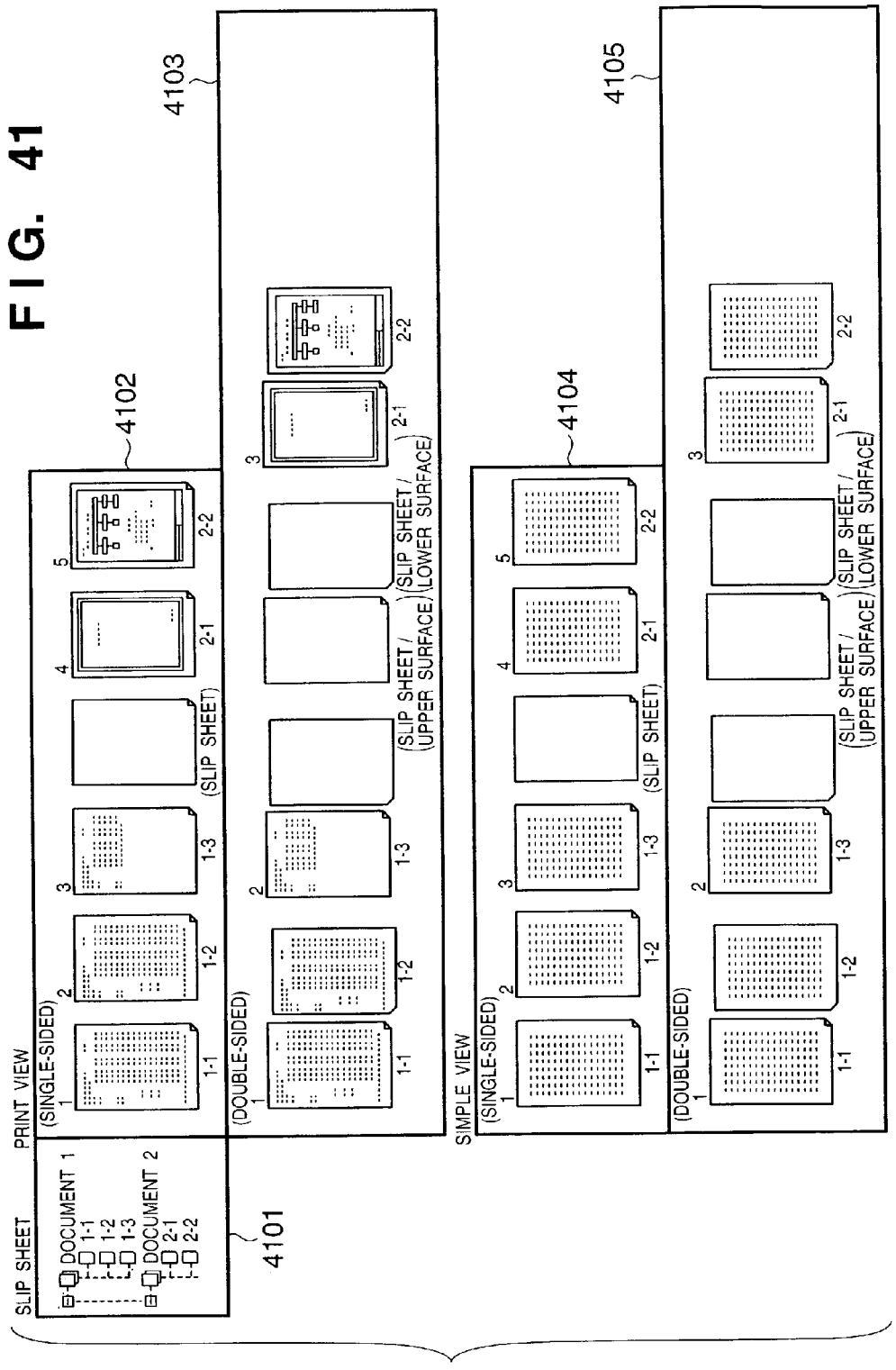
FIG. 41 is a view showing an example of a preview window when a slip sheet is inserted.

FIG. 41 shows an example of the UI window of the bookbinding application when a book file to which insertion of a slip sheet from a sheet feed cassette is designated by the bookbinding application is opened. A tree portion 4101 displays the structure of the book file. This book file includes two chapters: document 1 and document 2. Document 1 is made up of three original pages, whereas document 2 is made up of two original pages. Whether to insert a slip sheet from the sheet feed cassette is determined based on the slip sheet item in the book attribute. If insertion of a slip sheet is designated, an image representing a slip sheet is displayed at the preview portion, similar to printing. The slip sheet is not included as an original page, and thus is not included in the tree portion 4101.

A print view 4102 displays a preview window when single-sided printing is designated. Sheet and page numbers are displayed for an original page. For a slip sheet, an identification name "(slip sheet)" is displayed in place of a page number without displaying any sheet number.

A print view 4103 shows an example of the preview window when double-sided printing is designated. In this case, the image of the lower surface of a slip sheet is also displayed. However, no page number or sheet number is displayed for the slip sheet, similar to single-sided printing.

The identification name is "slip sheet/upper surface" or "slip sheet/lower surface".

Simple views 4104 and 4105 show preview windows in the simple view mode when single-sided printing and double-sided printing are designated for the book file at the tree portion 4101. These simple views 4104 and 4105 are the same as the print view except that no original data is reduced and displayed.

(4) Book File to Which Slip Sheet is Inserted from Inserter

Figure 42:
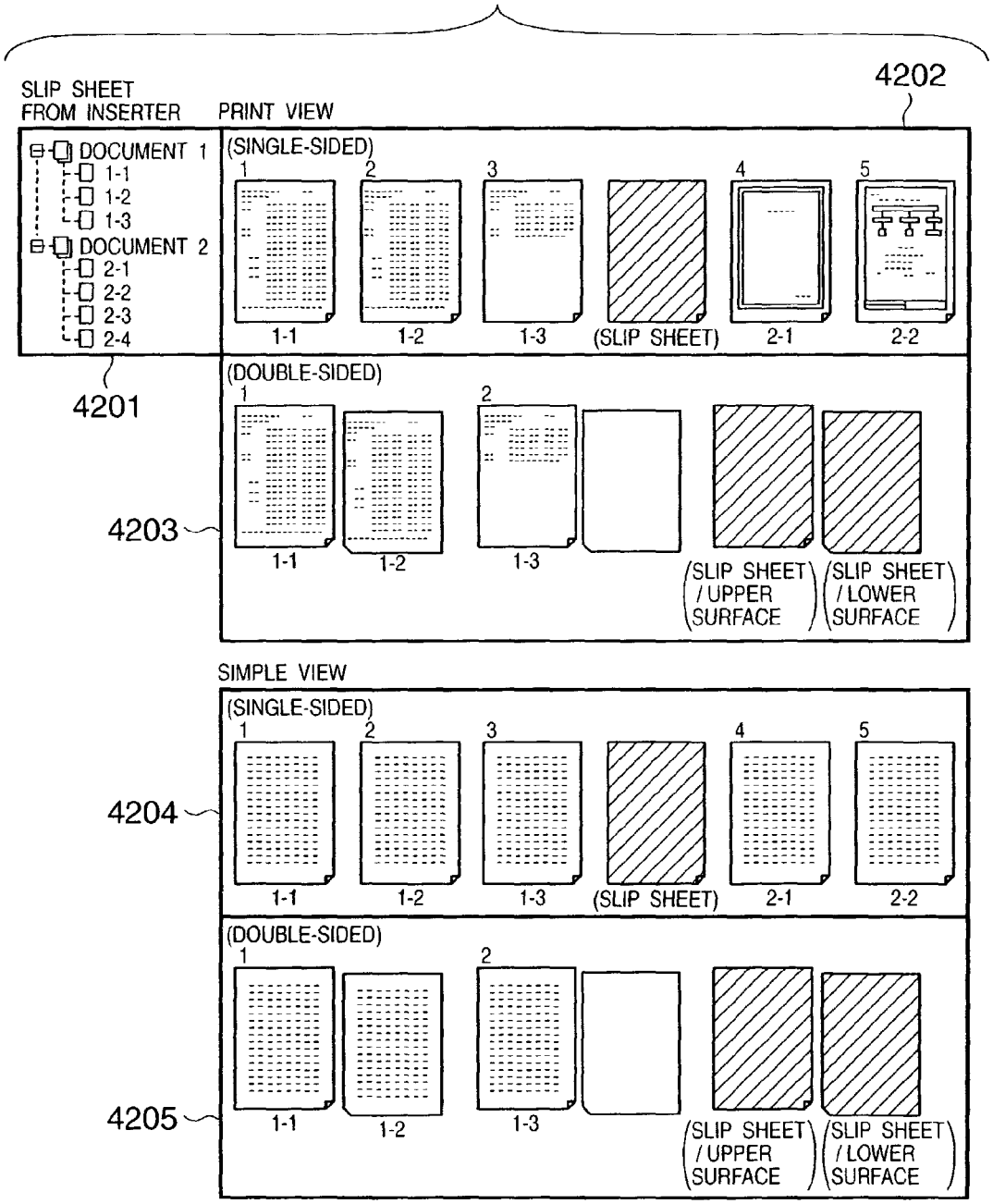
FIG. 42 is a view showing an example of a preview window when a slip sheet is inserted from an inserter.

FIG. 42 shows an example of the UI window of the bookbinding application when a book file to which insertion of a slip sheet from an inserter is designated by the bookbinding application is opened. A tree portion 4201 displays the structure of the book file. This book file includes two chapters: document 1 and document 2. Document 1 is made up of three original pages, whereas document 2 is made up of four original pages. Whether to insert a slip sheet from the inserter is determined based on the slip sheet item in the book attribute. If insertion of a slip sheet is designated, the image of a slip sheet is displayed at the preview portion. The slip sheet is not included as an original page, and thus is not included in the tree portion 4201.

A print view 4202 displays a preview window when single-sided printing is designated. Sheet and page numbers are displayed for an original page. For a slip sheet, an identification name "(slip sheet)" is displayed instead of a page number without displaying any sheet number. Since no printing is performed on the slip sheet under the restriction of the mechanism, the slip sheet is hatched and displayed.

A print view 4203 shows an example of the preview window when double-sided printing is designated. In this case, the image of the lower surface of a slip sheet is also displayed. However, no page number or sheet number is displayed for the slip sheet, similar to single-sided printing. The identification name is "slip sheet/upper surface" or "slip sheet/lower surface". In the print view 4203, the lower surface of sheet 2 is blank. This blank is not included in original pages, and no page number is displayed.

Simple views 4204 and 4205 show preview windows in the simple view mode when single-sided printing and double-sided printing are designated for the book file at the tree portion 4201. These simple views 4204 and 4205 are the same as the print view except that no original data is reduced and displayed.

(5) Book File to Which Bookbinding Printing is Designated

Figure 43:
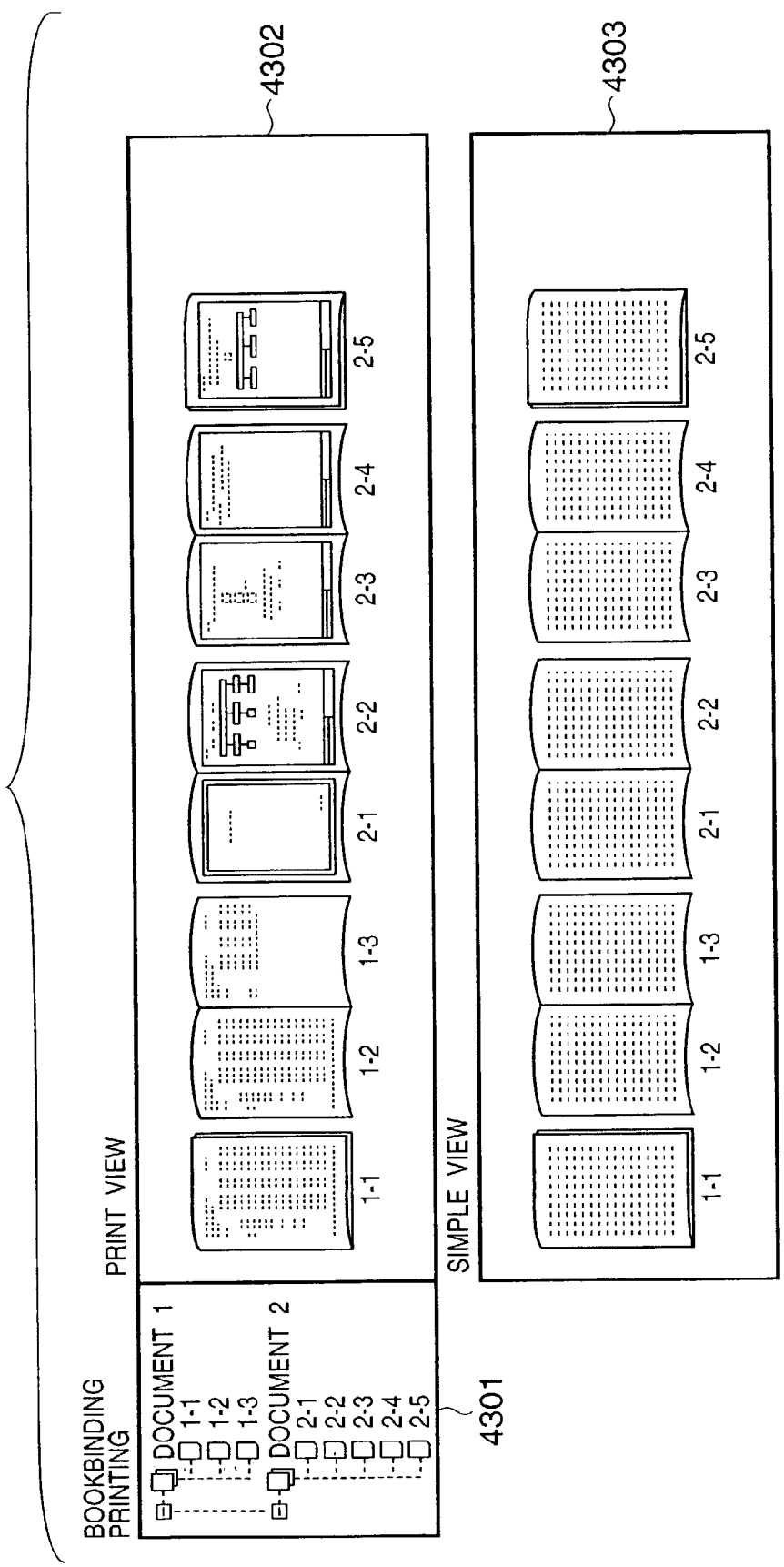
FIG. 43 is a view showing an example of a preview window when bookbinding printing is designated.

FIG. 43 shows an example of the UI window of the bookbinding application when a book file to which bookbinding printing using a cover from an inserter is designated by the bookbinding application is opened. A book file displayed at a tree portion 4301 includes two chapters: document 1 and document 2. Document 1 is made up of three original pages, whereas document 2 is made up of five original pages. Designation of bookbinding printing is described in the printing method item and detailed bookbinding item of the book attribute. When bookbinding printing is designated as the printing method, original pages are displayed in a bookbinding format in a print view 4302 of the preview portion. The print view 4302 shows an example when left-opening bookbinding printing is designated for a book file having a total of eight original pages. Detailed bookbinding printing designation includes designation of a unit of bookbinding representing the number of sheets of a bundle to be folded into two. The display at the preview portion does not reflect designation of the unit of bookbinding, and the book file is displayed in a final book format. In the print view 4302, original pages from start page 1-1 to last page 2-5 are displayed sequentially from the left on facing pages except pages serving as front and back covers. At this time, a page number is assigned below each reduced page image, but no sheet number is assigned. This is because original pages so displayed as to face each other may be printed on different sheets, and even if sheet numbers are displayed, it is difficult for the user to recognize them as a series of sheet numbers. A simple view 4303 is an example when the print view 4302 is displayed in the simple mode. The simple view 4303 is the same as the print view except that no original data is reduced and displayed.

(6) Book File to Which N-up Printing is Designated

Figure 44:
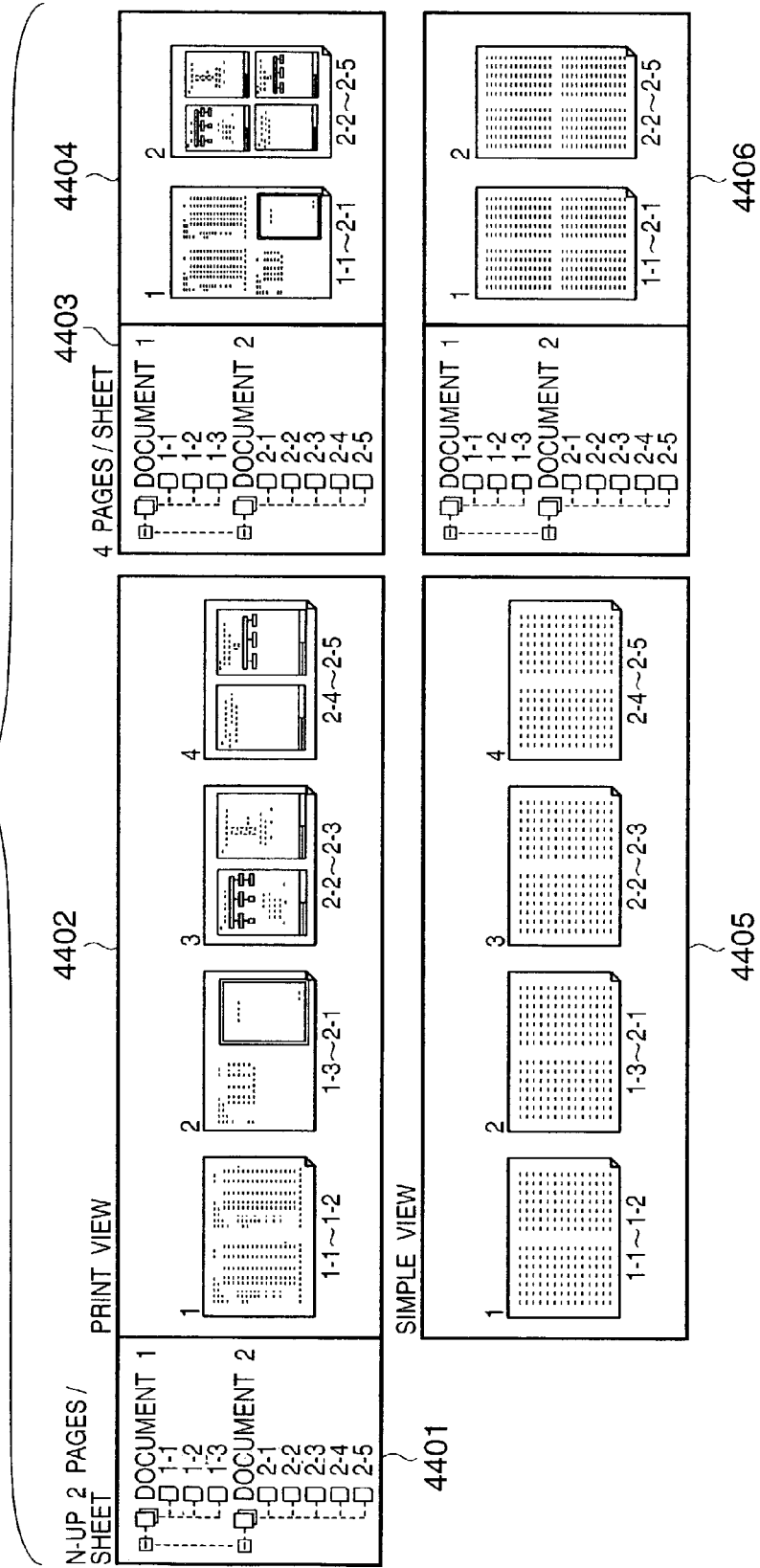
FIG. 44 is a view showing an example of a preview window when N-up printing is designated.

FIG. 44 shows an example of the UI window of the bookbinding application in N-up designation for N=2(2-up designation) by the bookbinding application in which two original pages are laid out on one print page. A book file displayed at a tree portion 4401 has the same structure as that in FIG. 43. N-up designation is described in the N-up printing item of the book attribute. When 2-up printing is designated, a print view 4402 at the preview portion displays a preview image obtained by laying out two successive original pages reduced to an area ratio of 1/2 on one elongated print page. In the preview display for designation of N-up printing, page numbers are assigned to all pages laid out on one print page. In the print view 4402 for 2-up designation, two original page numbers such as 1-3~2-1 are assigned to one print page. In a print view 4404 for 4-up designation, four original page numbers such as 1-1~2-1 are assigned to one print page. A sheet number is assigned every sheet. Simple views 4405 and 4406 are examples when the print views 4402 and 4404 are displayed in the simple mode. The simple views 4405 and 4406 are the same as the print views except that no original data is reduced and displayed.

(7) Book File to which Cover is Inserted from Inserter

Figure 45:
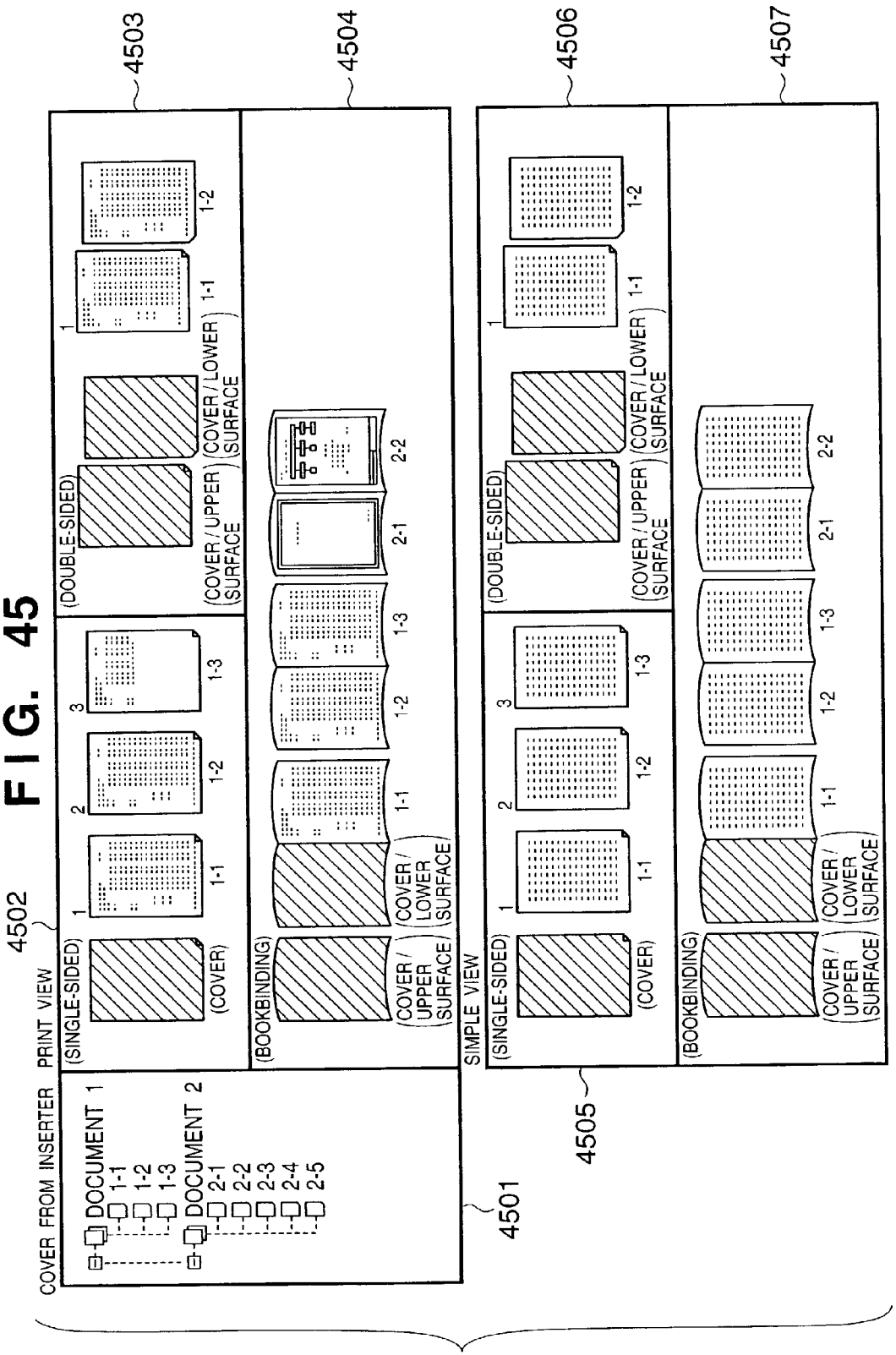
FIG. 45 is a view showing an example of a preview window when a cover is inserted from the inserter.

FIG. 45 shows an example of the UI window of the bookbinding application when a book file to which insertion of a cover from an inserter is designated by the bookbinding application is opened. A book file displayed at a tree portion 4501 has the same structure as that in FIG. 43. Designation of inserting a cover is described in the front/back cover item of the book attribute. When insertion of a cover from the inserter is designated, a preview window is displayed in accordance with designation of the printing method. If single-sided printing is designated, a print view 4502 displays an original page subsequent to a cover. In this case, no data can be printed on the cover supplied from the inserter, and thus the cover is hatched and displayed. Page and sheet numbers are added to each original page. For the cover, "(cover)" is displayed as a page number without displaying any sheet number.

A print view 4503 shows an example of the display when double-sided printing is designated as the printing method. Similar to a sheet on which original pages are laid out, the two surfaces of a cover are displayed and assigned page numbers "(cover/upper surface)" and "(cover/lower surface)". Images obtained by laying out original pages on the two surfaces of one sheet are displayed, and a sheet number is assigned to the two surfaces. In the print view 4503, a sheet number "1" is assigned to original pages 1-1 and 1-2.

A print view 4504 shows an example of the display when bookbinding printing is designated as the printing method. In this case, preview images in a bookbinding format including an inserted cover are displayed. No sheet number is displayed, similar to FIG. 43.

Simple views 4505, 4506, and 4507 show examples of displaying the print views 4502, 4503, and 4504 in the simple view mode. These simple views 4505 to 4507 are the same as the print views except that no original data is reduced and displayed.

<Preview Window Display Procedures>

Figure 46:
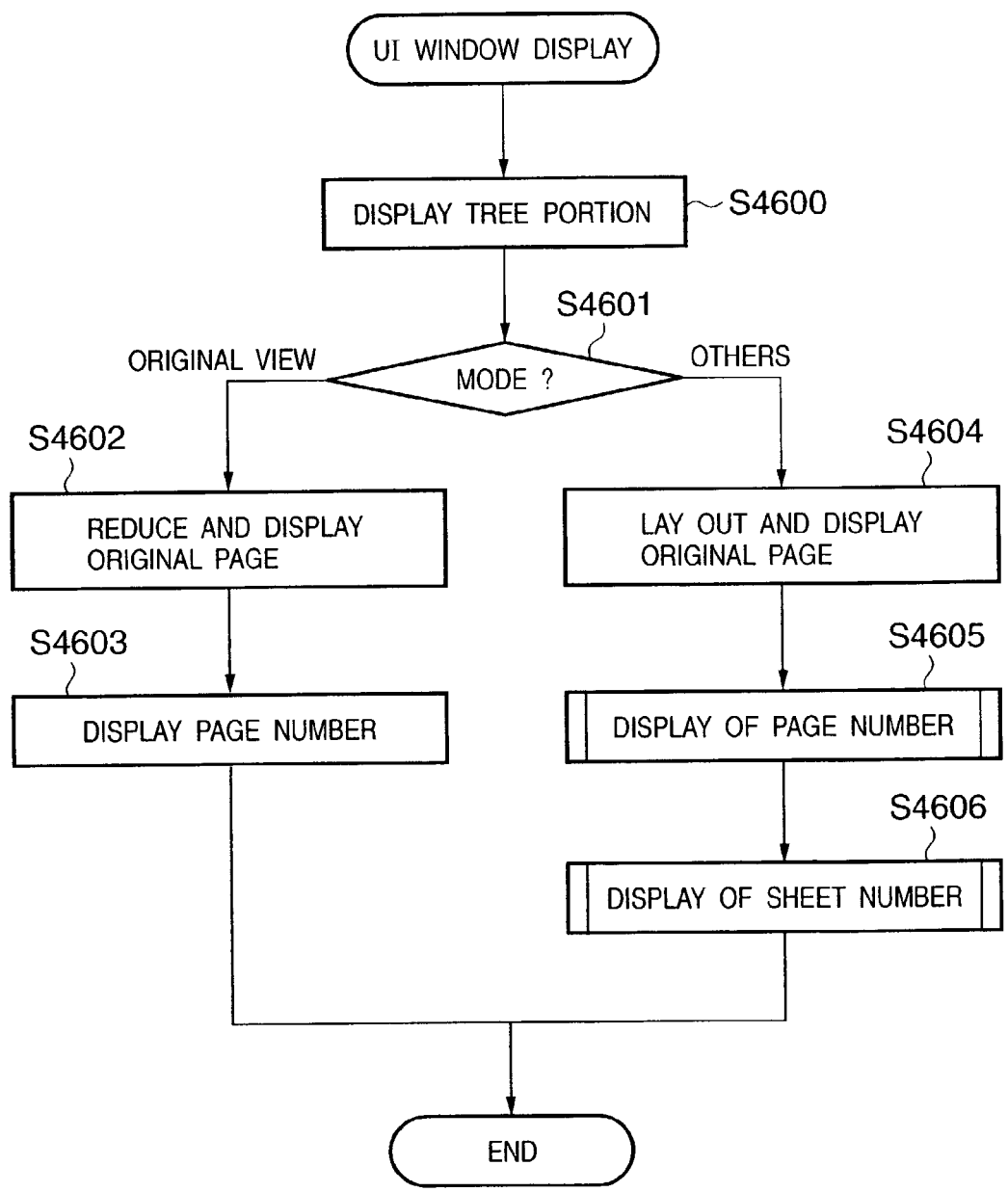
FIG. 46 is a flow chart showing the UI window display procedures of a bookbinding application.

Procedures of displaying the UI window of each example described above by the bookbinding application will be explained. FIG. 46 is a flow chart showing the procedures.

In FIG. 46, the tree portion is displayed in step S4600. The tree portion represents the structure of a book file, and is an image which visualizes the data structure of the book file shown in FIG. 3. The tree structure data shown in FIG. 3 is sequentially scanned from a book node. Symbols, chapter names, and page numbers are displayed for chapter nodes and original page nodes. The order of chapters and original pages is defined by, e.g., the order of linking to upper nodes.

In step S4601, a designated display mode is checked. The display mode includes the original view mode, print view mode, and simple view mode, as described above. In the original view mode, original pages are reduced and displayed in the order of chapter numbers and page numbers (step S4604), and page numbers are displayed for the respective original pages (step S4603).

In the print view mode or simple view mode, original pages are displayed in accordance with the layout of the original pages. The original page layout is determined in accordance with the book attribute and chapter attribute. For example, the paper size and N-up printing can be designated in the chapter attribute, and are determined for each chapter on the basis of the chapter attribute. The printing method and insertion of paper from an inserter are determined based on the book attribute. In the print view, the reduced image of an original page is displayed. In the simple view, a predetermined pattern representing a page is displayed.

For example, step S4604 is realized by the following procedures. In creating image data of original pages, print page frames are arranged at the preview portion in accordance with the layout. At this time, print page frames for single-sided printing, print page frames for double-sided printing, or print page frames for bookbinding printing are generated in a designated paper direction in accordance with the printing method. If insertion of a cover, slip sheet, or index sheet is designated, a frame for a page to be inserted is also displayed at the insertion portion. When chaptering is designated, and bookbinding printing, double-sided printing, or N-up printing is designated, a print page frame for a blank page is also inserted for a page break or paper change in accordance with these designations. The blank page is marked.

Then, the images of reduced original pages for the print view mode or predetermined images for the simple view mode are drawn within the generated print page frames except the blank page in accordance with N-up designation. Finally, the generated image data are displayed.

After the original pages are displayed by the above procedures, page numbers are displayed on the respective original pages in step S4605. Subsequently, sheet numbers are assigned to respective sheets, and the display ends. Although a page number and sheet number are repetitively displayed on each element in FIG. 46, they may be displayed at once after all image data are generated.

Figure 47:
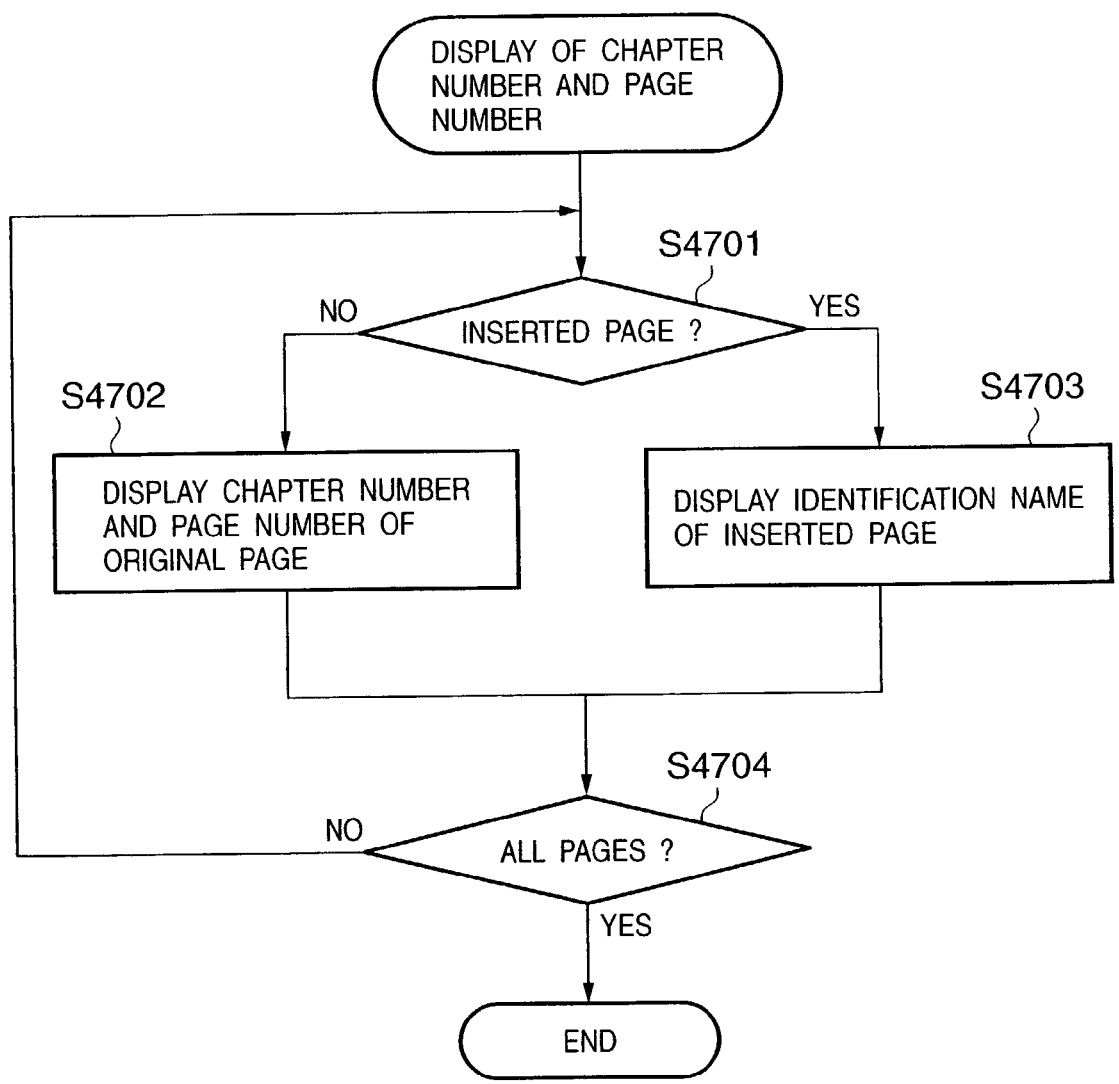
FIG. 47 is a flow chart showing the page number display step in the UI window display procedures.

FIG. 47 shows step S4605 in detail. Attention is sequentially given to previewed page images, and whether each page image is one of original pages or an inserted page other than an original page is checked (step S4701). If the page image is an inserted page, no page number is displayed. For a page whose insertion is explicitly designated by the user, a page identification name is displayed instead of a page number (step S4703). For example, for a page image corresponding to a page (sheet) inserted in accordance with user designation, an identification name such as "slip sheet", "index sheet", or "cover" is displayed in accordance with the type of page. To the contrary, no page number is assigned to the page image of a blank page automatically inserted by the bookbinding application. The automatically inserted blank page is a lower surface which becomes blank in designation of double-sided printing, a blank page generated due to a page break or paper change between chapters, or a blank page in designation of N-up printing.

As for a page image corresponding to an original page, a combination of a chapter number to which an original page of interest belongs and a page number in the chapter is displayed as a page number (step S4702). This processing is repetitively performed for all pages while changing original pages of interest (step S4704).

Figure 48:
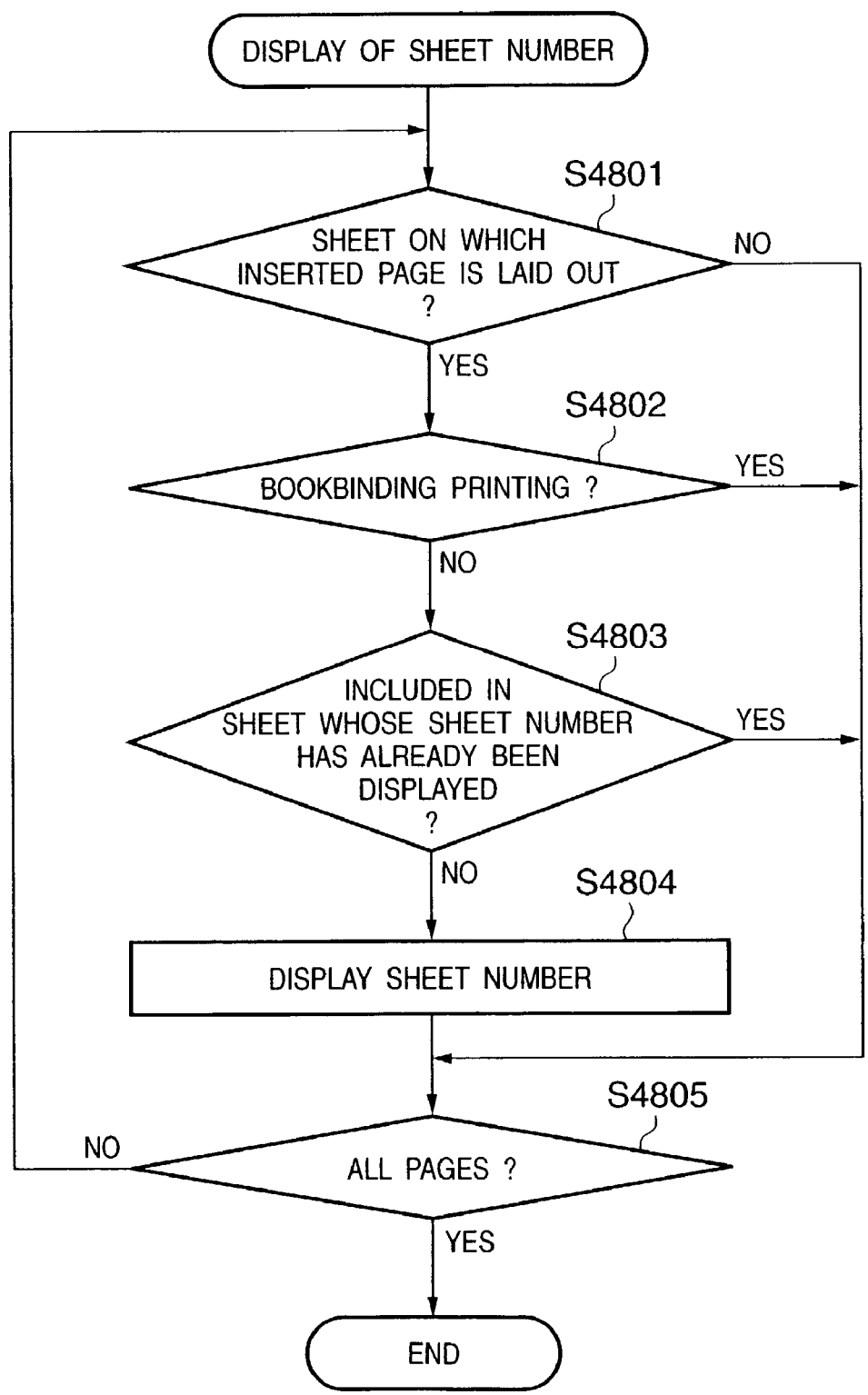
FIG. 48 is a flow chart showing the sheet number display step in the UI window display procedures.

FIG. 48 shows step S4606 in detail. Whether a page image of interest is a sheet on which an inserted page is laid out is checked (step S4801). If YES in step S4801, whether the printing method is bookbinding printing is checked (step S4802). If YES in step S4802, no sheet number is displayed, and the flow branches to step S4805. If NO in step S4802, whether the page image of interest is included in a sheet whose sheet number has already been displayed is checked (step S4803). If YES in step S4803, no sheet number need be displayed, and the flow branches to step S4805. For example, this processing applies to a lower surface in designation of double-sided printing. In N-up designation, a page image is displayed every N original pages, and no sheet number need be added. If NO in step S4803, a sheet number is displayed (step S4804). The sheet number is incremented by one every sheet from an initial value of 1. This processing is repeated for all page images, and the display of sheet numbers ends (step S4805).

In this way, a page image, page number, and sheet number are displayed on the preview window.

<Effects of Systems According to Third and Fourth Embodiments>

As described above, document processing systems according to the third and fourth embodiments can convert application data generated by commercially available application programs used by the user into a predetermined format, edit them in accordance with a user-desired format, and manage them as one book file. Since the book file can be edited in pages, even data generated by an application not designed to combine data can be managed as a single output file. The data use convenience can be greatly increased.

By displaying the structure of the edited book file on the preview window, the user can visually confirm the book file layout without printing it. In editing the book file in pages, the user can easily confirm a page to be edited.

Since page numbers are displayed for original pages on the preview window, original pages included in the book file and other pages out of previewed page images can be easily discriminated. An identification name is displayed for an editable page inserted by explicit user designation, while no identification name or page number is displayed for an uneditable page inserted by the bookbinding application. The user can clearly discriminate pages editable by the user and other pages on the preview window. Page numbers are displayed for only pages to be charged in a copying machine or printing apparatus managed by a sheet charging method.

The user can, therefore, know the print charge on the preview window before printing.

Sheet numbers are assigned to sheets fed from a sheet feed cassette and are previewed. The user can know the number of paper sheets to be consumed on the preview window in advance.

When bookbinding printing is designated as the printing method, no sheet number is displayed, which can prevent the user from confusion.

In N-up designation, the range of original page numbers on each sheet is displayed. Even on the preview window in N-up designation, the user can accurately recognize the print layout.

The present invention may be applied to a system constituted by a plurality of devices (e.g., a host computer, interface device, reader, and printer) or an apparatus (e.g., a copying machine or facsimile apparatus) formed from a single device. The object of the present invention is also achieved when a storage medium which stores software program codes for realizing the functions of the above-described embodiments is supplied to a system or apparatus, and the computer (or the CPU or MPU) of the system or apparatus reads out and executes the program codes stored in the storage medium.

In this case, the program codes read out from the storage medium realize the functions of the above-described embodiments, and the storage medium which stores the program codes constitutes the present invention.

The storage medium for supplying the program codes includes a floppy disk, hard disk, optical disk, magnetooptical disk, CD-ROM, CD-R, magnetic tape, nonvolatile memory card, and ROM.

The functions of the above-described embodiments are realized when the computer executes the readout program codes. Also, the functions of the above-described embodiments are realized when an OS (Operating System) running on the computer performs part or all of actual processing on the basis of the instructions of the program codes.

The functions of the above-described embodiments are also realized when the program codes read out from the storage medium are written in the memory of a function expansion board inserted into the computer or the memory of a function expansion unit connected to the computer, and the CPU of the function expansion board or function expansion unit performs part or all of actual processing on the basis of the instructions of the program codes.

As described above, the third and fourth embodiments can provide a document processing system and method which enable creating and editing a document made up of data created by user-desired application programs, and increase the data availability and productivity.

By displaying the structure of an edited book file on the preview window, the user can visually confirm the book file layout without printing it. That is, an object to be edited can be easily confirmed on the display, increasing the editing operability.

The number of sheets necessary for printing can be obtained in advance.

When a printing apparatus to be used comprises a paper inserting function called an inserter, a page to be inserted can be identifiably displayed.

As many apparently widely different embodiments of the present invention can be made without departing from the spirit and scope thereof, it is to be understood that the invention is not limited to the specific embodiments thereof except as defined in the appended claims.

What is claimed is:

1. A document processing apparatus having a print layout application, a document despooler module and a printer driver, wherein said print layout application performs editing of document data which includes original pages in which a section can be defined using the original page as a unit of definition, wherein said print layout application works independently of the printer driver, and wherein said printer driver generates print data to be printed by a printing apparatus, said document processing apparatus comprising:

a designation unit which designates a print layout having a print format indicating that the original pages are arranged on a surface of a print sheet;

a generation unit which generates a document file comprising the document data and the print layout designated by said designation unit;

a determination unit which determines that a page break is designated at a section break in the document data;

a derivation unit which, when the page break is designated, derives a number of blank document pages so as to lay out a first original page of a section immediately after the section break at a start of a new surface of a print sheet, when the original pages are laid out in accordance with the designated print layout;

an insertion unit which inserts blank document pages for the number of blank document pages derived by said derivation unit at an end of a section immediately before the section break;

a layout unit which lays out the original pages of the document data including the blank document pages inserted by said insertion unit in accordance with the designated print layout; and an output unit which outputs the designated print layout and drawing data to the printer driver via an operating system, wherein said print layout application controls said designation unit, said generation unit, said determination unit, said derivation unit, said insertion unit and said layout unit, and wherein said document despooler module controls said output unit.

2. The apparatus according to claim 1, further comprising:

a second determination unit which determines that paper change is designated at the section break of a section; and a second insertion unit which, when the paper change is designated, inserts a number of blank document pages at the end of a section immediately before the section break so as to lay out a first original page of a section immediately after the section break at a start of a new print sheet when the original pages are laid out in accordance with the designated print layout.

3. The apparatus according to claim 2, wherein the print layout includes bookbinding printing designation using a designated number of sheets as a unit of bookbinding, and when the designated layout is bookbinding printing, said determination unit, said insertion unit, said second determination unit, and said second insertion unit regard sheets in a bookbinding state as print sheets, and perform determination and insertion.

4. The apparatus according to claim 1, further comprising a preview display unit which displays a state in which the document data are printed in accordance with the layout.

5. The apparatus according to claim 1, further comprising a print control unit which prints the document data in accordance with the layout.

6. The apparatus according to claim 1, further comprising a conversion unit which converts output data of an application program into the original pages with corresponding sections.

7. A method performed by a document processing apparatus, said document processing apparatus having a print layout application, a document despooler module and a printer driver, wherein said print layout application performs editing of document data which includes original pages in which a section can be defined using the original page as a unit of definition, wherein said print layout application works independently of the printer driver, and wherein said printer driver generates print data to be printed by a printing apparatus, said method comprising:

a designation step of designating a print layout having a print format indicating that the original pages are arranged on a surface of a print sheet;

a generation step of generating a document file comprising the document data and the print layout designated in said designation step;

a determination step of determining that a page break is designated at a section break in the document data;

a derivation step of, when the page break is designated, deriving a number of blank document pages so as to lay out a first original page of a section immediately after the section break at a start of a new surface of a print sheet, when the original pages are laid out in accordance with the designated print layout;

an insertion step of inserting blank document pages for the number of blank document pages derived in said derivation step at an end of a section immediately before the section break;

a layout step of laying out the original pages of the document data including the blank document pages inserted in the insertion step in accordance with the designated print layout; and an output step which outputs the designated print layout and drawing data to the printer driver via an operating system, wherein said print layout application performs said designation step, said generation step, said determination step, said derivation step, said insertion step and said layout step, and wherein said document despooler module performs said output step.

8. The method according to claim 7, further comprising:

a second determination step of determining that paper change is designated at the section break of a section; and a second insertion step of, when the paper change is designated, inserting a number of blank document pages at the end of a section immediately before the section break so as to lay out a first original page of a section immediately after the section break at a start of a new print sheet when the original pages are laid out in accordance with the designated print layout.

9. The method according to claim 8, wherein the print layout includes bookbinding printing designation using a designated number of sheets as a unit of bookbinding, and when the designated layout is bookbinding printing, sheets in a bookbinding state are regarded as print sheets, and determination and insertion are performed in the determination step, the insertion step, the second determination step, and the second insertion step.

10. The method according to claim 7, further comprising a preview display step of displaying a state in which the document data are printed in accordance with the layout.

11. The method according to claim 7, further comprising a print control step of printing the document data in accordance with the layout.

12. The method according to claim 7, further comprising a conversion step of converting output data of an application program into the original pages with corresponding sections.

13. A computer-executable program stored on a computer-readable storage medium, wherein the computer-executable program causes a computer to perform the method defined in claim 7.

* * * * *